US008253619B2

(12) United States Patent
Holbrook et al.

(10) Patent No.: US 8,253,619 B2
(45) Date of Patent: Aug. 28, 2012

(54) ELECTROMAGNETIC SCANNING IMAGER

(75) Inventors: David S. Holbrook, Lexington, MA (US); Christopher P. Adams, Somerville, MA (US); Brent Gregorich, Anderson, SC (US); Umesh Rajani, Anderson, SC (US); Jason Porter Whitmire, Piedmont, SC (US); Scott D. Bublitz, Hartland, WI (US); Jeffrey C. Hessenberger, Neosho, WI (US); John S. Scott, Brookfield, WI (US); Mark Huggins, Anderson, SC (US); Matthew J. Mergener, Germantown, WI (US)

(73) Assignee: Techtronic Power Tools Technology Limited, Tortola (VG)

( * ) Notice: Subject to any disclaimer, the term of this patent is extended or adjusted under 35 U.S.C. 154(b) by 471 days.

(21) Appl. No.: 12/628,445

(22) Filed: Dec. 1, 2009

(65) Prior Publication Data
US 2010/0117885 A1 May 13, 2010

Related U.S. Application Data

(63) Continuation-in-part of application No. 11/858,413, filed on Sep. 20, 2007, now Pat. No. 7,679,546, and a continuation-in-part of application No. 11/353,882, filed on Feb. 14, 2006, now Pat. No. 7,626,400.

(60) Provisional application No. 60/826,358, filed on Sep. 20, 2006, provisional application No. 60/653,228, filed on Feb. 15, 2005.

(51) Int. Cl.
*G01S 13/89* (2006.01)
*G01S 13/88* (2006.01)
*G01V 3/12* (2006.01)
*G01S 13/00* (2006.01)
*G01V 3/00* (2006.01)

(52) U.S. Cl. ............... 342/22; 342/89; 342/90; 342/175; 342/176; 342/179; 342/192; 342/195; 324/323; 324/332; 324/344; 324/600; 324/629; 324/637; 324/642

(58) Field of Classification Search .................. 324/323, 324/332–346, 600, 629, 637–646; 37/347, 37/348; 600/300, 407, 425–435; 342/21, 342/22, 27, 28, 52–55, 82, 89, 90, 175, 176, 342/179, 181, 189–197, 25 R–25 F, 147, 342/158
See application file for complete search history.

(56) References Cited

U.S. PATENT DOCUMENTS
3,304,434 A 2/1967 Koster
(Continued)

FOREIGN PATENT DOCUMENTS
EP 0389240 9/1990
(Continued)

OTHER PUBLICATIONS

PCT/US2010/058579 International Search Report and Written Opinion dated Jul. 30, 2011 (9 pages).

(Continued)

*Primary Examiner* — Bernarr Gregory
(74) *Attorney, Agent, or Firm* — Michael Best & Friedrich LLP

(57) ABSTRACT

In one aspect, the present invention provides an imager, preferably portable, that includes a source of electromagnetic radiation capable of generating radiation with one or more frequencies in a range of about 1 GHz to about 2000 GHz. An optical system that is optically coupled to the source focuses radiation received therefrom onto an object plane, and directs at least a portion of the focused radiation propagating back from the object plane onto an image plane. The imager further includes a scan mechanism coupled to the optical system for controlling thereof so as to move the focused radiation over the object plane. A detector optically coupled to the lens at the image plane detects at least a portion of the radiation propagating back from a plurality of scanned locations in the object plane, thereby generating a detection signal. A processor that is in communication with the detector generates an image of at least a portion of the object plane based on the detection signal.

33 Claims, 42 Drawing Sheets

U.S. PATENT DOCUMENTS

| | | | |
|---|---|---|---|
| 3,494,039 A | 2/1970 | Porter | |
| 3,713,156 A | 1/1973 | Pothier | |
| 3,754,271 A | 8/1973 | Epis | |
| 3,775,765 A | 11/1973 | Di Piazza et al. | |
| 3,836,258 A | 9/1974 | Courten et al. | |
| 3,845,384 A | 10/1974 | Stoutenberg et al. | |
| 3,967,282 A | 6/1976 | Young et al. | |
| 4,008,469 A | 2/1977 | Chapman | |
| 4,062,010 A | 12/1977 | Young et al. | |
| 4,227,807 A | 10/1980 | Pond et al. | |
| 4,246,703 A | 1/1981 | Robinet | |
| 4,430,653 A | 2/1984 | Coon et al. | |
| 4,464,622 A | 8/1984 | Franklin | |
| 4,561,183 A | 12/1985 | Shores | |
| 4,612,538 A | 9/1986 | Karcher, Jr. | |
| 4,677,438 A | 6/1987 | Michiguchi et al. | |
| 4,706,031 A | 11/1987 | Michiguchi et al. | |
| 4,760,647 A | 8/1988 | Gillis | |
| 4,797,544 A | 1/1989 | Montgomery et al. | |
| 4,814,768 A | 3/1989 | Chang | |
| 4,850,693 A | 7/1989 | Deason et al. | |
| 4,853,617 A | 8/1989 | Douglas et al. | |
| 4,859,931 A | 8/1989 | Yamashita et al. | |
| 4,967,484 A | 11/1990 | Nosek | |
| 4,992,741 A | 2/1991 | Douglas et al. | |
| 4,995,102 A | 2/1991 | Ichinose et al. | |
| 4,998,058 A | 3/1991 | Tofte et al. | |
| 5,012,248 A * | 4/1991 | Munro et al. | 342/22 |
| 5,020,886 A | 6/1991 | Takeda et al. | |
| 5,030,956 A | 7/1991 | Murphy | |
| 5,051,748 A | 9/1991 | Pichot et al. | |
| 5,081,456 A | 1/1992 | Michiguchi et al. | |
| 5,104,225 A | 4/1992 | Masreliez | |
| 5,148,108 A | 9/1992 | Dufour | |
| 5,227,797 A | 7/1993 | Murphy | |
| 5,227,799 A | 7/1993 | Kimura et al. | |
| 5,296,807 A | 3/1994 | Kousek et al. | |
| 5,345,240 A * | 9/1994 | Frazier | 342/28 |
| 5,352,974 A | 10/1994 | Heger | |
| 5,446,461 A | 8/1995 | Frazier | |
| 5,455,590 A | 10/1995 | Collins et al. | |
| 5,457,394 A | 10/1995 | McEwan | |
| 5,477,622 A | 12/1995 | Skalnik | |
| 5,512,834 A | 4/1996 | McEwan | |
| 5,541,727 A | 7/1996 | Rando et al. | |
| 5,543,799 A | 8/1996 | Heger | |
| 5,560,119 A | 10/1996 | LeBreton | |
| 5,570,189 A | 10/1996 | Salmon | |
| 5,577,330 A | 11/1996 | Cheng | |
| 5,619,128 A | 4/1997 | Heger | |
| 5,640,092 A | 6/1997 | Motazed et al. | |
| 5,644,314 A * | 7/1997 | Ahmad et al. | 342/22 |
| 5,647,135 A | 7/1997 | Fuentes et al. | |
| 5,647,439 A | 7/1997 | Burdick et al. | |
| 5,659,985 A | 8/1997 | Stump | |
| 5,675,349 A | 10/1997 | Wong | |
| 5,680,048 A | 10/1997 | Wollny | |
| 5,704,142 A | 1/1998 | Stump | |
| 5,748,369 A | 5/1998 | Yokota | |
| 5,757,320 A | 5/1998 | McEwan | |
| 5,760,397 A | 6/1998 | Huguenin et al. | |
| 5,760,932 A | 6/1998 | Perchak | |
| 5,767,679 A | 6/1998 | Schroder | |
| 5,780,846 A | 7/1998 | Angilella et al. | |
| 5,812,057 A | 9/1998 | Hepworth et al. | |
| 5,835,053 A | 11/1998 | Davis | |
| 5,835,054 A | 11/1998 | Warhus et al. | |
| 5,877,618 A | 3/1999 | Luebke et al. | |
| 5,886,664 A | 3/1999 | Yujiri et al. | |
| 5,900,833 A | 5/1999 | Sunlin et al. | |
| 5,904,210 A | 5/1999 | Stump et al. | |
| 5,905,455 A | 5/1999 | Heger et al. | |
| 5,933,014 A | 8/1999 | Hartrumpf et al. | |
| 5,933,120 A | 8/1999 | Manasson et al. | |
| 5,992,741 A | 11/1999 | Robertson et al. | |
| 6,028,547 A | 2/2000 | Dory | |
| 6,091,354 A | 7/2000 | Beckner et al. | |
| 6,119,376 A | 9/2000 | Stump | |
| 6,130,858 A | 10/2000 | Felesky | |
| 6,182,512 B1 | 2/2001 | Lorraine | |
| 6,195,922 B1 | 3/2001 | Stump | |
| 6,198,271 B1 | 3/2001 | Heger et al. | |
| 6,211,662 B1 | 4/2001 | Bijawat et al. | |
| 6,215,293 B1 | 4/2001 | Yim | |
| 6,242,740 B1 | 6/2001 | Luukanen et al. | |
| 6,249,113 B1 | 6/2001 | Krantz et al. | |
| 6,259,241 B1 | 7/2001 | Krantz | |
| 6,301,997 B1 | 10/2001 | Welte | |
| 6,359,582 B1 | 3/2002 | MacAleese et al. | |
| 6,417,502 B1 | 7/2002 | Stoner et al. | |
| 6,417,797 B1 | 7/2002 | Cousins et al. | |
| 6,445,334 B1 * | 9/2002 | Bradley et al. | 342/22 |
| 6,462,696 B1 * | 10/2002 | Gorman | 342/22 |
| 6,473,025 B2 * | 10/2002 | Stolarczyk et al. | 342/22 |
| 6,473,049 B2 | 10/2002 | Takeuchi et al. | |
| 6,493,126 B1 | 12/2002 | Iizuka | |
| 6,507,441 B1 | 1/2003 | Eisenberg et al. | |
| 6,522,285 B2 | 2/2003 | Stolarczyk et al. | |
| 6,573,855 B1 | 6/2003 | Hayakawa et al. | |
| 6,573,857 B2 * | 6/2003 | Fullerton et al. | 342/28 |
| 6,590,519 B2 | 7/2003 | Miceli et al. | |
| 6,600,441 B2 | 7/2003 | Liedtke et al. | |
| 6,617,996 B2 | 9/2003 | Johansson et al. | |
| 6,621,448 B1 | 9/2003 | Lasky et al. | |
| 6,633,252 B2 | 10/2003 | Stolarczyk et al. | |
| 6,637,278 B1 | 10/2003 | Fasanella | |
| 6,660,193 B2 | 12/2003 | Myhre | |
| 6,687,036 B2 | 2/2004 | Riza | |
| 6,696,827 B2 | 2/2004 | Fazekas et al. | |
| 6,701,647 B2 | 3/2004 | Stump | |
| 6,703,944 B1 | 3/2004 | Obradovich | |
| 6,736,004 B2 | 5/2004 | Evans et al. | |
| 6,747,536 B1 | 6/2004 | Miller, Jr. | |
| 6,748,323 B2 | 6/2004 | Lokshin et al. | |
| 6,748,797 B2 | 6/2004 | Breed et al. | |
| 6,777,684 B1 | 8/2004 | Volkov et al. | |
| 6,778,127 B2 | 8/2004 | Stolarczyk et al. | |
| 6,791,487 B1 | 9/2004 | Singh et al. | |
| 6,791,488 B2 | 9/2004 | Diekhans et al. | |
| 6,842,993 B1 | 1/2005 | DiMauro | |
| 6,844,713 B2 | 1/2005 | Steber et al. | |
| 6,856,272 B2 * | 2/2005 | Levitan et al. | 342/22 |
| 6,894,508 B2 | 5/2005 | Sanoner et al. | |
| 6,900,756 B2 | 5/2005 | Salmon | |
| 6,909,497 B2 | 6/2005 | Holbrook | |
| 6,919,838 B2 * | 7/2005 | Santhoff | 342/22 |
| 6,926,473 B2 | 8/2005 | Luebke | |
| 6,950,054 B1 * | 9/2005 | Steinway et al. | 342/22 |
| 6,952,880 B2 | 10/2005 | Saksa | |
| 6,967,612 B1 * | 11/2005 | Gorman et al. | 342/22 |
| 6,978,503 B2 | 12/2005 | Del Cogliano | |
| 6,999,021 B2 | 2/2006 | Taylor, Jr. et al. | |
| 7,013,570 B2 | 3/2006 | Levine et al. | |
| 7,034,740 B2 | 4/2006 | Witten | |
| 7,036,241 B2 | 5/2006 | Williams et al. | |
| 7,038,446 B1 | 5/2006 | Keely | |
| 7,059,057 B2 | 6/2006 | Raskin et al. | |
| 7,099,084 B2 | 8/2006 | Bi | |
| 7,113,124 B2 | 9/2006 | Waite | |
| 7,116,091 B2 | 10/2006 | Miller | |
| 7,125,145 B2 | 10/2006 | Gardiner et al. | |
| 7,134,217 B2 | 11/2006 | Melittas | |
| 7,142,193 B2 | 11/2006 | Hayama et al. | |
| 7,147,162 B2 | 12/2006 | Fitch et al. | |
| 7,148,836 B2 | 12/2006 | Romero et al. | |
| 7,170,076 B2 | 1/2007 | Butler et al. | |
| 7,173,560 B2 | 2/2007 | Li et al. | |
| 7,178,250 B2 | 2/2007 | Nash et al. | |
| 7,193,405 B2 | 3/2007 | Murray | |
| 7,194,236 B2 | 3/2007 | Lovberg et al. | |
| 7,209,035 B2 | 4/2007 | Tabankin et al. | |
| 7,210,820 B2 | 5/2007 | Broude et al. | |
| 7,212,014 B2 | 5/2007 | Krantz | |
| 7,218,267 B1 * | 5/2007 | Weil | 342/22 |
| 7,222,437 B2 | 5/2007 | Spanski et al. | |
| 7,236,120 B2 | 6/2007 | Healy et al. | |
| 7,237,341 B2 | 7/2007 | Murray | |

| | | |
|---|---|---|
| 7,248,204 B2 | 7/2007 | Lovberg et al. |
| 7,253,766 B2 * | 8/2007 | Foote et al. ............... 342/22 |
| 7,256,587 B2 | 8/2007 | Sanoner et al. |
| 7,262,602 B2 | 8/2007 | Meyer |
| 7,276,910 B2 | 10/2007 | Prsha et al. |
| 7,278,223 B1 | 10/2007 | Dever et al. |
| 7,282,920 B2 | 10/2007 | Mizuno |
| 7,287,336 B1 | 10/2007 | Goodrich |
| 7,310,060 B2 | 12/2007 | Stilwell et al. |
| 7,312,742 B2 * | 12/2007 | Steinway et al. ............. 342/22 |
| 7,316,073 B2 | 1/2008 | Murray |
| 7,333,045 B1 | 2/2008 | Aomori et al. |
| 7,339,516 B2 * | 3/2008 | Thompson et al. ............ 342/22 |
| 7,355,410 B2 | 4/2008 | Schmitzer et al. |
| 7,356,421 B2 | 4/2008 | Gudmundsson et al. |
| 7,356,587 B2 | 4/2008 | Boulanger et al. |
| 7,357,526 B2 | 4/2008 | Zeiler |
| 7,358,746 B2 | 4/2008 | Clauss et al. |
| 7,358,888 B2 * | 4/2008 | Fullerton et al. ............. 342/147 |
| 7,372,894 B2 | 5/2008 | Rached et al. |
| 7,382,119 B1 | 6/2008 | Gasque, Jr. |
| 7,443,154 B1 | 10/2008 | Merewether et al. |
| 7,447,565 B2 | 11/2008 | Cerwin |
| 7,460,052 B2 * | 12/2008 | Zemany et al. ............... 342/22 |
| 7,482,968 B2 * | 1/2009 | Wuersch et al. ............. 342/22 |
| 7,504,817 B2 | 3/2009 | Sanoner et al. |
| 7,518,374 B1 | 4/2009 | Olsson et al. |
| 7,518,542 B1 | 4/2009 | Steinway et al. |
| 7,538,326 B2 | 5/2009 | Johnson et al. |
| 7,557,559 B1 | 7/2009 | Olsson et al. |
| 7,602,175 B2 | 10/2009 | Mednikov et al. |
| 7,626,400 B2 | 12/2009 | Holbrook et al. |
| 7,633,282 B2 | 12/2009 | Radle et al. |
| 7,800,527 B2 * | 9/2010 | Douglass et al. ............. 342/22 |
| 7,898,455 B2 * | 3/2011 | Rosenbury ................... 342/22 |
| 7,956,794 B2 * | 6/2011 | Skultety-Betz et al. ....... 342/22 |
| 7,978,124 B2 * | 7/2011 | Cook et al. ................... 342/22 |
| 2001/0007420 A1 | 7/2001 | Bijawat et al. |
| 2002/0170201 A1 | 11/2002 | Trout et al. |
| 2003/0218469 A1 | 11/2003 | Brazell et al. |
| 2005/0097765 A1 | 5/2005 | Sorensen et al. |
| 2005/0216032 A1 | 9/2005 | Hayden |
| 2005/0247460 A1 | 11/2005 | Luebke |
| 2006/0055584 A1 | 3/2006 | Waite et al. |
| 2006/0076385 A1 | 4/2006 | Etter et al. |
| 2006/0113985 A1 | 6/2006 | Gist et al. |
| 2006/0144829 A1 | 7/2006 | Broude et al. |
| 2006/0148519 A1 | 7/2006 | Simpson et al. |
| 2006/0255789 A1 | 11/2006 | Wuersch et al. |
| 2006/0266742 A1 | 11/2006 | Hall et al. |
| 2007/0079445 A1 | 4/2007 | Siebeck |
| 2007/0200547 A1 | 8/2007 | Chen |
| 2008/0084212 A1 | 4/2008 | Wieland |
| 2008/0111732 A1 | 5/2008 | Bublitz et al. |
| 2008/0186010 A1 | 8/2008 | Skultety-Betz et al. |
| 2008/0196910 A1 | 8/2008 | Radle et al. |
| 2008/0235954 A1 | 10/2008 | Radle |
| 2009/0195435 A1 | 8/2009 | Kapilevich et al. |

FOREIGN PATENT DOCUMENTS

| | | |
|---|---|---|
| KR | 20020085380 | 11/2002 |
| KR | 20030020722 | 3/2003 |
| WO | 98/47020 | 10/1998 |
| WO | 99/61942 | 12/1999 |
| WO | 01/37029 | 5/2001 |
| WO | 02/084796 | 10/2002 |
| WO | 2005/031502 | 4/2005 |
| WO | 2006/088845 | 8/2006 |

OTHER PUBLICATIONS

PCT/US2007/079021 International Search Report and Written Opinion, 7 pages, Feb. 28, 2008.

International Search Report and Written Opinion for PCT/US2006/005133 dated Oct. 19, 2006.

International Search Report and Written Opinion for PCT/US2006/005133 dated Aug. 30, 2007.

Doyle, et al., "Stand-off detection of hidden threat objects on personnel at checkpoints and in public areas using active millimetre-wave imaging" Proc SPIE Int Soc Opt Eng; vol. 5619, 2004, pp. 90-97.

Grossman, et al., "Terahertz active direct detection imagers," SPIE-Ints. Soc. Opt. Eng USA, vol. 5411 No. 1, 2004, pp. 68-77.

Kyoung-Soo Doo, et al., "Stimulation of target detection in ultraviolet and infrared bands," SPIE USA, vol. 40, No. 11, Nov. 2001, pp. 2646-2654.

Lamb, et al., "A High-Precision Quais-Optical Polarizer for Zeeman Splitting Observations," International Journal of Infrared and Millimeter Waves, Springer, Dordrech, NL, vol. 22, No. 5, May 2001, pp. 679-685.

Lettington, et al., "Techniques for millimetre-wave imaging," Proc SPIE Int Soc Opt Eng; vol. 5619, 2004, pp. 16-26.

* cited by examiner

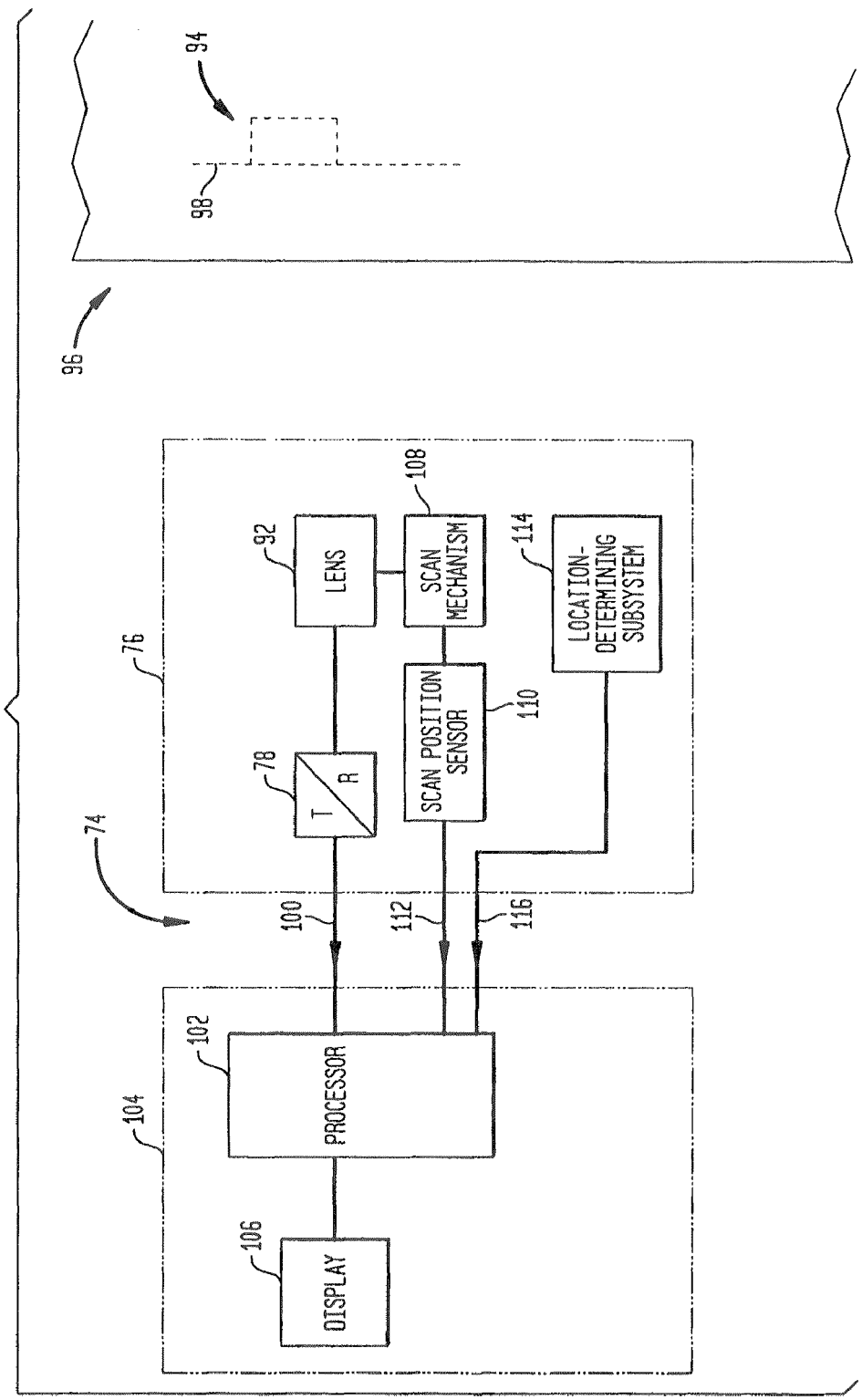

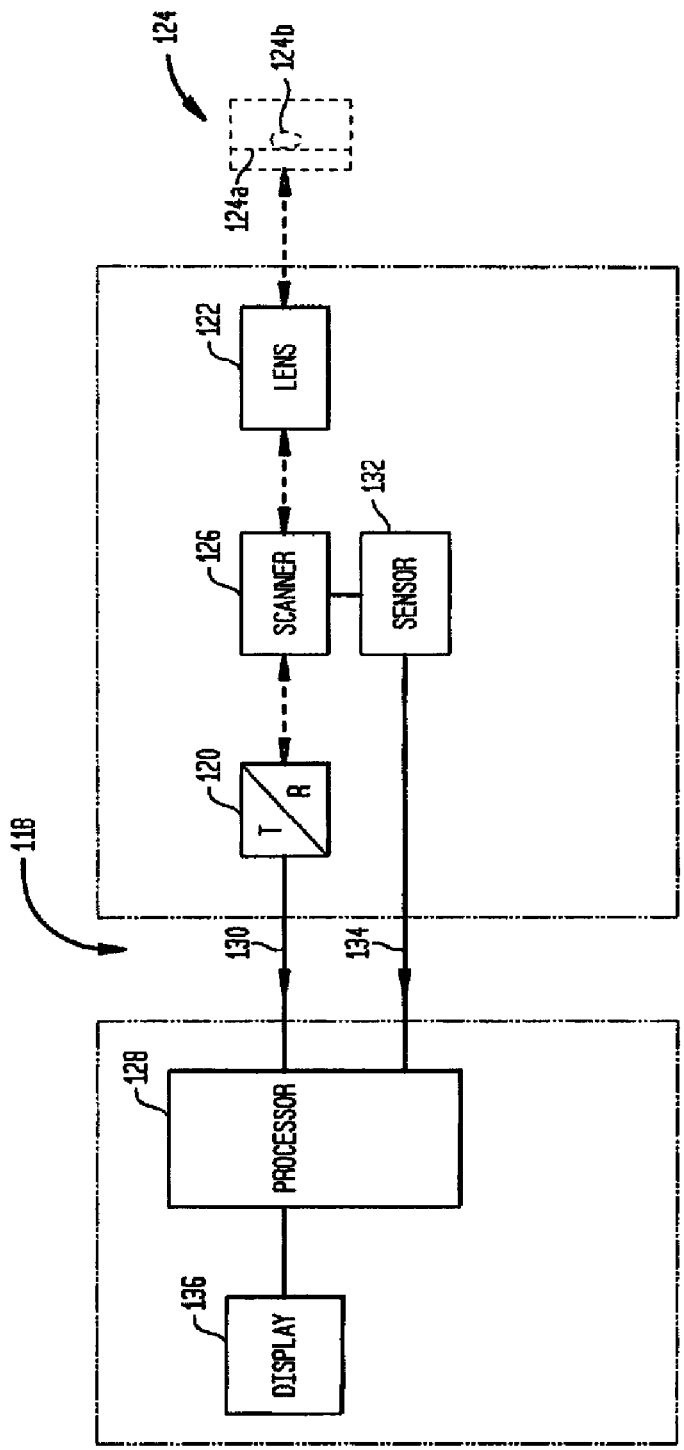

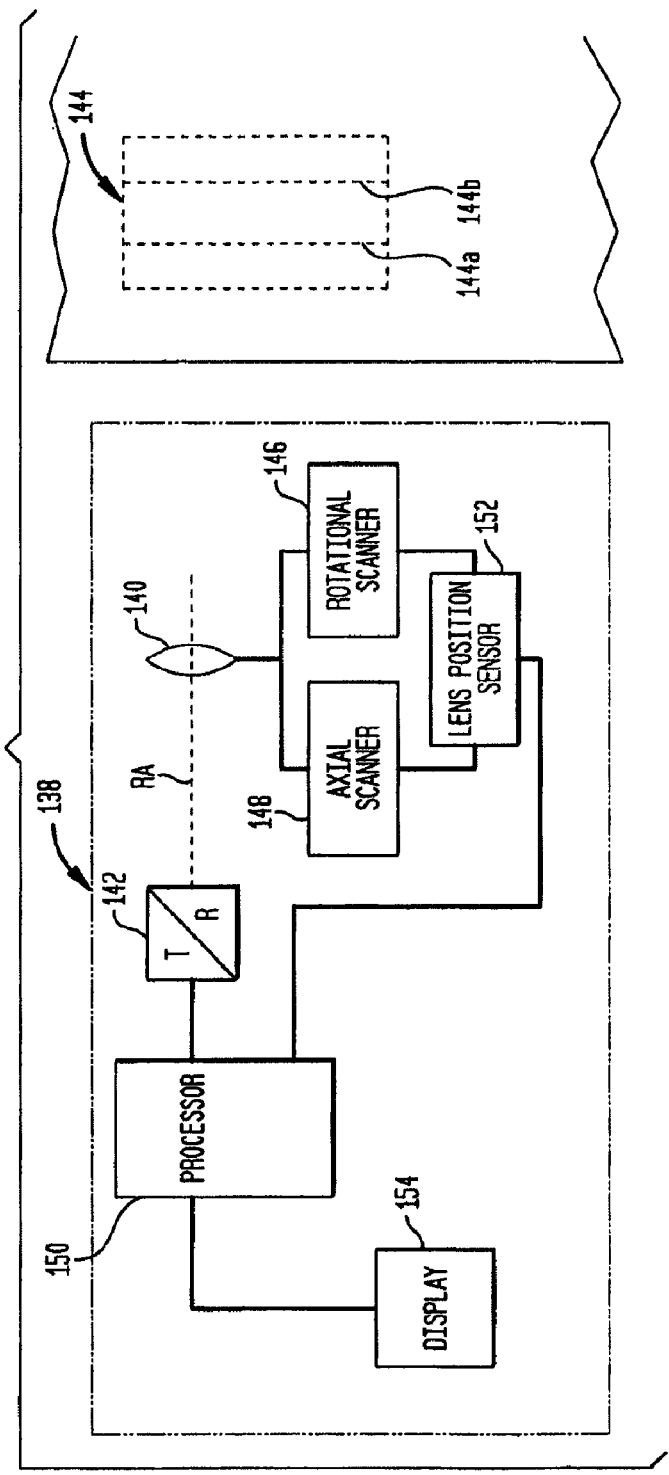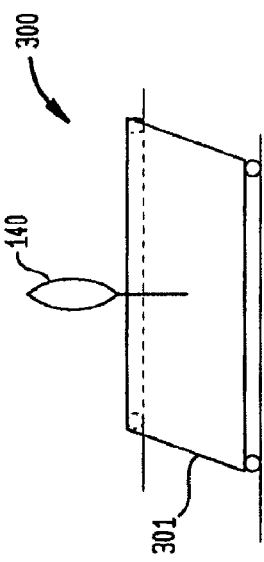

PINE

POPLAR

VINYL TAPE ROLL

1/4" SCREW HEAD IN PINE

PVC

| ROW SUM | | | | | | | | | | | | COLUMN SUM |
|---|---|---|---|---|---|---|---|---|---|---|---|---|
| 2 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 5 | 0 | 0 | 3 | 3 | 0 | 0 | 1 | 0 | 1 | 0 | 0 | |
| 8 | 0 | 0 | 3 | 3 | 0 | 0 | 1 | 0 | 1 | 0 | 0 | |
| 7 | 0 | 0 | 3 | 3 | 0 | 0 | 1 | 0 | 0 | 0 | 0 | |
| 9 | 0 | 0 | 4 | 4 | 0 | 0 | 1 | 0 | 0 | 0 | 0 | |
| 7 | 0 | 0 | 3 | 3 | 0 | 0 | 1 | 0 | 0 | 0 | 0 | |
| 10 | 0 | 0 | 3 | 3 | 0 | 0 | 1 | 0 | 3 | 0 | 0 | |
| 8 | 0 | 0 | 2 | 2 | 0 | 0 | 1 | 0 | 3 | 0 | 0 | |
| 3 | 0 | 0 | 0 | 0 | 0 | 0 | 0 | 0 | 3 | 0 | 0 | |
| 3 | 0 | 0 | 0 | 0 | 0 | 0 | 0 | 0 | 3 | 0 | 0 | |
| | 0 | 1 | 21 | 18 | 0 | 0 | 7 | 0 | 16 | 0 | 0 | |

FIG. 46

ELECTROMAGNETIC SCANNING IMAGER

RELATED APPLICATIONS

This application is a continuation-in-part of U.S. application Ser. No. 11/858,413, filed Sep. 20, 2007, now U.S. Pat. No. 7,679,546, which claims the benefit of U.S. Provisional Application No. 60/826,358, filed on Sep. 20, 2006. This application is also a continuation-in-part of U.S. application Ser. No. 11/353,882, filed Feb. 14, 2006, now U.S. Pat. No. 7,626,400, which claims the benefit of U.S. Provisional Application No. 60/653,228, filed on Feb. 15, 2005. The entire contents of all of the above applications are herein incorporated by reference.

BACKGROUND

The present invention relates generally to imaging systems, and methods of imaging, and more particularly, to such systems and methods that can be utilized to acquire images of objects hidden behind visibly opaque obstructions.

A variety of conventional systems are available for obtaining images through visibly opaque materials. For example, X-ray systems have been utilized to acquire images of objects that are hidden from visual inspection by visibly opaque materials (e.g., anatomical structures or objects within a luggage). X-ray systems, however, have many disadvantages. By way of example, such systems can be expensive and bulky, and can utilize ionizing radiation that may pose health hazards to humans. Moreover, X-ray systems typically detect a beam that has been transmitted through a target sample, thus requiring access to both sides of the target.

Ultrasound imaging systems, in turn, require the presence of a continuous, high quality acoustic transmission path between a transducer and a "hidden" object of interest. In many cases, however, such acoustic transmission paths may be not be available.

Millimeter-wave imaging systems have recently been developed for securing screening applications. Such conventional millimeter-wave systems are, however, complex, costly and bulky.

Accordingly, there is a need for enhanced imaging systems and associated image acquisition methods for obtaining images of objects behind visibly opaque obstructions, e.g., images of interiors of walls/floors/ceiling, boxes, suitcases and the like. There is also a need for such imaging systems that are field portable. Further, there is a need for such systems and methods that can be utilized for screening luggage and other containers for hazardous substances, e.g., explosive materials and devices.

SUMMARY

In one embodiment, the invention provides a method of locating hidden objects. The method includes transmitting microwaves toward an object behind a surface, and detecting feedback from the interaction of the microwaves and the object, using a handheld imaging tool. The method also includes tracking movement of the handheld imaging tool along the surface by a tracking device of the handheld imaging tool. In a first operation mode of the handheld imaging tool, the method includes displaying a grid on a display supported by the handheld imaging tool. The grid is representative of an area to be scanned by the handheld imaging tool. The method also includes filling in the grid with generated images as the handheld imaging tool moves along the surface. The generated images are representative of space behind the surface and indicate at least one of the location, size, and depth of the object.

In one embodiment, in place of or in addition to the first operation mode, the method includes generating an image on a display supported by the handheld imaging tool. The image includes a representation of the object. The method also includes storing the image in a memory with an accompanying tag, retrieving the image using the tag, and displaying the image on the display.

In another embodiment, the invention provides a handheld imaging tool for locating hidden objects. The handheld imaging tool includes a transmitting module operable to transmit microwaves toward an object behind a surface and a detecting module operable to detect feedback from the interaction of the microwaves and the object. The handheld imaging tool further includes a tracking module operable to track movement of the handheld imaging tool along the surface and a display supported by the handheld imaging tool. The handheld imaging tool also includes an imaging module coupled to the detecting module, the tracking module, and the display. The imaging module has a first operation mode in which the imaging module is operable to render a grid on the display. The grid is representative of an area to be scanned by the handheld imaging tool. The imaging module is further operable to fill in the grid with generated images based on data from the detecting module and the tracking module as the handheld imaging tool moves along the surface. The generated images are representative of space behind the surface and indicate at least one of the location, size, and depth of the object.

In another embodiment, in place of or in addition to the first operation mode, the imaging module is further operable to generate an image on a display supported by the handheld imaging tool. The image includes a representation of the object. The imaging module is also operable to store the image in a memory with an accompanying tag, retrieve the image using the tag, and display the image on the display.

In another embodiment, the invention provides a handheld imaging tool for locating hidden objects. The handheld imaging tool includes a body and a handle portion. The body includes a horn assembly with an emitting horn and a receiving horn. The emitting horn is operable to transmit microwaves toward an object behind a surface and the receiving horn is operable to receive feedback from the interaction of the microwaves and the object. The body also includes a tracking module to track movement of the handheld imaging tool along the surface and an imaging module to generate images. The images are generated based on data from the tracking module and feedback received by the receiving horn and displayed on a display of the body as the handheld imaging tool moves along the surface. The generated images are representative of space behind the surface and indicate at least one of the location, size, and depth of the object. The handle portion supports the body of the handheld imaging tool and includes a trigger actuator and a thumb actuator. The trigger actuator and thumb actuator are operable to at least partially control the display.

Other aspects of the invention will become apparent by consideration of the detailed description and accompanying drawings.

BRIEF DESCRIPTION OF THE DRAWINGS

FIG. 12 schematically depicts an imager according to another embodiment of the invention.

FIG. 15 is a schematic view of an imager according to an embodiment of the invention operating in a snapshot mode.

FIG. 18 schematically depicts an imager according to another embodiment of the invention capable of generating images of a plurality of axially separated object planes.

FIG. 19 schematically illustrates a lens focus-drive mechanism suitable for use in the embodiment of FIG. 18.

FIG. 46 depicts a digital representation of a generated image according to one embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
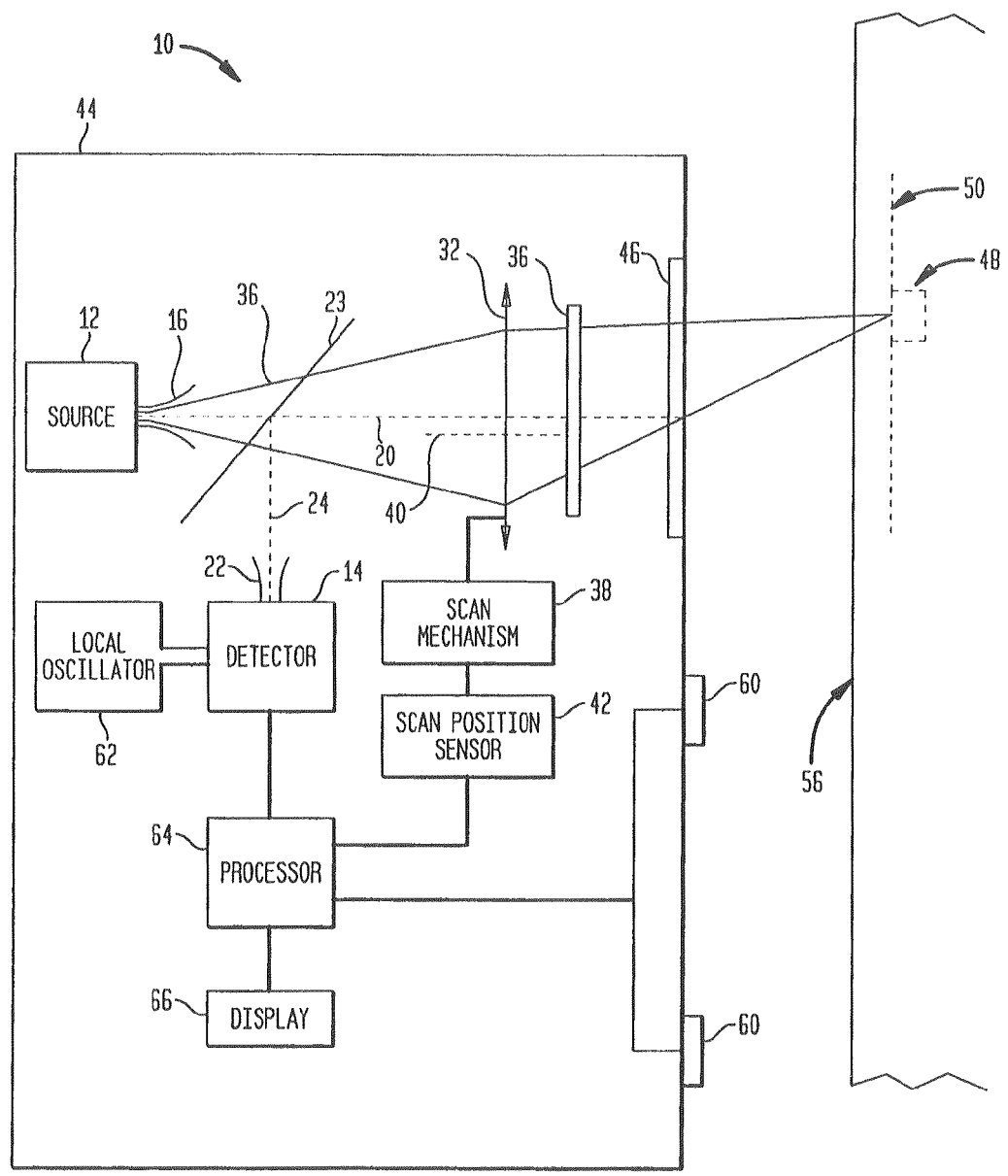
FIG. 1 schematically depicts an imaging system according to one embodiment of the invention.

FIG. 1 schematically depicts an imager 10 (also referred to herein as a camera) according to one embodiment of the invention having a source 12 and a detector 14 for generating and detecting radiation, respectively. In this exemplary embodiment, the radiation source 12 is capable of generating radiation having one or more frequencies in a range of about 1 to about 2000 GHz, and preferably in a range of about 2 GHz to about 100 GHz. In many embodiments, one or more radiation frequencies are selected such that the radiation can penetrate an obstruction (e.g., a wall) that is generally opaque to visible radiation. Some examples of suitable radiation sources include, without limitation, Gunn oscillators, magnetrons, IMPATT diodes, Dielectric Resonator Oscillators (DRGs), MIMICs, or other suitable radiation sources. A horn antenna 16 is coupled to the source so as to facilitate coupling the radiation generated by the source into free space (e.g., by providing a better impedance match) for propagation to an object to be imaged, as discussed further below. In this embodiment, the source, in conjunction with the horn, generates a diverging cone of radiation beam 18 disposed about a propagation axis 20 (herein also referred to as a rotational axis). Similar to the source, a horn 22 is coupled to the detector to facilitate coupling of radiation into the detector. In general, the combination of the detector 14 and its associated horn 22 is capable of receiving radiation beams disposed about a detector axis 24 with a given angular distribution that depends at least in part on the horn geometry.

In this embodiment and some that follow, without any loss of generality, the functioning of the imagers according to the teachings of the invention are discussed by considering acquiring images within a depth of a wall (or other obstructions) that is opaque to visible radiation. Such imagers can, however, be also utilized to acquire images of other objects and behind a multitude of different, non-wall surfaces. For example, the imaging systems of the invention can be utilized to image objects within containers.

The source 12 and the detector 14 are disposed on opposite sides of a beam splitter 23 such that the propagation axis 20 associated with the source and the detection axis 24 associated with the detector typically intersect at an approximately 90-degree angle. The beam splitter 23 is perpendicular to a plane formed by the propagation and the detection axes and is oriented such that a normal to its surface bisects the angle between those axes, e.g., it typically forms a 45-degree angle with each of those axes. The radiation emitted by the source passes through the beam splitter to be directed by other optical components onto a region of interest, as discussed below.

Figure 2:
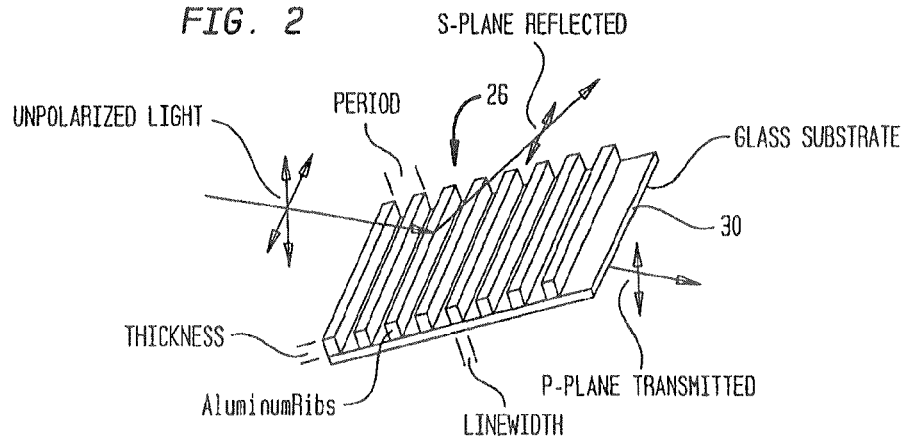
FIG. 2 schematically illustrates a wire grid polarizer suitable for use in the imaging system of FIG. 1 and other embodiments of the invention.

By way of example, the beam splitter 23 can be preferably implemented as a polarizing beam splitter having a polarization axis that is preferably oriented either parallel or perpendicular to a plane defined by the propagation and detection axes. In some embodiments, a so-called wire grid polarizer (WGP) is employed, which can be made, e.g., of a one-dimensional array or grid of very fine parallel electrically conductive elements disposed upon a suitable transparent base material or, e.g., by a grid of fine parallel wires strung on a frame. By way of example, FIG. 2 schematically depicts a wire grid polarizer 26 formed of a plurality of aluminum strips 28 disposed over a dielectric substrate 30 (e.g., a glass or Teflon™ substrate). The spacing between adjacent parallel conductive elements is selected to be considerably less than the radiation wavelength generated by the source 12. This allows the component of the radiation having an electric field vector parallel to the grid elements to be reflected by the polarizer and the component having an electric field vector perpendicular to the grid elements to be transmitted through the polarizer. In this exemplary embodiment, each strip can have a width in a range of about 1/100th wavelength to about 1/4 wavelength, e.g., about 2 mm ("mm"), and can be separated from an adjacent strip by a spacing in a range of about 1/100th wavelength to about 1/4 wavelength, e.g., about 2 mm.

Figure 3:
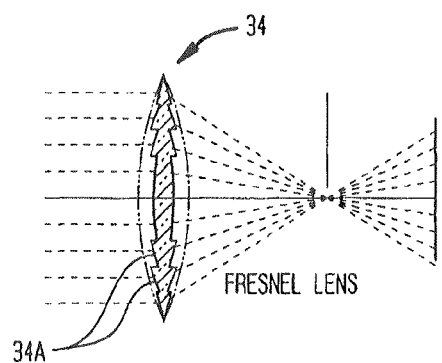
FIG. 3 schematically depicts a Fresnel lens having a plurality of diffractive zones.

Referring again to FIG. 1, the imager 10 further includes a lens 32 that receives the radiation emitted by the source 12 after its passage through the beam splitter 23. The lens 32 can have, e.g., a receiving cone of the order of f/1 or narrower. By way of example, the lens 32 can be a decentered optical element configured to operate, e.g., at approximately unity magnification. In some embodiments of the invention, the lens can be a diffractive lens having a diffractive pattern whose symmetry axis (optical axis) is laterally offset from its physical symmetry axis. For example, the lens can be a Binary Fresnel Lens (BFL) whose optical axis is offset laterally from its physical symmetry axis. As shown schematically in FIG. 3, an exemplary Fresnel lens 34 can include a plurality of diffractive zones 34a separated from one another by steps at each of which a phase discontinuity is generated in a manner that results in coherent interference of radiation passing through the different zones at a focal plane of the lens. In other words, the surface shape of a Fresnel lens can be viewed as a piece-wise approximation to the surface shape of a conventional refractive lens, e.g., such as that depicted by dashed lines. Further, a BFL can be viewed as a Fresnel lens in which each section of the approximation is further approximated by a staircase profile.

Figure 4:
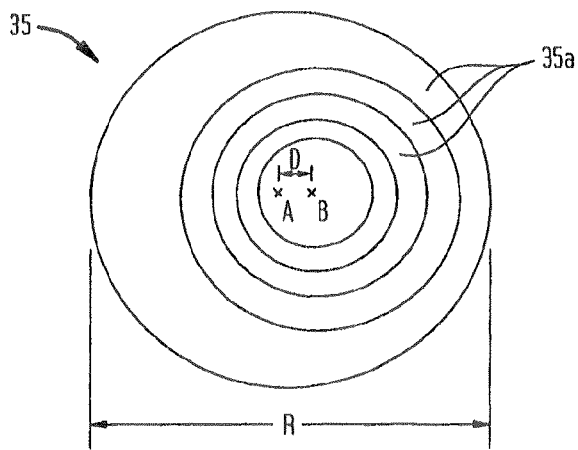
FIG. 4 is a top schematic view of a Binary Fresnel Lens (BFL) suitable for use in the imaging system of FIG. 1 as well as other embodiments.

In some embodiments of the invention, the BFL includes four steps each providing a 1/4-wave phase delay. By way of example, FIG. 4 schematically depicts a BFL 35 suitable for use in various embodiments of the invention having a plurality of diffractive zones 35a disposed about an optical axis that is laterally offset from its physical center. In other words, an axis of symmetry of the diffractive pattern (perpendicular to the plane of the drawing at point B) is separated by a selected offset D from a physical symmetry axis of the lens (perpendicular to the plane of drawing at point A). In some embodiments, the BFL includes a diameter R (e.g., about 8 inches) and a focal length in a range of about 2 inches (about 5 cm) to about 10 inches (about 25 cm), e.g., about 8 inches (about 20.3 cm), with an optical axis offset in a range of about 1 inch (about 2.5 cm) to about 3.5 inches (about 8.9 cm), and more preferably about 2 inches (about 5 cm). As discussed in more detail below, the offset between the physical and the optical axis of the BFL 35 allows scanning the focal point of the lens about a generally elliptical path (e.g., a circular path) by rotating the lens about its physical axis.

Referring again to FIG. 1, in this exemplary embodiment, the imager 10 further includes a 1/4-wave plate (QWP) 36 that is adapted to operate in a frequency range of interest (e.g., in a frequency range of about 1 GHz to about 2000 GHz). The QWP 36 is disposed in the path of the radiation between the polarizing beam splitter and an object to be imaged. While in this embodiment the QWP is placed between the lens and a wall surface 56, in other embodiments, the QWP can be disposed between the polarizing beam splitter and the lens, typically closer to the beam splitter at a location where the radiation beam diameter is relatively small.

Figure 5:
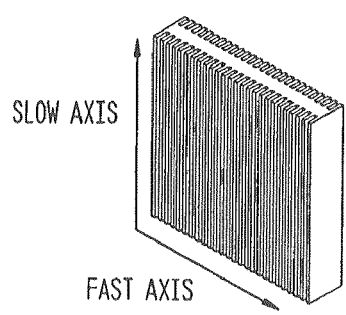
FIG. 5 is a perspective schematic view of a quarter-wave plate (QWP) suitable for use in the imaging system of FIG. 1 as well as other embodiments.

In some embodiments, the QWP 36 can be implemented as a grooved dielectric plate, such as that schematically depicted in FIG. 5. For example, the QWP 36 can be fabricated by machining a plurality of grooves on a dielectric plate (e.g., a Teflon™ plate). The plate can have a thickness in a range of about 5 mm to about 80 mm, and the grooves can have a depth in a range of about 4 mm to about 70 mm and a width in a range of about $1/100$th wavelength to about $1/4$ wavelength of the radiation. Further, the center-to-center spacing between adjacent grooves can be in a range of about 0.1 mm to about 3 mm. The theory of operation of QWPs suitable for use in the frequency range of interest and typical techniques for their fabrication are described in an article entitled "A high precision quasi-optical polarizer for Zeeman splitting observation," by J. W. Lamb, M. Carter, and F. Mattiocco, published in Int. J. Infrared and Millimeter Waves, vol. 22, No. 5 (May 2001), incorporated herein by reference.

In this exemplary embodiment, the QWP 36 is disposed perpendicular to the propagation axis of radiation from the source 12 with its fast axis preferably oriented at +/−45 degrees from the plane of polarization of the outgoing radiation. As is well known in the art, linearly polarized radiation passing through a QWP oriented in this manner emerges from the QWP as substantially circularly polarized.

The imager 10 further includes a scan mechanism 38 coupled to the lens 32 for rotating the lens about its rotation axis (herein also referred to as the lens's physical axis). The lens is preferably disposed relative to the source such that its rotation axis is substantially coincident with the propagation axis of the outgoing radiation. As noted above, an optical axis 40 of the lens is displaced from its rotation axis by a predetermined distance, e.g., by about ½ of the radius of the lens. The optical axis of the lens can be parallel to its rotation axis, or alternatively, it can intersect the rotation axis at the emitting aperture of the source. As discussed in more detail below, the rotation of the lens 32 allows scanning the radiation at the focal plane of the lens over a path in an object plane.

Figure 6:
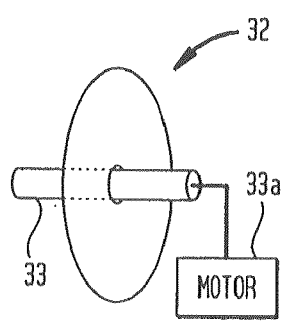
FIG. 6 schematically depicts a scanning mechanism suitable for rotating the lens of the imaging system of FIG. 1 as well as lenses utilized in other embodiments.

A variety of scanning mechanisms can be utilized in the practice of the invention. For example, referring to FIG. 6, a rotating shaft 33, which is driven by a motor 33*a*, can be coupled to the lens to cause the lens to rotate. Referring again to FIG. 1, in many embodiments, the imager further includes a lens scan position sensor 42 for indicating an angular rotation of the lens about the rotation axis relative to a predetermined reference. A variety of commercially available sensors can be employed. For example, optical sensors can be utilized to determine the angular position of the lens. An example of a suitable sensor is a shaft encoder that can provide information regarding angular position of a rotating shaft (such as the rotating shaft depicted in FIG. 6) to which the lens is coupled. In some embodiments, the scan mechanism 38 causes the lens to rotate at a substantially constant angular velocity with the scan position sensor 42 sensing the lens's angular position once, or more, per revolution using, e.g., a magnet on the edge of the lens and a fixed Hall effect sensor.

In this exemplary embodiment, various components of the imager, such as those discussed above, are disposed in a portable, preferably handheld housing 44. An optional window 46 (e.g., formed of a material transparent at the operating wavelength) is coupled to the housing 44 through which the radiation generated by the source can be transmitted to illuminate interior portions of the wall, as discussed further below. In other embodiments, no window is provided.

In operation, the lens 32 directs radiation generated by the source 12, after its passage through the beam splitter 23, via the QWP 36 and the window 46 into the interior of a wall (or other obstruction, or a region behind such an obstruction) to illuminate portions thereof, such as the hidden object 48. Preferably, the lens 32 forms an image of the source so as to create an illuminating focused point (e.g., an area of maximal radiation intensity) at a distance from the lens that is less than infinity and more than one focal length of the lens. In many embodiments, the radiation from the imager is focused onto an object plane (e.g., object plane 50) within the wall, and the radiation returning from that object plane is detected and analyzed to form an image thereof, as discussed in more detail below. In general, the object plane 50 has an axial extension (a depth) corresponding to the axial extension of the focal volume, as schematically illustrated by hidden object 48, which represents a portion of the object plane.

Figure 7:
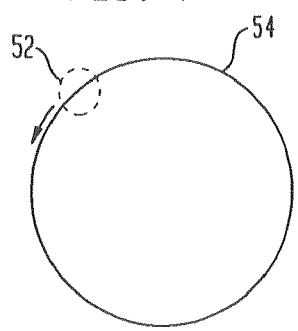
FIG. 7 schematically illustrates a circular scan pattern of radiation directed by an embodiment of an imaging system according to the invention onto an object plane.
Figure 8:
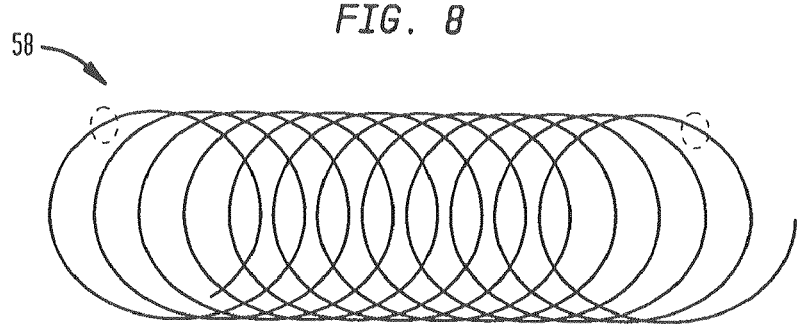
FIG. 8 schematically depicts a swath over an object plane illuminated by radiation from an imager according to an embodiment of the invention via rotation of a lens and concurrent translation of the imager over a surface substantially parallel to the object plane.

In this exemplary embodiment, the lens 32 is placed at a distance from the source substantially equal to twice its focal length, thereby forming an image of the source at a distance of approximately two focal lengths from the lens. Accordingly, the image is displaced radially from the rotation axis by twice the displacement of the lens's optical axis from the rotation axis. As shown schematically in FIG. 7, in this embodiment, as the scanner rotates the lens about its rotation axis, the illuminating point of radiation 52 sweeps out a circular path 54 around the rotational axis in the object plane 50 (FIG. 1). As the imager is translated laterally along an external wall surface 56 (see FIG. 1), e.g., by a user or an automated mechanism, the scan pattern of the illuminating radiation, generated by combined rotation of the lens and translation of the imager, covers a swath 58 on the object plane, as shown in FIG. 8.

Figure 9:
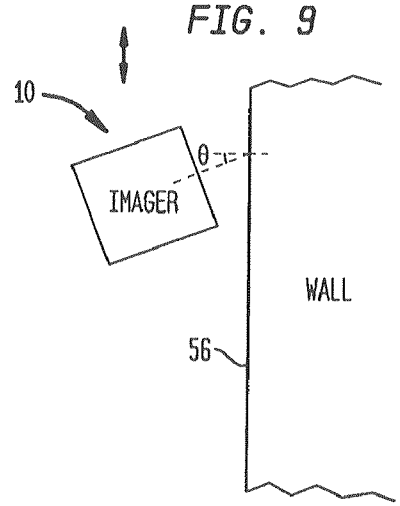
FIG. 9 schematically illustrates that in some embodiments an imager according to teachings of the invention is operated at a selected tilt angle relative to a scanning plane over which it is translated.

In some embodiments, it is preferable to operate the imager with a small tilt angle (e.g., approximately 7 degrees) between a scanning plane (e.g., a plane perpendicular to the lens's rotation axis) and a translation plane (i.e., the plane over which the imager is translated to build up an image of an area). For example, as shown schematically in FIG. 9, the imager 10 can be tilted by an angle ($\theta$) relative to the wall surface 56 as it is translated along the wall. The tilt angle can be in or against direction of the translation. The use of such a tilt can increase the number of "look angles" the scanner produces (in the tilt plane), thereby increasing the probability of receiving a strong specular reflection from an illuminated object. In some embodiments, such a tilt is built in the imager, e.g., by disposing the imager's optical components at a selected tilt angle relative to its housing.

Referring again to FIG. 1, in many embodiments, the imager 10 further includes a plurality of location sensors 60 coupled to its housing 44 for indicating the displacement of the housing relative to the wall surface 56 on which the imager is translated so as to obtain an image of an interior portion of the wall. Preferably, the imager can include at least two such location sensors physically separated such that each sensor would measure displacement of the housing relative to a starting reference along one of two orthogonal coordinate axes (e.g., two orthogonal Cartesian coordinates). In general, the displacement of the imager can be obtained by determining three degrees of freedom (e.g., two translational and a rotational degree of freedom). Each sensor can provide independent data regarding two degrees of freedom, and hence the combined data from two sensors is sufficient for determining three degrees of freedom associated with the translation of the imager over the wall. A variety of location sensors can be employed. By way of example, in some embodiments, each location sensor can be implemented as a tracking ball with orthogonal rotation encoding devices similar in design and construction to a computer mouse. In other embodiments, inertial sensors can be utilized. It should be understood that location sensors suitable for use in the practice of the invention are not limited to these examples, and other sensors (e.g., a variety of optical sensors) known in the art can also be employed.

As noted above, the combined rotation of the lens and the translation of the imager over the wall surface results in illuminating various locations within the interior of the wall. As the illuminating radiation impinges on an object that is not transparent to the radiation, e.g., a metal pipe and/or electrical wiring within the wall, at least a portion of the radiation is reflected or scattered. In the frequency range of about 1 to about 2000 GHz, most objects specularly reflect, rather than scatter, the radiation. Hence, at least some of the radiation incident on such objects within the wall is reflected back towards the imager, e.g., depending on the "look angle" of the illumination and a normal to the reflecting surface at the point of illumination. The lens collects this back-propagating radiation (or at least a portion thereof), after its passage through the QWP 36, and directs that radiation, as a converging radiation beam, to the beam splitter 23. As is known in the art, the passage of the returning radiation, which is circularly polarized (or at least substantially circularly polarized, as the reflection of the incident radiation may have cause some change in the polarization) through the QWP results in conversion of its polarization to linear polarization with a polarization axis normal to that of the linearly polarized radiation generated by the source. As such, the beam splitter directs this linearly polarized back-propagating radiation to the detector 14. In this embodiment, the detector 14 operates in heterodyne mode, that is, it mixes the returning radiation with radiation from a local oscillator 62 to generate an intermediate frequency (IF) electrical signal whose strength is proportional to the intensity of the returning radiation and whose lower frequency can be more readily processed by electronics circuitry. A variety of detectors and local oscillators can be employed. For example, in some embodiments, a receive diode of a Gunnplexer can be employed as the detector. In some other embodiments, a portion of the transmit oscillator power can act as a local oscillator for the receiver. In such a case, a single oscillator can be used for microwave emission as well as detection.

The detector 14 transmits the electrical signal generated in response to detection of the returning radiation to a digital data processor 64. The digital data processor is also in communication with the scan position sensor 42 and the location sensors 60 to receive information regarding, respectively, the angular rotation of the lens (herein also referred to as A(t)) and the location of the imager on the wall surface (herein also referred to as $P_1(t)$ and $P_2(t)$, where $P_1(t)$ denotes the information from the first location sensor 60 and $P_2(t)$ denotes the information from the second location sensor 60). The digital data processor employs the received data to map the time-varying detection signal to a plurality of respective locations on the object plane from which the back-propagating radiation originates. More specifically, the electrical signal, herein also referred to as I(t), is typically a time-varying signal whose strength at any instant is proportional to the intensity of the returning radiation detected by the detector 14 at that time. The intensity is related to the reflecting properties of the object that is at that time at the location where the illuminating radiation is directed. It will be understood by those familiar with the art of scanning image sensing that signal I(t) varies as a function of time because the lens is scanning the radiation in time over the object space. That is, $I(t)=I[x(t),y(t)]$, where x(t), and y(t) define the instantaneous position of the illuminating radiation in the object plane. In the remaining equations, the time dependence is dropped for convenience.

Digital data processor 64 transforms/inverts, and combines, the measurement A, $P_1(x,y)$, and $P_2(x,y)$ to generate x and y. In the exemplary embodiment of FIG. 1, location sensors 60 measure the rigid body x- and y-displacement of the imager body relative to an arbitrary starting location and the scan position sensor measures the angular position of the lens, known to be offset from the axis of rotation by a fixed distance (e.g., d) relative to the frame of reference of the imager housing. This can be expressed as: $X_r$=d cos(A), and $Y_r$=d sin(A) where $X_r$, and $Y_r$ are the x and y coordinates of the lens relative to the axis of rotation in the frame of reference of the imager housing, and d is the off-axis distance to the imager spot.

Similarly, $X_h$, $Y_h$, and $\theta_z$ coordinates of the imager housing can be calculated from $P_1$ and $P_2$, where it is understood each of $P_1$ and $P_2$ comprises an x- and a y-measurement ($x_1, y_1; x_2, y_2$). For example, if the location sensor $P_1$ is selected as the housing reference point, then $$X_h = x_1,$$

$$Y_h = y_1,$$

and $$\theta_z = \arctan\left[\frac{y_2 - y_1}{x_2 - x_1}\right]$$

where $\theta_0$ is the initial angle relative to the x-axis passing through $P_1$ of the line connecting $P_1$ with $P_2$.

Finally, the position of the imaging spot can be calculated by adding the following three vectors: (1) a vector representing the rigid body displacement of the housing, (2) the position of the axis of rotation relative to the housing reference point, and (3) the displacement of the image point due to the angular rotation of the lens. More specifically, x and y can be obtained by employing the following relations:

$x=x_1+D[\cos \theta_z \cos \theta_0 - \sin \theta_z \sin \theta_0]+d \cos A$, and $y=y_1+D[\cos \theta_z \sin \theta_0 + \sin \theta_z \cos \theta_0]+d \sin A$, where D is the distance between $P_1$ and the axis of rotation.

The processor 64 is also adapted to generate image position drive signals suitable for application to an image display 66. The image position drive signals cause the display of a plurality of image points, each having a brightness that corresponds to the detected signal strength from a respective coordinate point in the object plane. In operation, a complete image is built up on the display 66 as the imager's housing in moved over the wall surface (or in proximity thereof) while the imager's lens is rotated to scan the beam over an interior swath of the wall.

Figure 10:
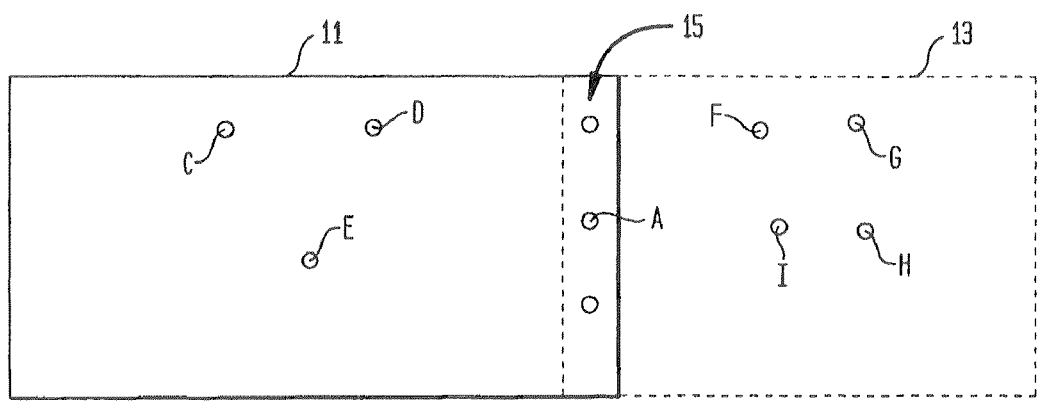
FIG. 10 schematically depicts a method of correlating pixels from a plurality of image frames acquired by an imager of the invention to build up an entire image.

In some embodiments, relative locations of the pixels in an image obtained by combined rotation of the lens and translation of the imager are determined by acquiring a plurality of partially overlapping image frames, and tracking one or more pixels in the overlap regions. By way of example, FIG. 10 schematically depicts two image frames 11 and 13 that include an overlap region 15. At least one of the pixels in the overlap region (e.g., pixel A first observed in the image frame 11 and then repeated in a subsequent image frame 13) can then be utilized as a reference pixel to determine the relative locations of other pixels in the image frame 11 (e.g., pixels C, D and E) to those in image frame 13 (e.g., pixels F, G, H and I). The same process can be repeated for another image frame (not shown) that partially overlaps the image frame 13. In this manner, the relative locations of pixels in an image constructed by assembling a plurality of image frames can be determined.

Figure 11:
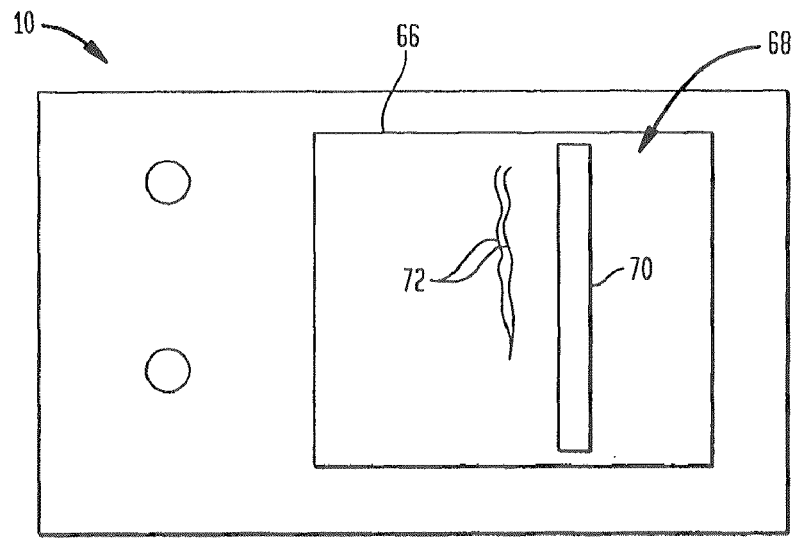
FIG. 11 schematically depicts a front view of an imager according to an embodiment of the invention having a display in which an image acquired by the imager is presented.

By way of example and only for illustrative purposes, FIG. 11 schematically depicts an exemplary image 68 of an interior portion of the wall scanned by the imager 10, which is presented in the imager's display 66. This exemplary image depicts a pipe 70 and a plurality of electrical wires 72 disposed within a depth of the wall. The imager can also provide images of other objects within the wall, such as, termites, water leaks, etc. In fact, any object that is sufficiently reflective (or scattering) at the interrogating radiation wavelengths can be imaged.

Although in the above embodiment, the processor 64 and the display 66 are housed within a single housing with the other components of the imager, in other embodiments, the processor and/or the display can be disposed in a separate housing. In embodiments in which the processor/display are disposed in a separate enclosure, one or more communications channels can be provided to allow the processor and/or display to communicate with one or more imager components disposed in another enclosure. In some cases, the communications channels employ wireless channels that utilize known wireless protocols.

Figure 13A:
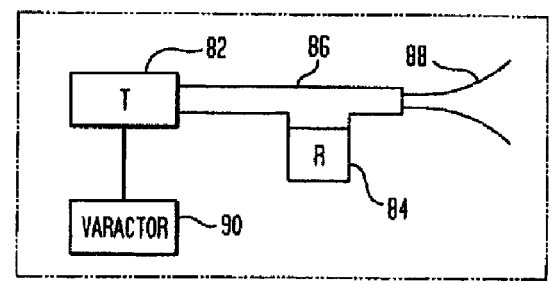
FIG. 13A schematically depicts a Gunnplexer suitable for use as a transmit/receive unit in an imager of the invention.
Figure 13B:
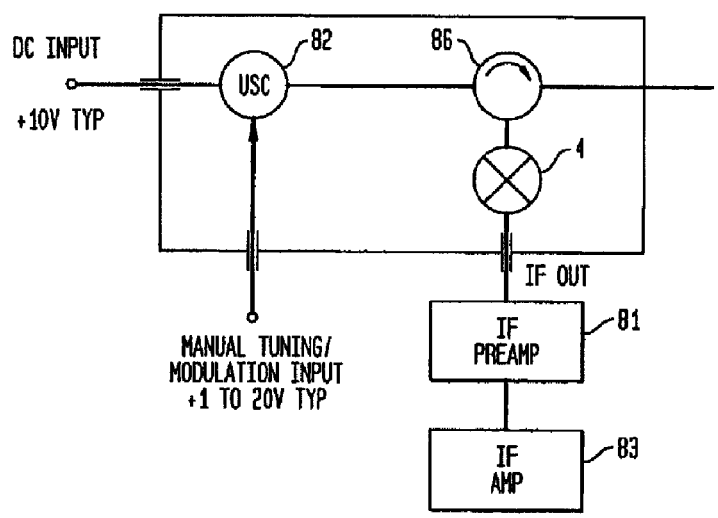
FIG. 13B schematically depicts further details of the Gunnplexer shown in FIG. 13A.

The implementation of an imager according to the teachings of the invention is not limited to the embodiment described above. In fact, such as imager can be implemented in a variety of different ways. For example, FIG. 12 schematically depicts an electromagnetic scanning imager 74 according to another embodiment of the invention that includes a head 76 containing a source of electromagnetic radiation 78 capable of generating radiation with one or more frequency components in a range of about 1 GHz to about 2000 GHz. In this embodiment, the source is combined with a detector of electromagnetic radiation capable of detecting radiation having the same frequency as that generated by the source. Such combined source/detector units are known the art, and are commonly referred to as transmit/receive (or transceiver) units. As shown schematically in FIGS. 13A and 13B, an example of a suitable transmit/receive unit is a Gunnplexer 80, which includes a Gunn diode 82 for generating radiation (it functions as the transmitter of the unit) and a receiver diode 84 for detecting the radiation (it functions as the receiver of the unit). A circulator 86 (e.g., a ferrite circulator) isolates the transmitter and receiver functions. A horn 88 facilitates coupling of radiation out of and into the Gunnplexer. The Gunnplexer can further include a tuning varactor diode 90, typically mounted close to the Gunn diode, for electrically varying (tuning) the outgoing radiation frequency. For example, the varactor can deviate the fundamental frequency (e.g., by about 60 MHz) when a proper tuning voltage is applied thereto. Gunn diode oscillators, which convert dc signals to RF energy, are available, e.g., at specific preset operating frequencies. The Gunnplexer can also include a Schottky mixer 4. The Gunn diode can function simultaneously as a transmitter and a local oscillator with a portion of its energy—in one configuration approximately 0.5 mW—being coupled to the mixer. The mixer can provide an intermediate frequency (IF) output that can be amplified by an IF pre-amplifier 81 and an IF amplifier 83.

Figure 14:
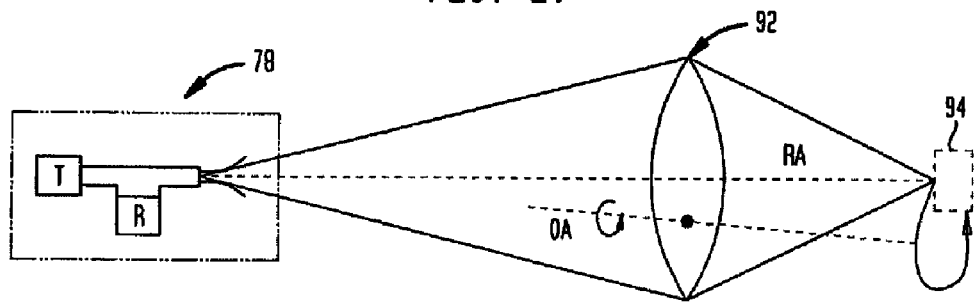
FIG. 14 schematically depicts the transmit/receive unit as well as the lens of the embodiment of FIG. 12, illustrating that the rotation axis of the lens is offset relative to its optical axis.

Referring again to FIG. 12 as well as FIG. 14, similar to the previous embodiment, the imager 74 further includes a lens 92 that is optically coupled to the transmit/receive unit 78 to form an image of the radiation generated by that unit in the general vicinity of an object region 94 of interest, which is typically located behind a visibly opaque material 96, e.g., the surface of a wall, floor or a ceiling. The lens 92 can be a transmissive, diffractive element (e.g., a zone plate) disposed relative to the source at a distance, e.g., greater than—but typically less than three times—its focal length. Generally, the lens 92 forms an image of the transmit/receive unit (an image of radiation generated by that unit) at a distance of less than infinity and more than one focal length from the lens, on the side of the lens away from the source. Alternatively, the lens can be reflective zone plate, in which case the image of source generated by the lens and the source itself are on the same side of the lens. As known in the art, a zone plate can be implemented as a magnitude zone plate (i.e., alternating regions of high transmission/reflection and regions of low transmission/reflection), or as a phase zone plate (e.g., alternating regions imparting zero or 180 degrees of relative phase shift to incident radiation).

The lens 92 is rotated about a rotation axis (illustrated as RA) by a scan mechanism 108, such as those discussed above in connection with the previous embodiment. Similar to the previous embodiment, an optical axis (OA) of the lens 92 is displaced relative to its rotation axis by a selected distance, e.g., about one-half the lens's radius. The rotation axis is generally centered on the emitting aperture of the transmit/receive unit 78 parallel to general direction of propagation of the radiation (parallel to the central ray of a cone-like bundle of rays). The optical axis can be parallel to the rotation axis, or may form a non-zero angle with the rotation axis so as to intersect that axis at the emitting aperture of the transmit/receive unit. The rotation of the lens causes the image of the source, generated by the lens, to scan a selected path (e.g., a generally circular path) over an object plane, in a manner similar to that discussed above in connection with the previous embodiment.

In some embodiments, the emitting aperture of the transmit/receive unit 78, the lens 92, and the image of the emitting aperture are preferably disposed in a confocal configuration. That is, the illuminating radiation is focused onto a small region in a plane of interest (e.g., the object plane), and the reflected (or scattered) radiation reaching the detector (the transmit/receive module in this case) is limited to those rays that originate from the illuminated region. In some embodiments, such a confocal imaging system is employed to reject stray light by utilizing, for example, two strategies: (1) by illuminating a single point (small area) at any given time with a focused beam such that the focused intensity drops off rapidly at axial locations away from that plane of focus (e.g., in front or behind that plane), and (2) by utilizing a blocking or a pinhole aperture, or a point detector, in a conjugate receiver plane so that light reflected (or scattered) from the illuminated object region is blocked from reaching the detector.

With continued reference to FIGS. 12 and 14, the combined rotation of the lens and translation of the imager's head over a surface of the obstruction 96 (e.g., a wall) can result in illuminating a region of interest behind the surface (e.g., an interior region of a wall). At least a portion of the illuminating radiation is reflected (or scattered) back toward the lens. The lens collects the radiation propagating back (e.g., via reflection) from the illuminated region and focuses the collected radiation onto the transmit/receive unit 78, which, functioning as a detector, converts the back-propagating radiation into an output electrical signal.

The output electrical signal is communicated, e.g., via a communication channel 100, to an electronic processor 102 (e.g., a digital data processor), disposed in an electronic processing and display module (EPDM) 104. While in this embodiment the EPDM is contained in a separate housing, in other embodiments, it can be integrated with the head 76 within a single housing. The processor 102 includes a signal processing module that is adapted to convert the output signal generated by the transmit/receive unit 78 into image strength drive signals suitable for application to an image display 106.

In addition to communicating with the detector, the processor 102 is also electrically coupled to a scan position sensor 110, e.g., via a communications channel 112, that can sense the position of the scan mechanism, and thereby that of the lens 92, relative to a predetermined reference position. A variety of scan position sensors, such as those discussed above, can be employed. The position sensor communicates the information regarding the position of the lens to the processor.

Similar to the previous embodiment, the imager 74 further includes a body location-determining subsystem 114 for determining the rigid body location of the head 76 on a surface (e.g., wall surface) over which it is moved to build up an image of a region behind the surface. The subsystem 114 can be in optical and/or mechanical communication with a surface over which the imager is translated. Typically, the subsystem 114 estimates the location and orientation of the head 76 via three parameters "$X_h$", "$Y_h$" and "$\theta_z$", where X, Y and Z denote orthogonal Cartesian coordinates. The X and Y denote coordinates in a plane (e.g., a planar surface of a wall over which the head is translated) and $\theta_z$ denotes an angle about the Z-axis that is perpendicular to that plane. By way of example, the origin of the coordinates can be established as the location and orientation of the imager upon its initial placement on the plane. This can be done automatically or by a user-issued command (which can also be employed to reset the location of the origin, if desired). The location-determining subsystem can then determine subsequent locations and orientations of the imager relative to the origin. A number of location-determining subsystems can be utilized. For example, in some embodiments, the subsystem can comprise two computer-mouse sensing mechanisms, separated by a known base line. Alternatively, the subsystem can be implemented by employing a plurality of inertial sensors.

The location-determining subsystem 114 transmits signals indicative of the location of the imager's head to the processor 102, e.g., via a communications channel 116. The processor utilizes these signals, together with those transmitted by the lens position sensor, to generate a set of image point coordinates in the coordinate space of the object region. The processor further correlates these image coordinates to the time-variation of the signal received from the detector to generate a reflectance image of the illuminated portion. In addition, the processor derives image position drive signals, based on the image coordinates and intensity of reflected signals originating from those coordinates, for application to the display 106. The image drive signals cause the display to present an image in which the brightness of an image point corresponds to the intensity of the detected reflected radiation originating from a coordinate point (e.g., an area or voxel in vicinity of that point) mapped to that image point.

In some embodiments, the frequency of the radiation generated by the source (e.g., the above transmit/receive unit 78) is modulated by a control signal. For example, in the above Gunnplexer 80 (FIG. 13A), the varactor 90 can be employed to cause such a frequency modulation. For example, the frequency can be modulated rapidly (e.g., at a rate of 100 kHz) over a relatively narrow range (e.g., 1% of the center frequency) to suppress coherent echoes, interference and/or speckle noise. Typically, the focal distance of the imager can represent about 100 waves and the reflected intensity is acquired at a rate of, e.g., 5 kHz. In such a case, the frequency of the radiation generated by the Gunnplexer can be modulated by about 1% at a rate of about 100 kHz to introduce a one-wave phase shift as each image pixel is acquired. Intensity integration during this phase shift can significantly reduce coherent artifact noise. It should be appreciated that other frequency modulation parameters can also be utilized based on the requirements of a particular application.

Snapshot Embodiments

In some embodiments, the imager can provide an image of a two-dimensional area while the imager (e.g., imager housing) remains stationary (i.e., without the need to physically move the imager). One such exemplary embodiment 118 shown in FIG. 15 includes a transmit/receive unit 120 for generating and detecting radiation, which preferably operates in a frequency range of about 1 GHz to about 2000 GHz. A lens 122 optically coupled to the transmit/receive unit receives the radiation and focuses it into an object region 124 whose image is desired. In some cases, the object region can be visibly hidden from view by an opaque obstruction, e.g., a wall portion.

Figure 16A:
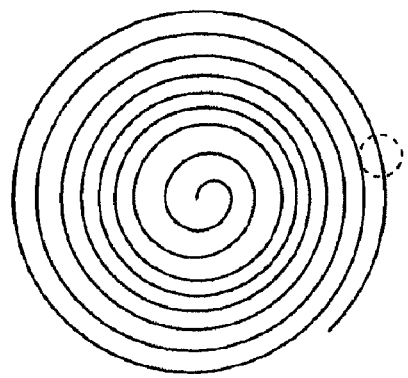
FIG. 16A schematically illustrates a spiral radiation pattern generated by some embodiments of the invention for illuminating an object plane in order to acquire a two-dimensional image thereof.
Figure 16B:
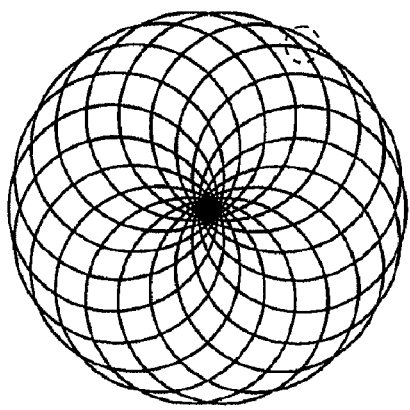
FIG. 16B schematically depicts a floret radiation pattern generated by some embodiments of the invention for illuminating an object plane in order to acquire a two-dimensional image thereof.
Figure 16C:
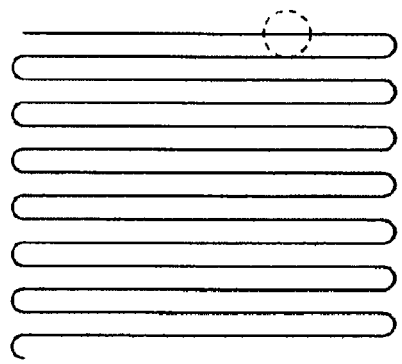
FIG. 16C schematically depicts a raster radiation pattern generated by some embodiments of the invention for illuminating an object plane in order to acquire a two-dimensional image thereof.

A scan mechanism 126 scans the radiation, which is directed by the lens to the region 124, over a plurality of locations in that region. The lens and the scan mechanism can be configured to produce a plurality of radiation scan patterns to cover (illuminate) at least a portion, e.g., an object plane 124a, within the region 124. The scan mechanism typically moves the radiation within a plane (e.g., a plane perpendicular to the lens's optical axis) so as to generate a desired radiation scan pattern. By way of example, FIGS. 16A, 16B, 16C depict, respectively, a spiral, a floret and a raster scan pattern suitable for use in the practice of the invention. The spiral and the floret patterns can be generated, for example, by a combined rotation and radial motion (i.e., motion perpendicular to the optical axis) of the lens. The raster pattern can be formed, in turn, by combination of two linear and orthogonal motions of the lens. In each case, the focused beam size (e.g., shown schematically by dashed lines in FIGS. 16A-16C) can be selected such that the radiation scan causes illumination of a two-dimensional area of interest.

Figure 17:
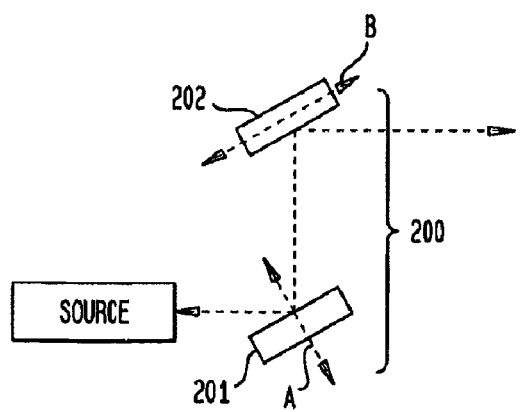
FIG. 17 schematically depicts a mechanism for two-dimensional scanning of a radiation beam, which is suitable for use in some embodiments of the invention.

By way of example, FIG. 17 schematically depicts a radiation scan mechanism 200 optically coupled to the source for providing a two-dimensional radiation scan. The mechanism 200 includes two rotating reflective elements 201 and 202 that are configured to rotate about two orthogonal axes (depicted schematically as axes A and B). The reflective element 201 receives the radiation from the source and directs that radiation to the other reflective element 202, which, in turn, directs the radiation to the lens (not shown). The relative rotational rates of the two elements can be adjusted so as to obtain a variety of scan patterns, such as those discussed above.

With reference to FIG. 15 as well as FIG. 17, one or more objects within the illuminated portion of the object region can reflect (and/or scatter) at least a portion of the incident radiation back towards the lens. For example, by way of illustration, a surface of an object 124b illuminated by the incident radiation can reflect a portion of that radiation back to the lens 122. The lens 122, in turn, directs the back-propagating radiation to the transmit/receive unit 120 for detection. Similar to the previous embodiment, the detector module of the transmit/receive unit generates an electrical signal (typically a time-varying signal) in response to detection of the back-propagating radiation, and communicates this signal to a processor 128, e.g., via a communications channel 130. The magnitude of the generated detection signal at a given time is proportional to the intensity of the reflected radiation detected at that time. The processor also receives information from a radiation scan sensor 132, e.g., via a communications channel 134, regarding the position of the illuminating spot on the object plane as a function of time. For example, the scan sensor can provide the processor with information regarding the instantaneous orientation and rotation rate of each of reflective elements 201 and 202. The processor can convert this information to the position of the illuminating spot on the object plane at any given time. The processor further utilizes this information, e.g., in a manner discussed above, to generate a plurality of image point coordinates, each corresponding to a coordinate in the object plane. The processor further assigns a brightness value to each image point coordinate in proportion to the magnitude of the detected signal associated with an object point corresponding to that image point. In this manner, the processor calculates an image corresponding to the illuminated portion.

Further, the processor generates a plurality of image drive signals for application to a display 136 for displaying the calculated image. In this embodiment, the processor and the display are disposed in separate enclosures with communication channels coupling the processor to the transmit/receive unit as well as the lens position sensor. In other embodiments, the various components of the imager can be housed in a single, preferably handheld, enclosure.

In some embodiments, an imager according to the teachings of invention is capable of acquiring images of a plurality of object planes located at different axial locations (e.g., at difference depths within an obstruction, such as a wall). For example, FIG. 18 schematically depicts an imager 138 according to another embodiment of the invention in which a lens 140 (e.g., a diffractive element whose optical axis is offset relative to its rotation axis) can be axially moved (e.g., along the lens's rotation axis RA) so as to focus radiation generated by a transmit/receive unit 142 at different axial locations within an object region 144. For example, a rotational scan mechanism 146 can rotate the lens, and a focus-drive mechanism 148 can move the lens back-and-forth along its rotational axis so as to focus radiation onto different object planes (e.g., exemplary planes 144a and 144b) within the object region 144. A plurality of focus-drive mechanisms can be employed. By way of example, as shown schematically in FIG. 19, the focus drive mechanism 300 can include a movable stage 301 on which the lens is mounted. In some embodiments, the lens is coupled to a shaft mechanism that rotates and simultaneously axially translates the lens. In such an embodiment, for each axial position of the lens, the rotation of the lens, together with the translation of the imager, can result in scanning the radiation over a path within an object plane. In other embodiments, a zoom lens system can be employed for focusing the radiation on axially separated object planes.

In some embodiments, both transmit/receive unit 142 and lens are axially translated, while preferably maintaining the separation between the transmit/receive unit and the lens, to focus the radiation on planes at different axial locations.

The radiation reflected from each object plane can be detected by the transmit/receive unit, which generates an electrical signal in response to such detection and transmits the signal to a processor 150 for analysis. The imager further includes at least one lens position sensor 152 coupled to the rotational scanner and the focus-drive mechanism for determining the axial position as well as the rotational orientation of the lens (in some embodiments, the functionality of the lens position sensor 152 can be provided by two separate sensors, one for determining the lens's axial position and the other for determining the lens's rotational orientation). By way of example, the lens position sensor 152 can be implemented as a shaft encoder. The lens position sensor 152 transmits the information regarding the lens's axial position and rotational orientation to the processor 150. The processor employs this information to temporally correlate the detection signal generated by the detector to different object planes, and for each object plane, to a plurality of coordinate positions in that plane. In this manner, the processor can build up a plurality of images, each corresponding to a different depth within the object region. The processor can further generate image drive signals for application to a display 154 for displaying these images, e.g., as a three-dimensional image. In some cases, the processor can cause the display to present selected ones of these images, or present them in a selected sequence, or in any other desired manner.

Although a transmit/unit is employed in the imager 138, in other embodiments, separate source and detector can be employed to generate and detect the radiation, for example, in a manner shown in the above imager 10 (FIG. 1). Further, the imager 118 discussed above, which provides a two-dimensional image of an area of interest while stationary, can be similarly modified to provide a plurality of two-dimensional images at different depths in a region of interest.

In another embodiment, the longitudinal chromatic aberration of the lens can be employed to focus radiation from a source at a plurality of at different depths (e.g., onto a plurality of object planes located at different axial distances from the lens). For example, the frequency of the radiation generated by a source can be varied (tuned) such that the chromatic aberration exhibited by the lens would result in focusing different frequencies at different axial locations from the lens.

Figure 20:
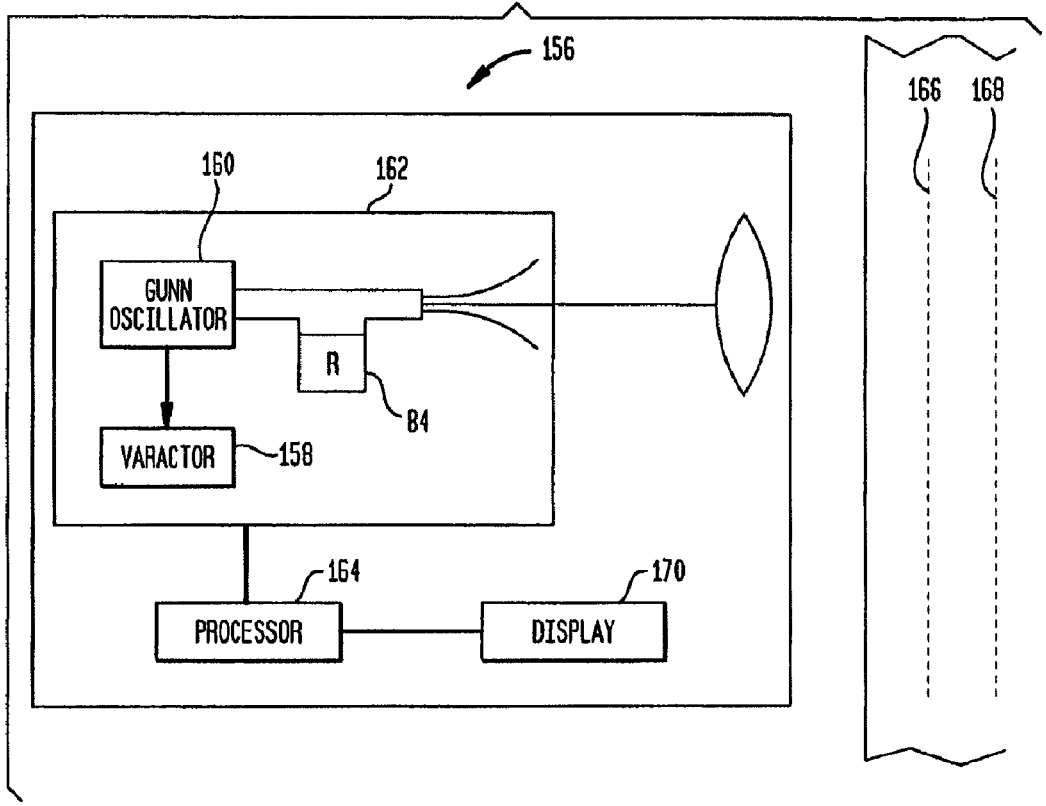
FIG. 20 schematically depicts an imager according to another embodiment of the invention that utilizes chromatic aberration of a lens for focusing radiation on a plurality of axially separated object planes.

By way of example, FIG. 20 schematically depicts such an embodiment 156 in which a varactor diode 158 is employed to tune the frequency of a radiation source 160 of a Gunnplexer 162. A processor 164 in communication with the Gunnplexer can receive information regarding the frequency of radiation as a function of time. The processor employs this information to temporally correlate detection signals corresponding to the detected back-propagating radiation with different axial locations from the lens. Images of different portions (e.g., different object planes such as exemplary object planes 166 and 168) can then be built up and displayed, e.g., in a manner similar to that discussed above, in a display 170.

Telecentric Embodiments

Figure 21:
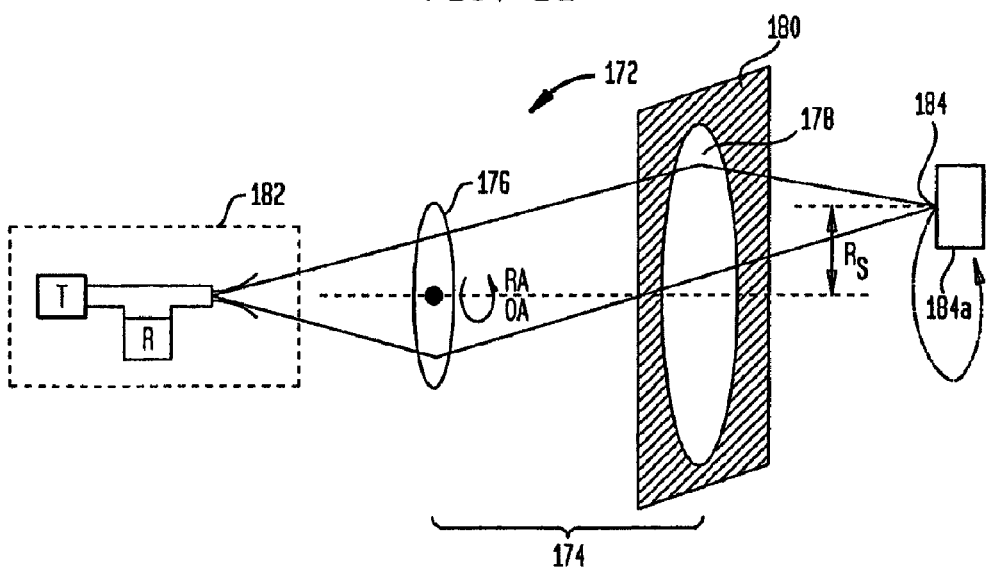
FIG. 21 schematically illustrates an imager according to another embodiment of the invention that employs a telecentric arrangement of optical components for acquiring an image.
Figure 22A:
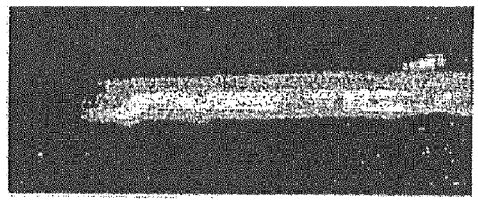
FIGS. 22A-22E show test images obtained by utilizing a prototype image constructed in accordance with the teachings of the invention.
Figure 22B:
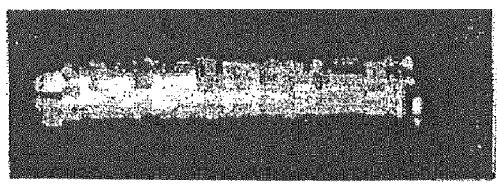
Figure 22C:
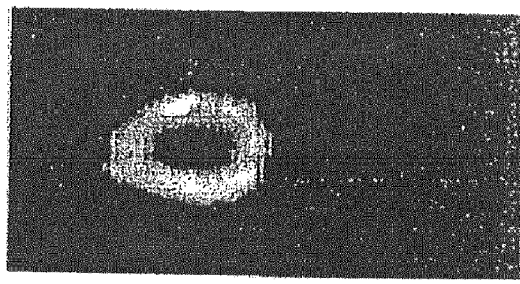
Figure 22D:
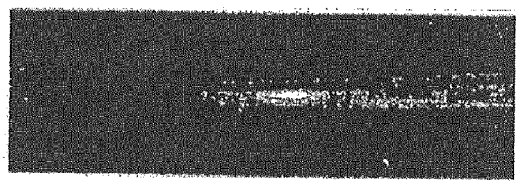
Figure 22E:
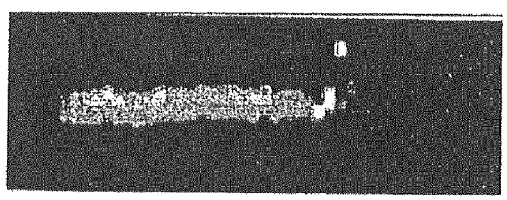

FIG. 21 schematically illustrates an imager (camera) 172 in accordance with another embodiment of the invention that employs a telecentric arrangement of optical elements to acquire an image. The imager comprises a two-element lens system 174 composed of a rotating eccentric pupil lens 176 and a fixed centered lens 178. Fixed lens 178 is illustrated as embedded in a square-shaped surround 180 for clarity only; the surround emphasizes that lens 178 is fixed. The function of the eccentric pupil lens 176 can be understood as being similar to a combination of a collimating lens and a wedge prism. By way of example, a lens portion cut from an edge of a spherical lens or a zone plate lens can be utilized as the lens eccenric lens 176. Other ways of forming the lens 176 are also known to those having ordinary skill in the art.

In the exemplary imager 172, the lens 176 is disposed relative to an emitting aperture of a radiation source 182 at a distance equal to one of its focal lengths. The lens 176 converts an expanding cone of radiation generated by the source into a generally collimated radiation beam, and directs the collimated beam in a predetermined off-axis direction, as shown schematically in FIG. 21. The fixed lens 178 is, in turn, disposed at a selected distance from the lens 176 so as to focus the collimated beam generated by the lens 176 into a point image 184 in a plane at one of its focal lengths in the vicinity of an object region 184a. A scan radius $R_s$ (i.e., a radial distance between optical/rotation axis [RA,OA] and the image 184) can be estimated as the product of the angle of propagation of the collimated beam and the focal length of the fixed lens 178. $R_s$ is independent of the distance between the rotating lens 176 and the fixed lens 178. In some embodiments, the fixed lens 178 can be axially moved, e.g., by utilizing mechanisms such as those discussed above in connection with some of the previous embodiments, so as to focus the radiation at different axial locations relative to the imager (e.g., at different depths of a wall or other obstruction). For example, the imager can be held at a generally fixed distance from a planar surface while the lens 178 is axially moved to focus the radiation at different axial distances from that surface.

Preferably, the separation between the lenses 176 and 178 is substantially equal to the focal length of the fixed lens 178. In such a case, the fixed lens 178 forms the image 184 with an imaging cone of radiation whose chief ray is parallel to the optical axis. When the lens 178 is axially moved, the separation between the two lenses can deviate from this preferred value, although in some embodiments, both lenses can be moved so as to provide a depth of scan of the radiation while maintaining the separation between the lenses substantially equal to the preferred value.

Example 1

A prototype imager made based on the above teachings of the invention is discussed in the following example for further illustration of various aspects of the invention. It should, however, be understood that this is intended only for illustrative purposes, and not for indicating optimal performance of imagers according to the teachings of the invention, or to suggest that the specific arrangement of the various optical components and other design parameters utilized in the prototype are in any way meant to limit the scope of the invention.

The prototype imaging system based on the teachings of the invention was fabricated by utilizing a Gunn oscillator operating at a frequency of 24.15 GHz (a wavelength of about 12.4 mm) as the emitting source. The Gunn oscillator was coupled to a 10 dB feedhorn, with an exit aperture having dimensions of 15 by 11 mm, so as to output a cone of linearly polarized radiation at a power of 5 mW with an angular spread of +/−57 degrees.

After passage through a 45-degree wire grid polarizer (composed of 30 gauge wires with 0.8 mm center spacing disposed on an Acrylic frame), the radiation from the oscillator was focused to a focal point by an F/0.6 quarter-wave focusing lens, formed of Low Density Polyethylene (LDPE). The lens was configured to image the radiation at a focal spot approximately 100 mm off the lens's optical axis. The distance of the source from the lens (about 125 mm) was substantially equal to that of the image from the lens, thus resulting in a magnification of about 1.

A 32 mm thick birefringent quarter-wave plate, composed of an array of 2.5 mm wide slots cut into a LPDE sheet, was placed between the lens and the focal point. The slots of the quarter-wave plate were oriented at 45 degrees relative to the polarization axis of the incident beam, thus converting the beam's linear polarization to circular polarization. Upon reflection from an object at the focal point and a second passage through the quarter-wave plate, the beam's circular polarization was converted back to linear polarization, albeit with a 90-degree rotation relative to the polarization axis of the incident beam. The back-propagating radiation was then transmitted by the wire grid polarizer to a second Gunn oscillator having an integrated mixer (receiver). The optical system effectively operated in a confocal mode, where the diffracted radiation spot served to illuminate an object and radiation reflected (or scattered) from the object was focused back through a small aperture (the feedhorn entrance) to the mixer detector.

The emitter and receiver Gunn oscillators were tuned to have a frequency mismatch of approximately 2 MHz. This frequency mismatch causes radiation reflected by an object at the focal point and relayed to the receiver to generate a 2 MHz beat frequency signal. The beat frequency was amplified, high-pass filtered (frequency cutoff was about 500 Hz to eliminate frequencies below any expected beat frequency), low-pass filtered (to eliminate high frequency noise above any expected beat frequency), and rectified. The rectified signal was, in turn, fed to a computer data acquisition system.

By rotating the lens at 300 revolutions-per-minute (rpm), a circularly scanned "probe spot" was generated. A magnet and a Hall effect sensor were utilized to measure the rotational position of the lens. Object imaging was accomplished by moving objects transversely through the scanning focused spot. A sheet of gypsum wallboard having a thickness of about ⅝ inches (15.9 cm) was placed between the lens and the focal plane of the probe spot. Radiation passing through the wallboard interacted with various test objects (e.g., wires, pipes, human skin, etc). A software program was utilized to use the rotational position of the lens so as to determine the Cartesian Coordinates of locations on the focal plane from which the detected reflected radiation originated. This information was utilized, in a manner discussed in detail above, to construct images of objects that were moved transversely through the scanned field.

FIGS. 22A-22E show some illustrative images obtained by the above prototype, illustrating that objects formed from a variety of different materials (e.g., wood, metal, plastic) with features as small as 6 mm can be imaged behind a gypsum wallboard with contrast ratios as high as 10:1.

As noted above, the above prototype was discussed only for illustrative purposes. The particular selections and arrangements of the optical components (e.g., source, lens and receiver) were made only by way of example. Alternative components and arrangements can also be utilized. For example, sources operating at other wavelengths can be employed.

Example 2

A second prototype imager is discussed in the following example for further illustration of various aspects of the invention. It should, however, be understood that this is intended only for illustrative purposes, and not for indicating optimal performance of imagers according to the teachings of the invention, or to suggest that the specific arrangement of the various optical components and other design parameters utilized in the prototype are in any way meant to limit the scope of the invention.

Figure 23A:
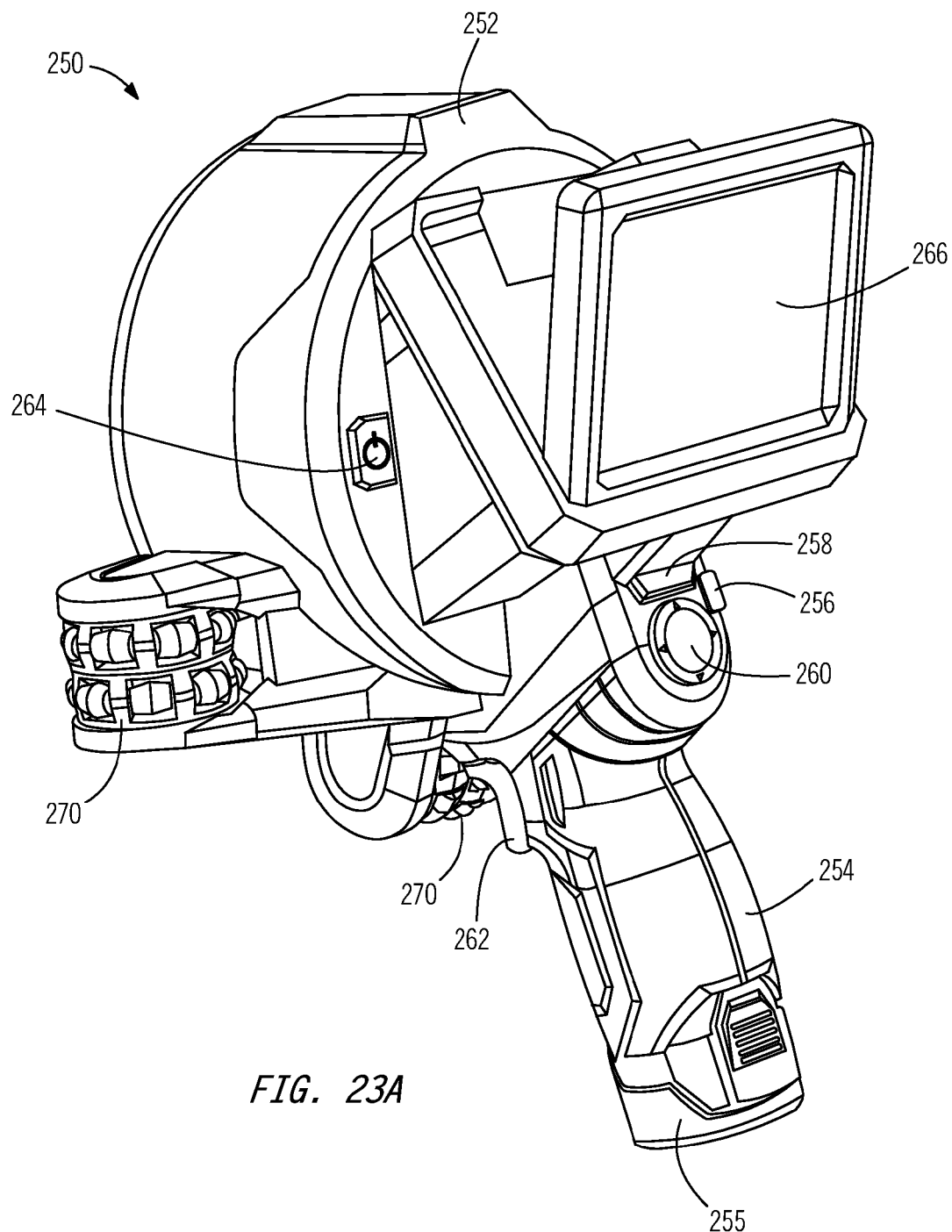
FIGS. 23A-C depict an imaging system according to one embodiment of the invention.
Figure 23B:
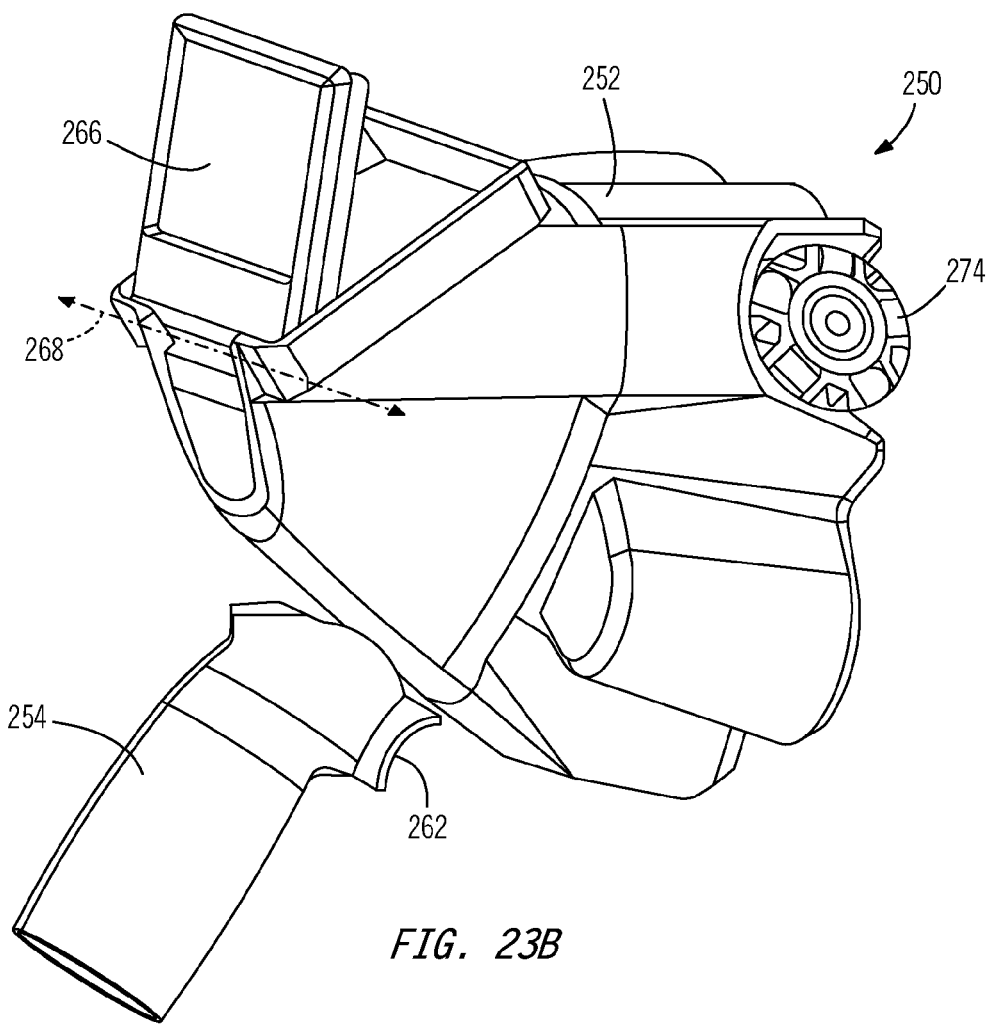

FIGS. 23A and 23B depict the second prototype imager 250. The imager 250 includes a housing 252 and a handle 254. The handle enables a user to grip and support the imager 250 with one hand. With the same hand, a user can access navigation and action buttons, such as a trash button 256, a menu button 258, a trackpad 260, and a trigger 262, while gripping the handle 254. The handle also includes a cavity along its long axis to receive a battery 255. The battery 255 can be rechargeable or single-use, and can be specific to the imager 250 or compatible with other imagers, power tools, or other devices.

The housing 252 includes a display screen 266 for displaying images and a power button 264 for turning the imager 250 on and off. The display screen 266 is rotatable up to approximately 90 degrees, from a closed orientation to an extended orientation, along a connection axis 268. In other embodiments, the display screen 266 is in a fixed position or is able to rotate about multiple axes. In one embodiment, the display 266 is a 4.3 inch liquid crystal display ("LCD") with 480RGB×272 dot pixel resolution and a 24-bit parallel RGB and serial peripheral interface (e.g., LCD model 43WQW1HZ0 by Seiko Instruments, Inc.). The housing 252 also includes tracking wheels 274 for measuring the movement of the imager 250 along a wall surface 56.

FIG. 23B depicts another embodiment of the imager 250 with components similar to those of FIG. 23A, except that tracking wheels 274 are positioned differently and have a structure distinct from tracking wheels 270. The tracking wheels 270 and 274 are examples of location sensors 60 described above and encoder wheels 420 described below.

Figure 23C:
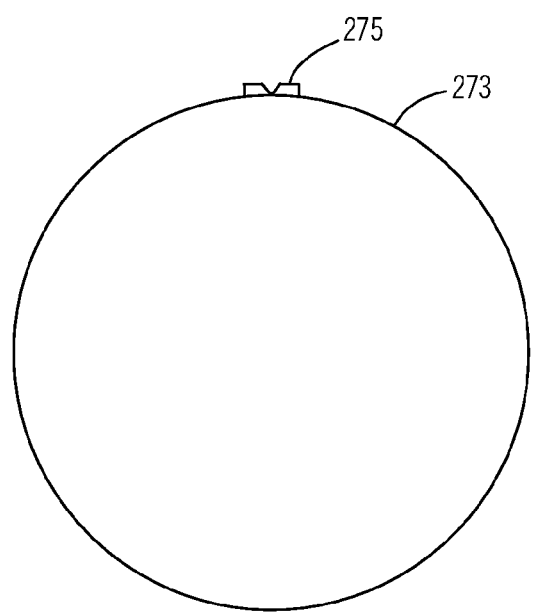

FIG. 23C depicts a notch 275 and an approximate shape 273 of a portion of the imager 250 that faces the wall surface 56 while imaging occurs, according to one embodiment of the invention. The notch 275 allows the user to relate images on the display 266 with a position of the imager 250 on the wall surface 56. The user is able to make a mark on the wall surface 56 by using the notch 275 to guide a marking tool, such as a pen or pencil. For instance, in one embodiment, the display 266 includes a generated image representing an area behind the wall surface 56 and the detected hidden object 48. A center line or marker on the generated image correlates to the position of the notch 275 on the imager 250. Thus, the user relates a location of the generated image to a position of the imager 250 using the notch 275. In some embodiments, the notch 273 has a different shape, such as a guide hole.

Figure 24:
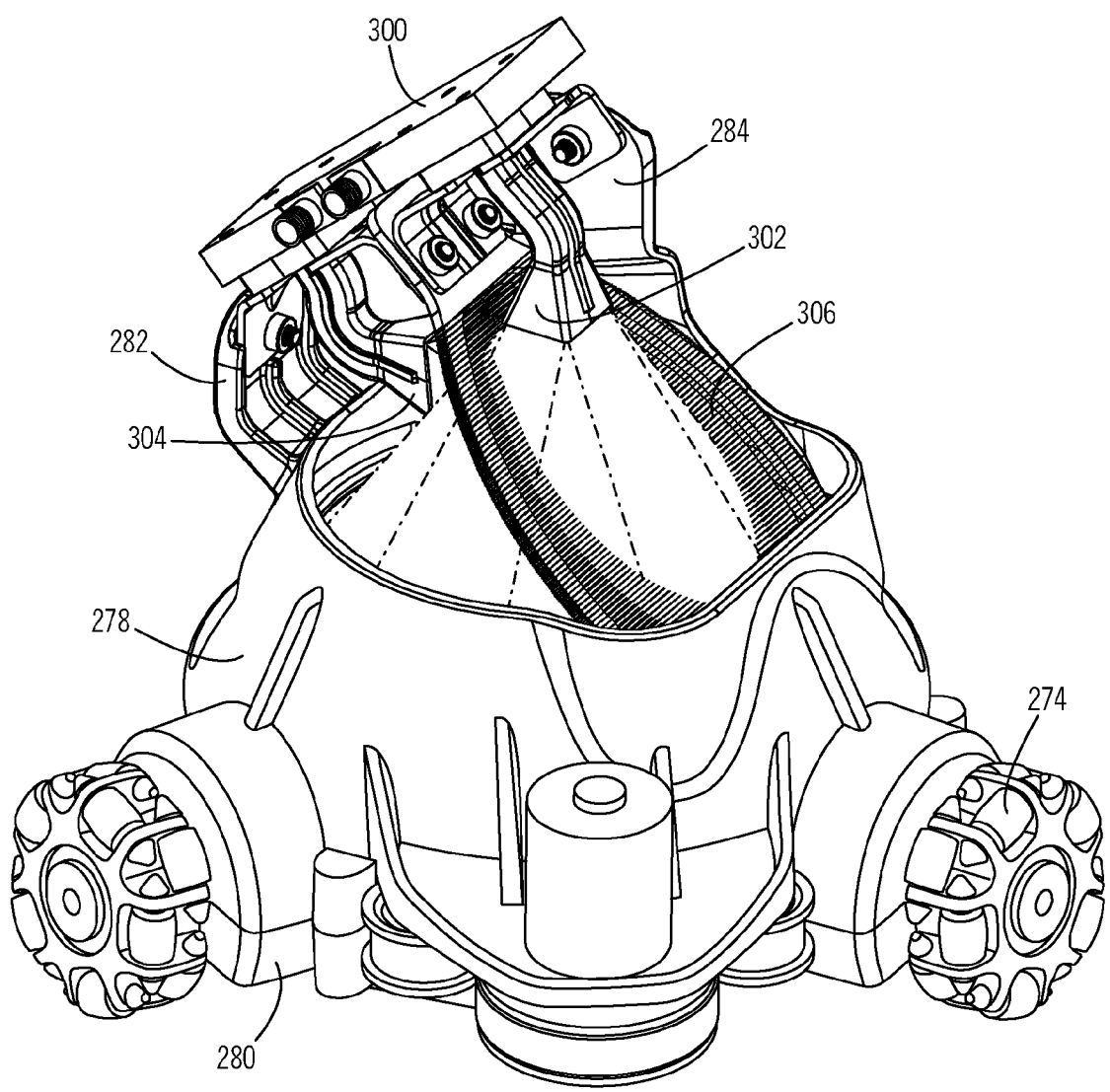
FIG. 24 depicts components of an imaging system according to one embodiment of the invention.

FIG. 24 depicts components inside the housing 252 including an internal retention frame 276 with a top portion 278 and bottom portion 280. During operation, the internal retention frame 276 is enclosed by the housing 252 and generally secured from movement relative to the housing 252. The top portion 278 and bottom portion 280 provide a structure to which internal components of the imager 250 are mounted. A radio frequency ("RF") board 300 is mounted to arms 282 and 284 of the internal retention frame 276. The RF board 300 generates and receives electromagnetic radiation and includes emitter horn 302 and receiver horn 304. A fold mirror 306, which is a polarizing beam splitter, is secured to the RF board 300.

Figure 25:
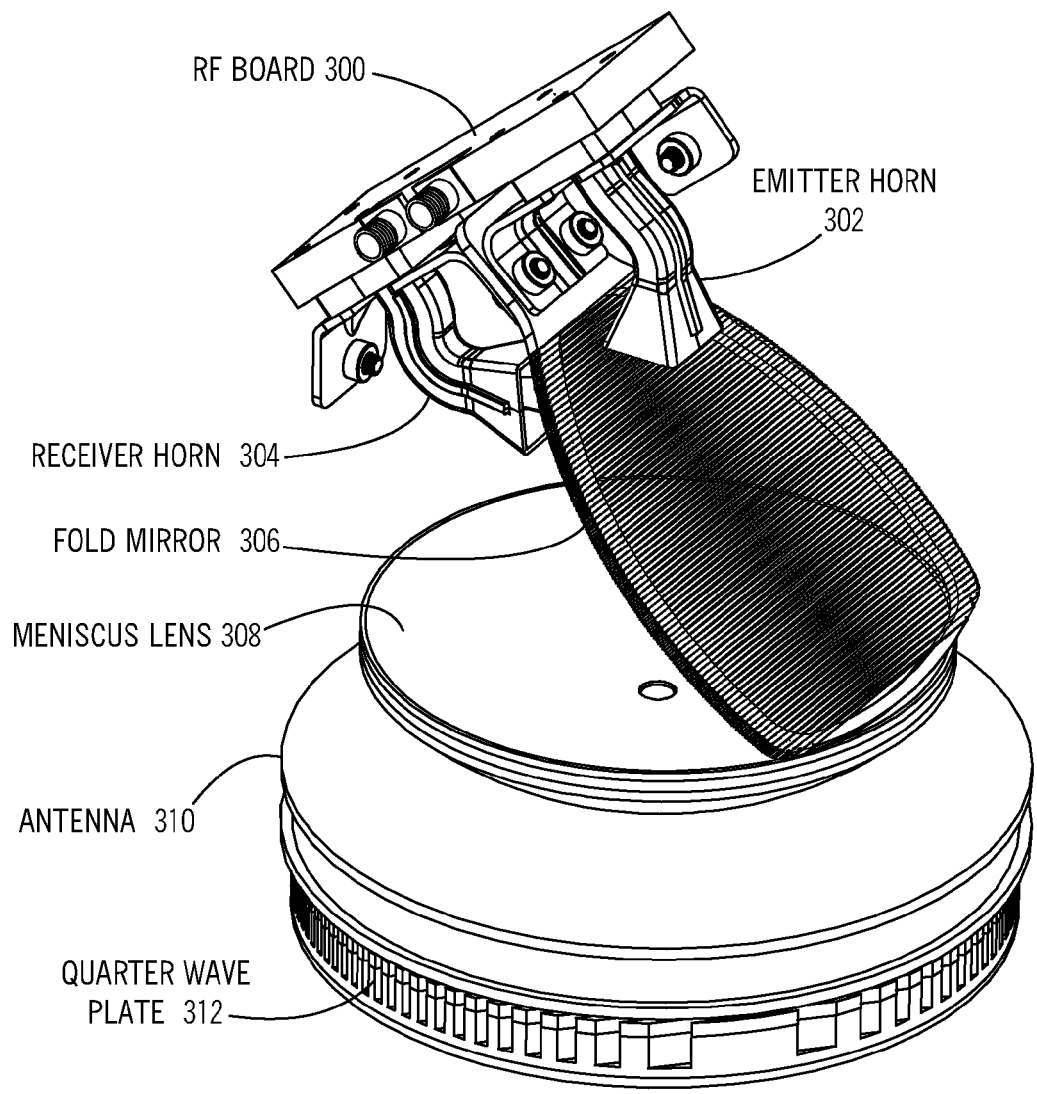
FIG. 25 depicts components of an imaging system according to one embodiment of the invention.

FIG. 25 depicts components used to generate and receive electromagnetic radiation to detect the position of a hidden object 48. These components include the RF board 300, the emitter horn 302, the receiver horn 304, the fold mirror 306, a meniscus lens 308, an antenna 310, and a quarter wave plate 312. FIGS. 26-29 and accompanying text below provide more details with respect to each component.

Figure 26A:
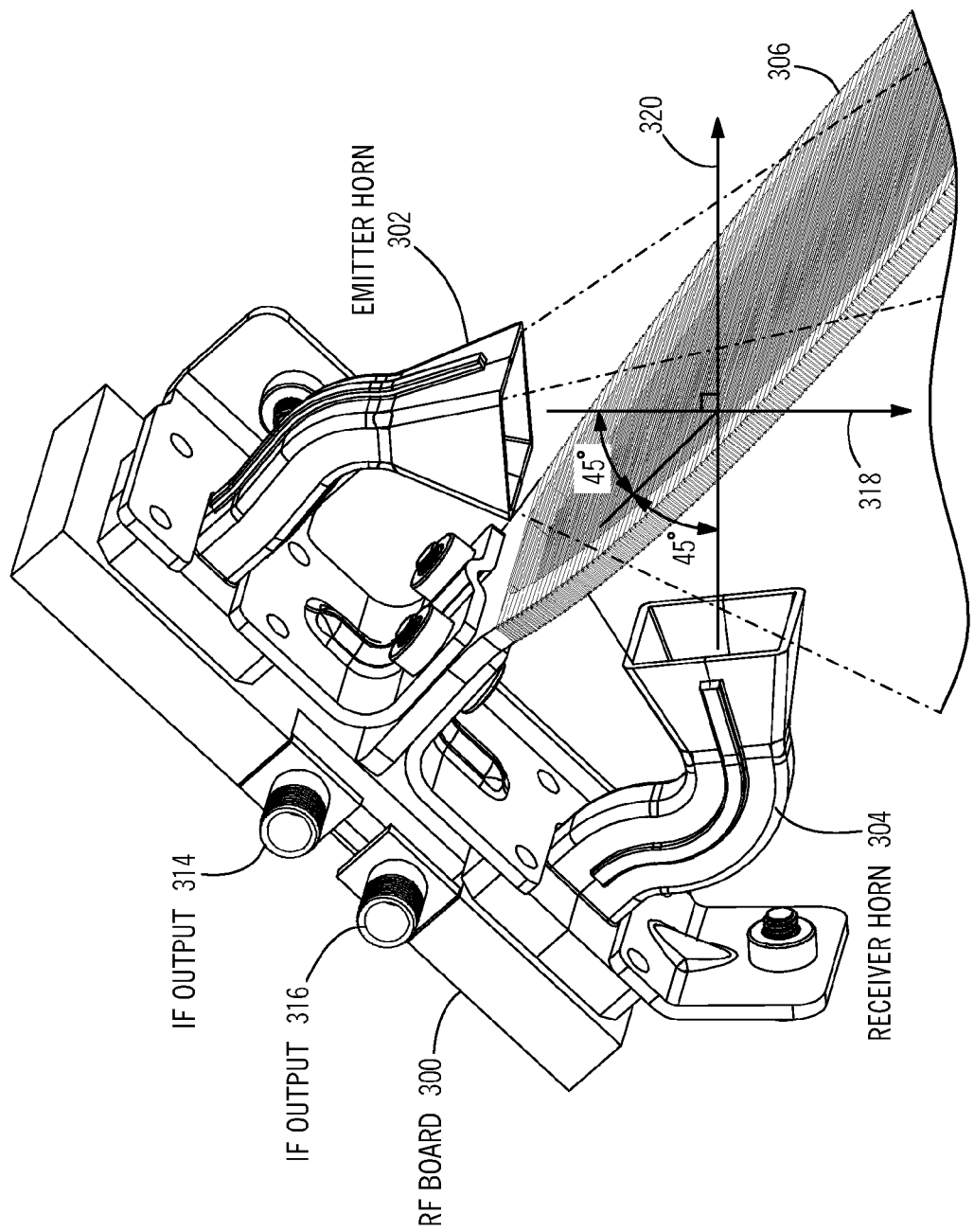
FIG. 26A depicts a radio frequency board and related components according to one embodiment of the invention.

FIG. 26A shows the RF board 300 with emitter horn 302, receiver horn 304, fold mirror 306, and intermediate frequency ("IF") outputs 314 and 316. The RF board 300 generates electromagnetic radiation, which is emitted from the emitter horn 302. The emitter horn is aligned such that an emitting axis 318 intersects the fold mirror 306 at approximately a 45 degree angle. The portion of emitted electromagnetic radiation with an electric field vector perpendicular to the fold mirror 306 passes through the fold mirror 306. Components of the radiation with an electric field vector not perpendicular to the fold mirror 306 are reflected away from the fold mirror 306. The fold mirror 306 limits the amount of emitted radiation that leaks into the receiver horn 304 to prevent radiation from the emitter horn 302 from being falsely interpreted as radiation reflected off an object.

A portion of the emitted radiation is eventually reflected back off of the hidden object 48 towards the RF board 300. The returning radiation, which has an electric field vector perpendicular to the fold mirror 306, is reflected off the fold mirror 306 into the receiver horn 304 along the receiving axis 320. The receiving axis 320 intersects the fold mirror 306 at approximately a 45 degree angle.

The emitter horn 302 and receiver horn 304 are optimized for transmitting electromagnetic radiation over short distances (e.g., several inches) as opposed to long distances (e.g., several miles). In one embodiment, the horns have phase centers in the E-plane and H-plane that originate from a common point and maintain that point as the emission angle changes from the throat of the emitter and receiver horns 302 and 304.

Figure 26B:
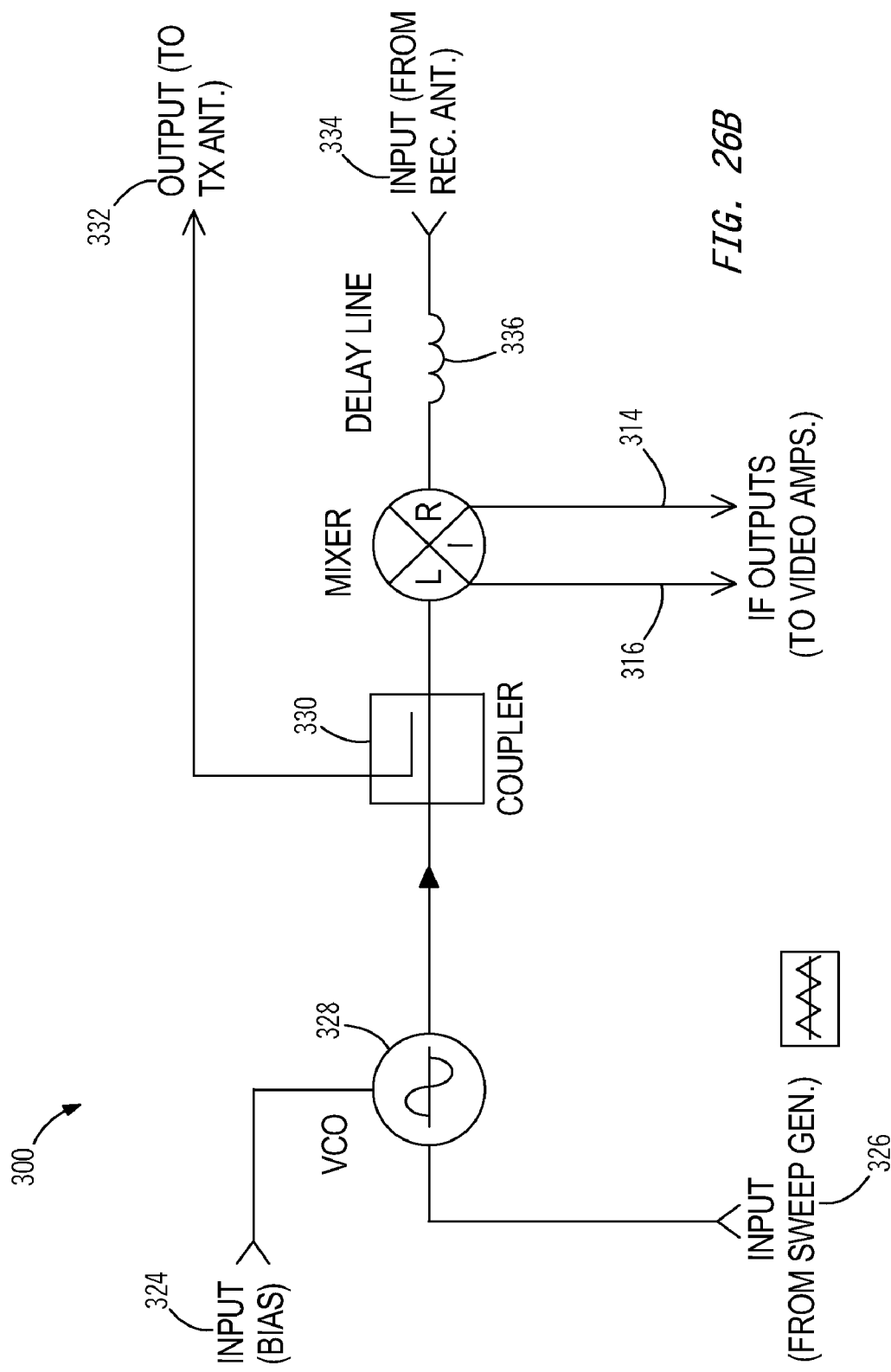
FIG. 26B depicts a circuit diagram for a radio frequency board according to one embodiment of the invention.

FIG. 26B shows a circuit diagram for the RF board 300. The circuit diagram includes an input (bias) 324, which is DC voltage to power a Voltage Controlled Oscillator ("VCO") 328. Input 326, originating from a sweep generator (not shown), receives an electric signal that varies as the generator output sweeps. In one embodiment, the signal has a saw tooth form and the frequency varies from 24.05 to 24.20 gigahertz. Inputs 324 and 326 are received by VCO 328. The VCO 328 outputs a signal with a frequency controllable by the input 326. The oscillating signal output from VCO 328 is received by coupler 330. Coupler 330 is essentially a power splitter, whereby a portion of the received VCO 328 output signal is directed along line 332 to the transmission antenna (not shown) and the remaining portion of the received VCO 328 output signal is directed to the mixer 338. The transmission antenna then emits the electromagnetic radiation, which is guided by the emitter horn 302 generally along the emitting axis 318. In one embodiment, the emitted electromagnetic radiation has a frequency of approximately 24.05 to 24.20 gigahertz, which is within the Industrial Science and Medical (ISM) free K-band. Varying the frequency within the 24.05 to 24.20 gigahertz range creates a frequency modulated continuance wave. In one embodiment, the power of the output electromagnetic radiation is less than one milliwatt.

Reflected electromagnetic radiation is received through receiver horn 304 at a receiving antenna (not shown). The receiving antenna converts the electromagnetic radiation to electric signals along input 334. The signals are subject to a delay along delay line 336, and then enter mixer 338. The mixer 338 also receives a portion of the VCO 328 output signal from the coupler 330 as described above. The mixer then mixes the output signal with the signal received, and the output is sent along IF outputs 314 and 316 to video amplifiers (not shown). By this RF board 300, the processor 64 is then able to detect beat notes from the mixed signal it receives via IF outputs 314 and 316. The beat note frequency and intensity indicate the amount, if any, of the emitted radiation reflected off of a hidden object 48. In some embodiments, the IF outputs are amplified, either before or after reaching the processor 64.

Figure 27:
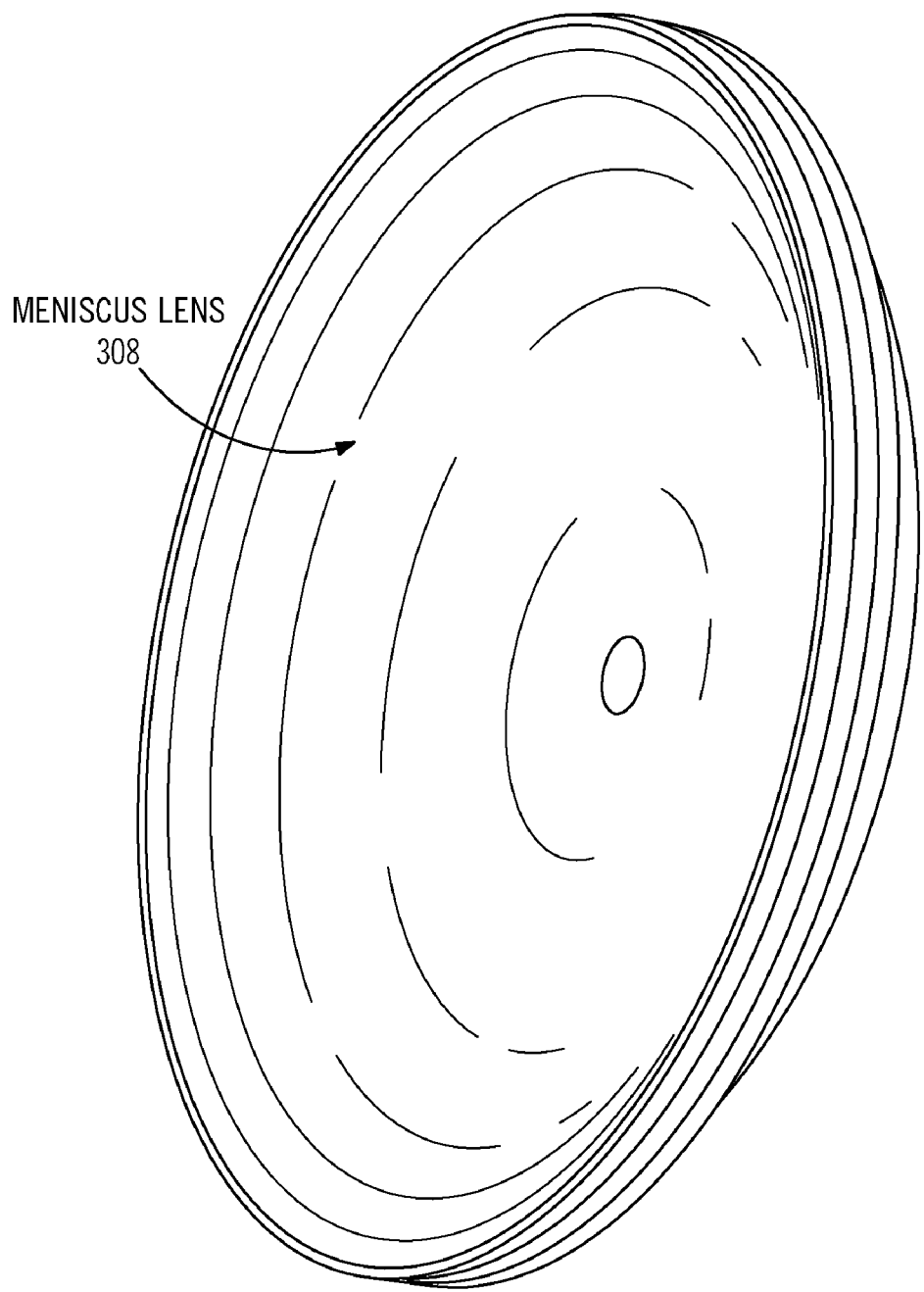
FIG. 27 depicts a meniscus lens according to one embodiment of the invention.

FIG. 27 depicts the meniscus lens 308. The meniscus lens is an aplanatic, circularly symmetric lens. In one embodiment, the meniscus lens is approximately 9.0 mm thick with a radius of approximately 104 mm and is made of a HiK 5.0 material. The electromagnetic radiation that is emitted from the emitter horn 302 passes through the fold mirror 306, and then passes through the meniscus lens 308. The meniscus lens 308 functions to shorten the distance between the antenna 310 and the focal point of the emitted electromagnetic radiation. Thus, a more compact imager housing 252 is possible by using the meniscus lens 308 in addition to the antenna 310, which will be described in more detail below. Radiation that reflects off of an object also passes back through the meniscus lens 308 en route to the fold mirror 306 and receiver horn 304.

In one embodiment, the meniscus lens includes an antireflective layer of low density polyethylene ("LDPE") approximately 2.1 mm thick on one or both surfaces. The antireflective material prevents electromagnetic radiation passing through the meniscus lens, in either direction, from reflecting away and degrading the radiation signal strength. In other embodiments, the meniscus lens 308 uses different, yet similarly functioning, antireflective materials and thickness levels. In other embodiments, a different type and/or thickness of antireflective material is placed on each side of the meniscus lens 308. In other embodiments, only one side of the meniscus lens 308 has a layer of antireflective material.

Figure 28:
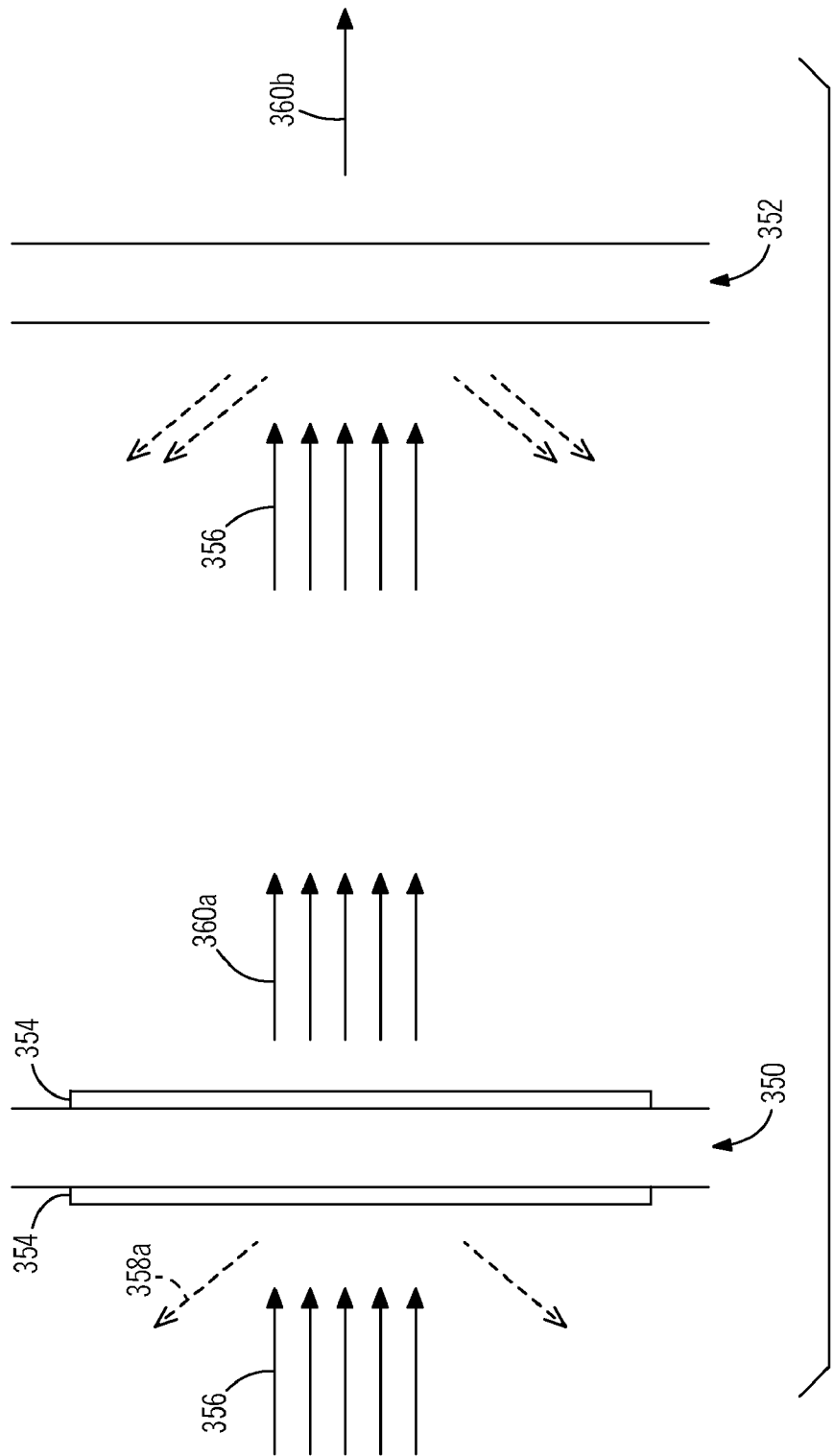
FIG. 28 illustrates behavior of electromagnetic radiation interacting with a lens including an antireflective layer and a lens without an antireflective layer.

FIG. 28 illustrates how an antireflective layer prevents degradation of electromagnetic radiation passing through a lens. The first lens 350 includes antireflective layers 354. When electromagnetic radiation 356 is received at the lens 350, a majority of the radiation 360*a* passes through to the other side. A small amount of radiation 358*a* is reflected off of the lens 350. The second lens 352 does not have an antireflective layer. When electromagnetic radiation 356 is received at the lens 352, a large portion 358*b* is reflected off and less electromagnetic radiation 360*b* passes through to the other side.

Figure 29A:
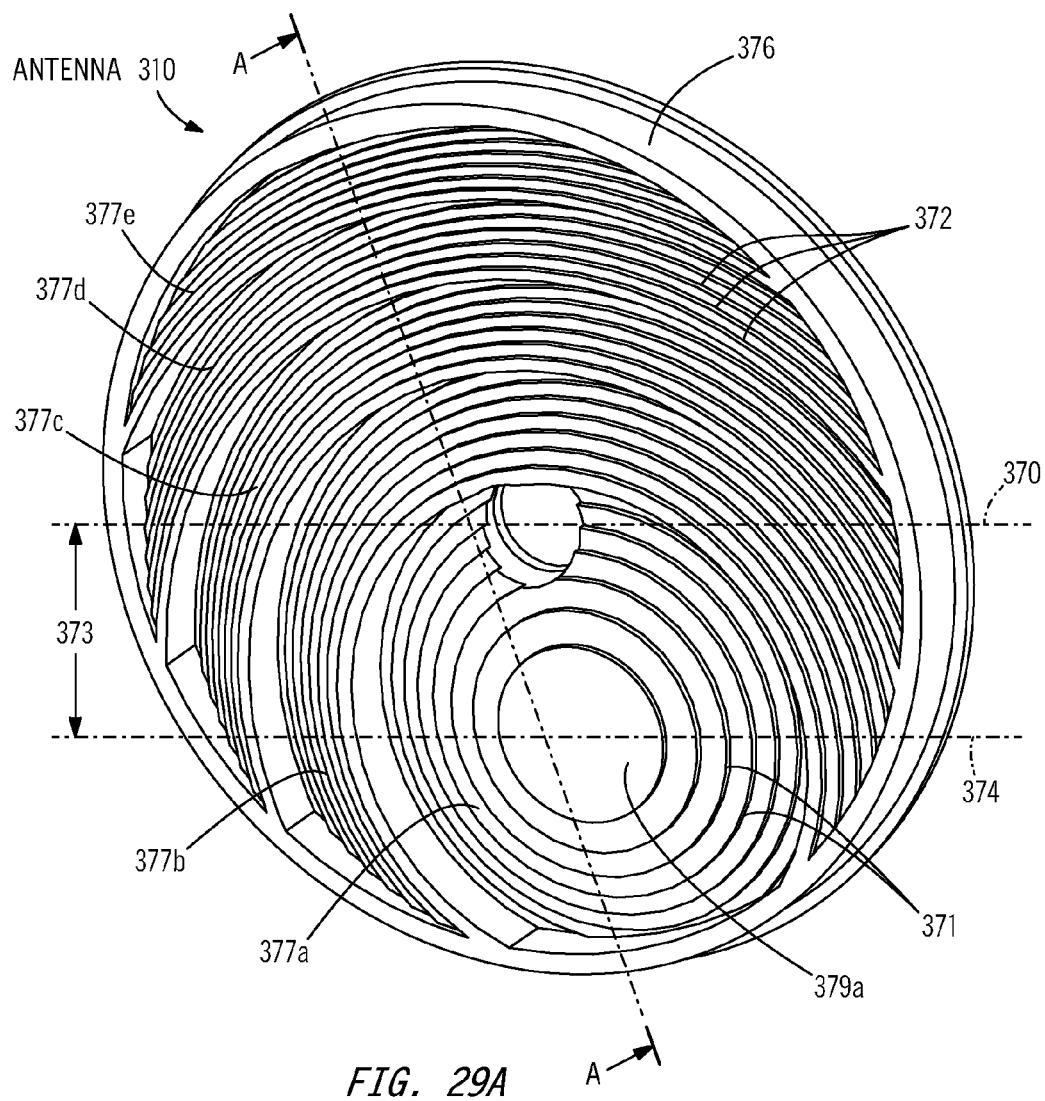
FIG. 29A depicts an antenna according to one embodiment of the invention.

FIG. 29A depicts the quasi-optical antenna 310, which rotates about a rotation axis 370 at its physical center and center of gravity. The antenna 310 is thinner and lighter in weight than a similarly functioning, more traditional antenna or quasi-optical element. Although the antenna 310 can also be implemented using a more traditional quasi-optical element, the element would be up to 152 mm thick. In one embodiment, the antenna 310 has a thickness of approximately 14.35 mm and a diameter of 127 mm.

In one embodiment, the base material of the antenna 310 includes a material with a high dielectric constant. An exemplary high dielectric constant is five (5) and is associated with materials such as Remafin or EccoStockHiK. A high dielectric constant material enables a more compact antenna. Similar to the meniscus lens 308, antireflective layers are on each side of the antenna 310. The antireflective layers are chosen such that they match the dielectric constant of the antenna 310 to minimize the reflections. Generally, as the dielectric constant of a material increases, the more electromagnetic radiation reflects off. Thus, to achieve a set level of antireflectiveness, the antireflective material chosen for a high dielectric constant material should have a higher level of antireflectiveness than the antireflective material chosen for a lower dielectric constant material. An exemplary antireflective material that matches the dielectric constant of the base material of the antenna 310 is a quarter-wave length, LDPE. In other embodiments, a resurgent microstructure layer is used for antireflection.

The antenna 310 is similar in function to a diffractive optical element, but is operable at microwave frequencies. For illustrative purposes, the antenna 310 can be compared with a Fresnel-style lens that has been "compressed" or "flattened." The antenna 310 includes multiple concentric circles 371 and partial circles 372 that center on an optical axis 374 offset a distance 373 from the rotation axis 370. The electromagnetic radiation received from the meniscus lens 308 is redirected by the antenna 310 as the optical axis 374 rotates about the rotation axis 370. As the antenna 310 rotates, it redirects electromagnetic radiation received to form a pattern similar to the pattern of FIG. 8. The antenna 310 also corrects aberrations such as coma and includes a groove 376 along its circumference, which will be described in further detail with respect to the drive mechanisms (e.g., the drive assembly 400 in FIG. 31).

The circles 371 and partial circles 372 are broken up into five zones 377*a-e*. Each zone 377*a-e* includes a combination of eight circles 371 and partial circles 372, also referred to as sub-zones. In some embodiments, more or fewer than five zones are used.

Figure 29B:
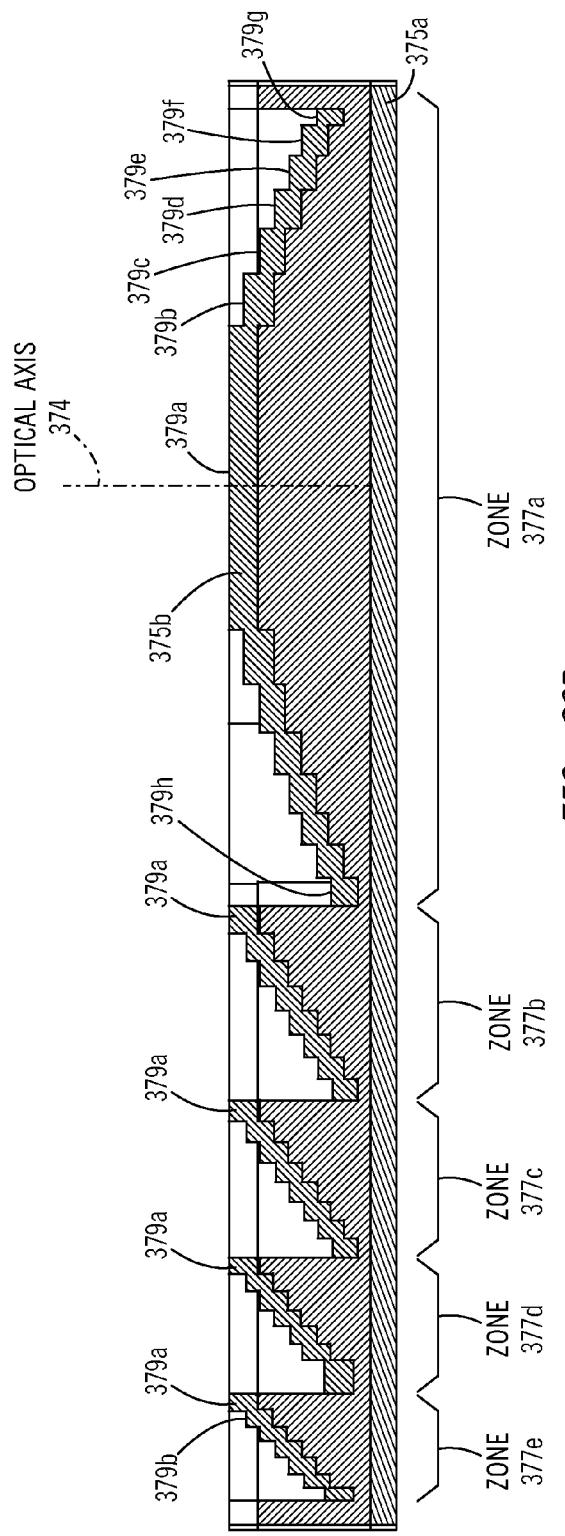
FIG. 29B is a sectional view of the antenna of FIG. 29A taken on a plane shown by A-A.

FIG. 29B shows a sectional view of the antenna 310 along plane A-A according to one embodiment of the invention. The five zones 377*a-e* include seven or eight sub-zones. For example, zone 377*a* includes eight sub-zones 379*a-h*. Sub-zone 379*h* is a partial circle 372; thus, it is only depicted on one side of the optical axis 374. Zones 377*b* and 377*c* include eight sub-zones and zones 377*d* and 377*e* include seven sub-zones. The particular number of sub-zones may vary due to manufacturing tolerance limitations or other design considerations.

In one embodiment, each sub-zone has one of eight approximate thickness levels measured from the bottom antireflective layer 375*a* to the top antireflective layer 375*b*. The sub-zone nearest the optical axis is the thickest, and the thickness of each sub-zone farther from the optical axis 374 decreases. For instance, sub-zone 379*a* is the thickest of zone 377*a*, and each sub-zone 379*b-h* decreases in thickness. In one embodiment, the difference in thickness between sub-zones ranges from approximately 1.25 mm to 2.30 mm. Additionally, the thickness of sub-zones is approximately equal across zones 377*a-e*. For instance, sub-zone 379*a* of each zone 377*a-e* is approximately equal; sub-zone 379*b* of zone 377*a* is approximately equal to sub-zone 379*b* of zone 377*e*; and so on. As is shown in FIG. 29B, however, the exact similarity between sub-zones thicknesses across different zones may vary, particularly due to manufacturing tolerance limitations.

The width of each sub-zone in the radial direction varies. However, the widths of sub-zones nearer to the optical axis 374 are generally larger than the widths of sub-zones farther from the optical axis 374. Likewise, the widths of zones nearer to the optical axis 374 are generally larger than the widths of zones farther from the optical axis 374. In one embodiment, the smallest sub-zone width is roughly 1.3 mm.

The antenna 310 can be formed, for instance, by using injection molding or machining techniques. The contour shape of each zone 377*a-e* reduces the mass and thickness necessary to achieve the desired antenna 310 function. In one embodiment, the antenna 310 is formed with an offset distance 373 of 34.99 mm and creates a scan area of 100 mm. The scan area includes the area of a circle created by the rotation of the focal point of the radiation caused by one full rotation of the antenna 310. See, for instance, the circles pattern of FIG. 5. In another embodiment, the antenna is formed with an offset distance 373 of 29.28 mm and creates a scan area of approximately 80 mm.

Figure 30:
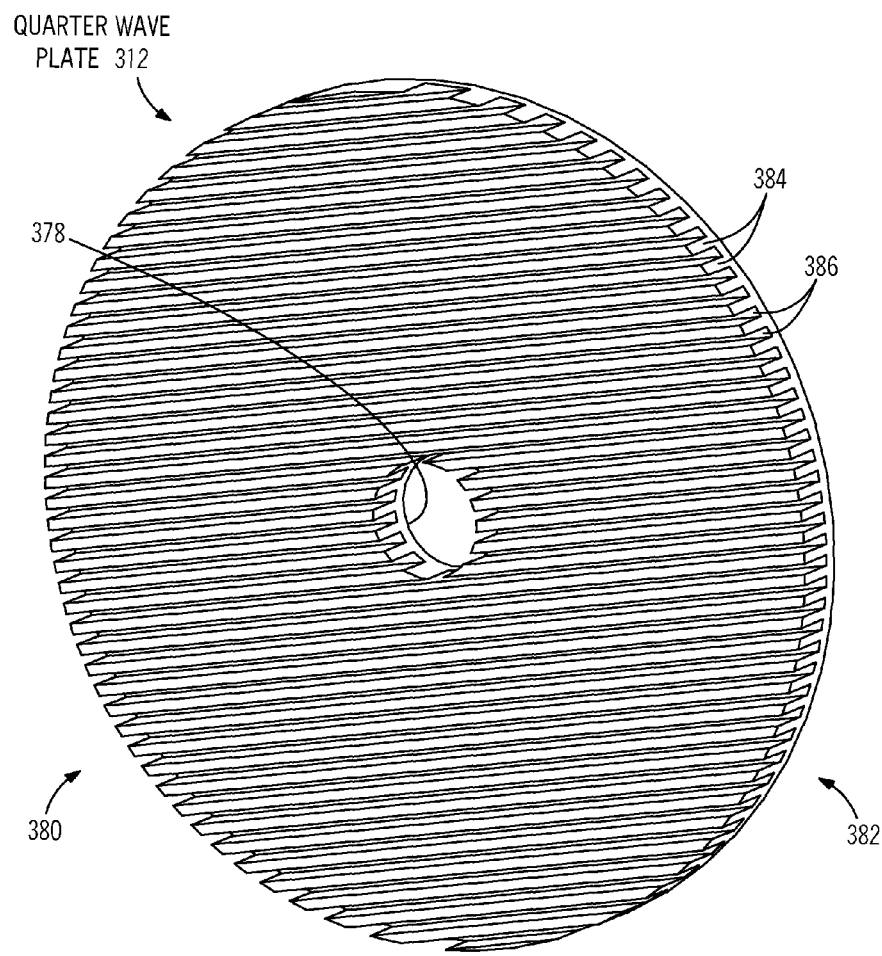
FIG. 30 depicts a quarter wave plate according to one embodiment of the invention.

FIG. 30 depicts the quarter-wave plate (QWP) 312. The QWP 312 serves a function similar to the QWP 36 described above. The QWP 312 is positioned perpendicular to the emitting axis 318 of emitter horn 302. The position of the QWP 312 is also at a 45 degree angle with respect to the fold mirror 306 and the plane of polarization of the radiation outgoing from the fold mirror 306. Unlike the QWP 36, however, the QWP 312 has a circular shape and includes a hole 378 at its physical center. In contrast to the antenna 310, the QWP 312 does not rotate; in other words, it is fixed with respect to the internal retention frame 276. Similar to the QWP 36, the QWP 312 receives linearly polarized electromagnetic radiation and outputs circularly polarized electromagnetic radiation. In contrast to linearly polarized radiation, the circularly polarized radiation is configured to reflect with a similar strength regardless of the horizontal or vertical orientation of the hidden object 48.

In one embodiment, the QWP 312 has a thickness of approximately 13 mm, including two antireflective layers at 1.55 mm and 2.8 mm, a web layer at 2.37 mm, and a base material layer at 6.2 mm. The QWP 312 includes an antireflection layer on each of its front side 380 and back side 382. The front side 380 antireflection layer includes a combination of polyethylene and solid polyethylene. The back side 382 antireflection layer is thicker than the front side 380 and includes a microstructured polyethylene. The web layer of high dielectric constant may be placed between an antireflective layer and the base material layer to hold the structure of the QWP 312 together. The base material can include, for instance, Remafin or EccoStockHiK, with a dielectric constant of five (5). The QWP 312 base material is formed with a series of grooves 386 approximately 6.2 mm deep and 1.55 mm wide. Between each groove 386 is a ridge 384. The overall diameter of the QWP 312 is approximately 125 mm.

Figure 31:
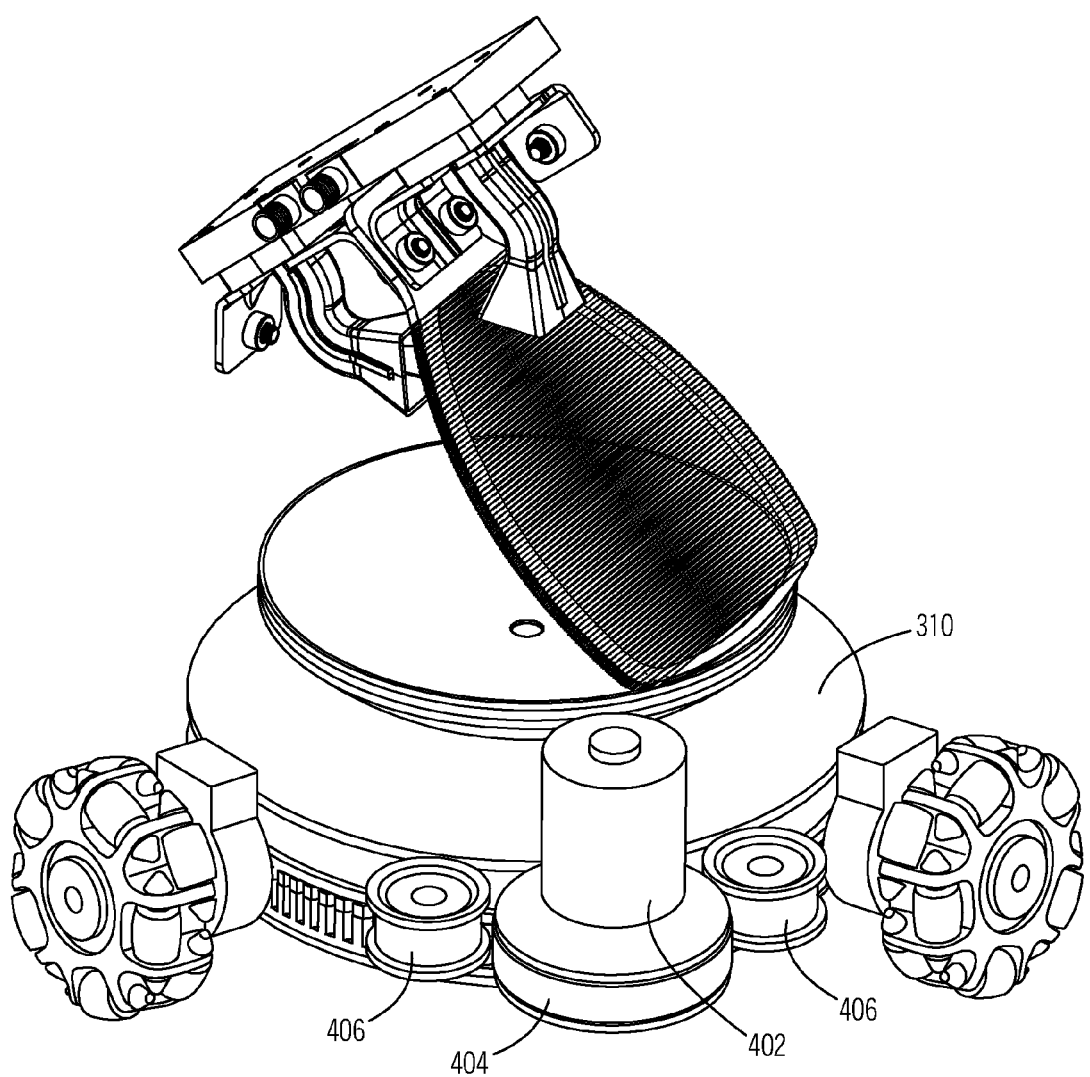
FIG. 31 depicts a drive assembly according to one embodiment of the invention.
Figure 32:
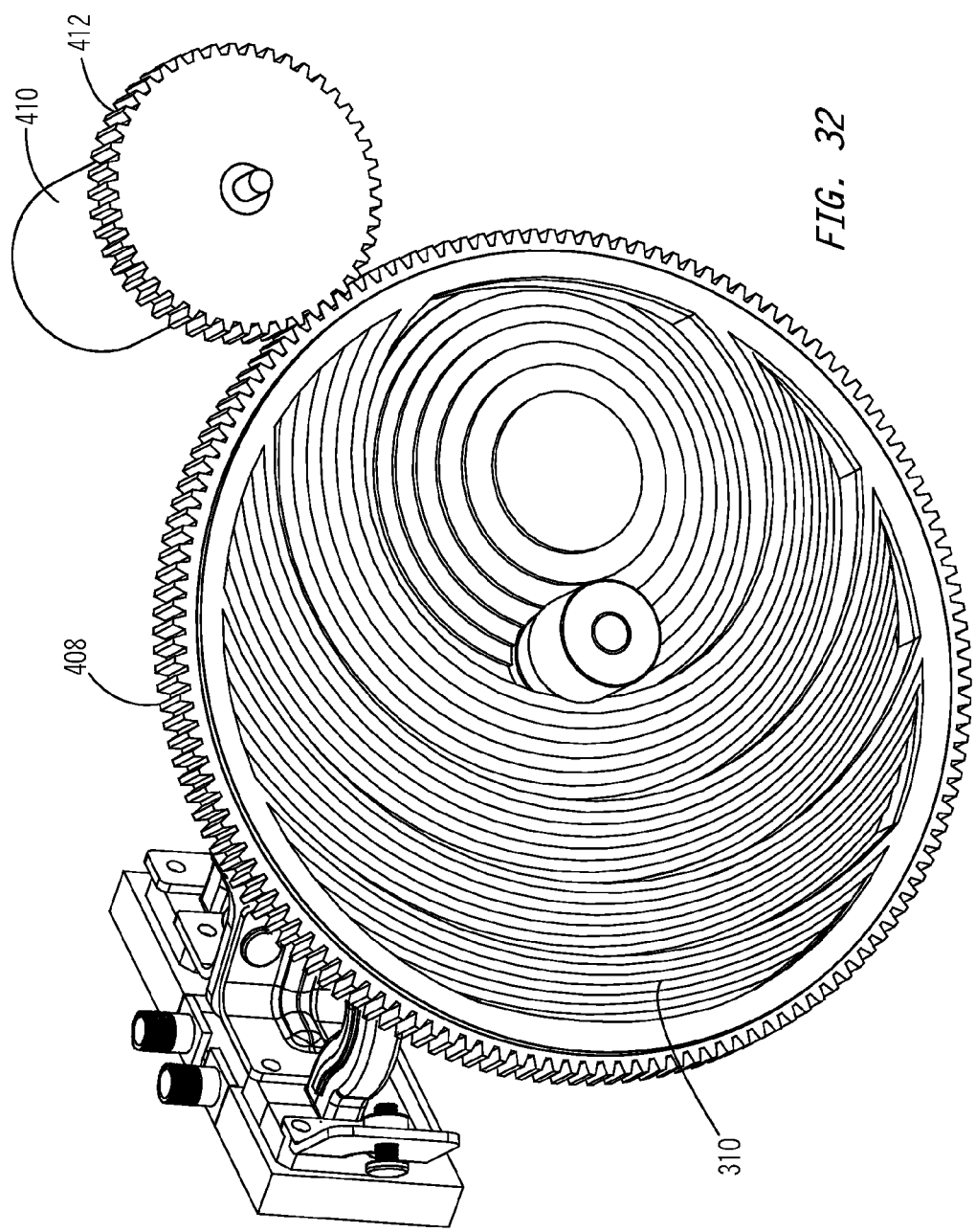
FIG. 32 depicts a drive assembly according to one embodiment of the invention.

FIGS. 31-32 depict separate embodiments of a drive assembly for rotating the antenna 310 similar to the above-described scan mechanism 38. In FIG. 31, a drive assembly 400 uses a motor 402 to rotate a belt 404. The belt 404 is directed by guide wheels 406 and fits into the groove 376 of the antenna 310. As the motor 402 rotates, the belt 404 is rotated and causes the antenna 310 to rotate. In FIG. 32, a band of teeth 408 are secured to the groove 376 of the antenna 310. A motor 410 includes a gear with teeth 412. As the motor 410 rotates the gear with teeth 412, the gear with teeth 412 interlock with the band of teeth 408 to rotate the antenna 310. In another embodiment, similar to the FIG. 6 motor arrangement, a motor is secured to the antenna 310 via the hole at the rotation axis 370.

The amount of data that can be scanned and displayed by the imager 250 is proportional to the speed at which the antenna rotates. For instance, if the imager 250 rotates the antenna at 10,000 rotations-per-minute ("RPM"), the imager 250 will be able to receive and display data faster than if the antenna 310 rotates at 1,000 RPM. In one embodiment, the imager 250 rotates the antenna 310 at a rate of approximately 3,000 RPM. However, other embodiments of the invention can rotate the antenna 310 anywhere from a few hundred RPM to approximately 10,000 RPM. One limiting factor at high RPM, e.g., at some level above 10,000 RPM, is that the signal-to-noise ratio of received radiation reflected off of the hidden object 48 may eventually decrease to the point of inoperability. In other words, the antenna may rotate so fast that the processor 64 cannot interpret the radiation received at the RF board 300 to generate accurate images on the display 266.

Figure 33:
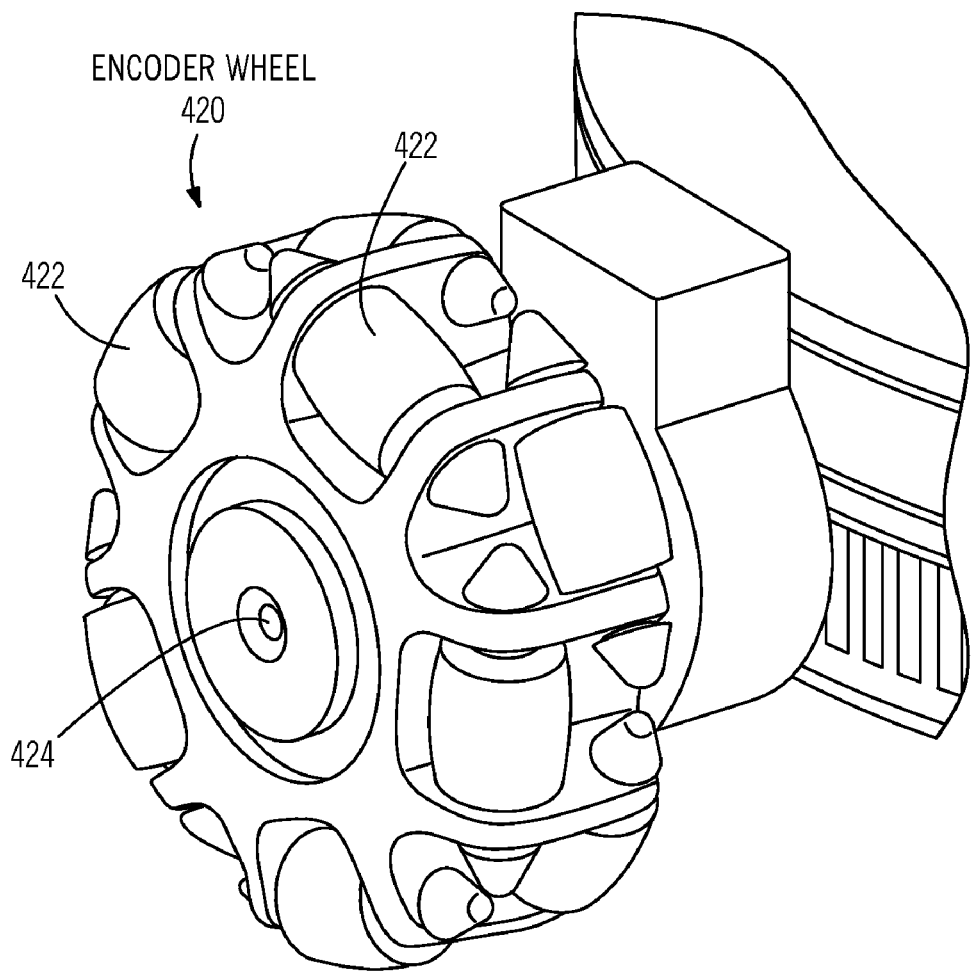
FIGS. 33, 34A-B depict encoder wheels according to one embodiment of the invention.
Figure 34A:
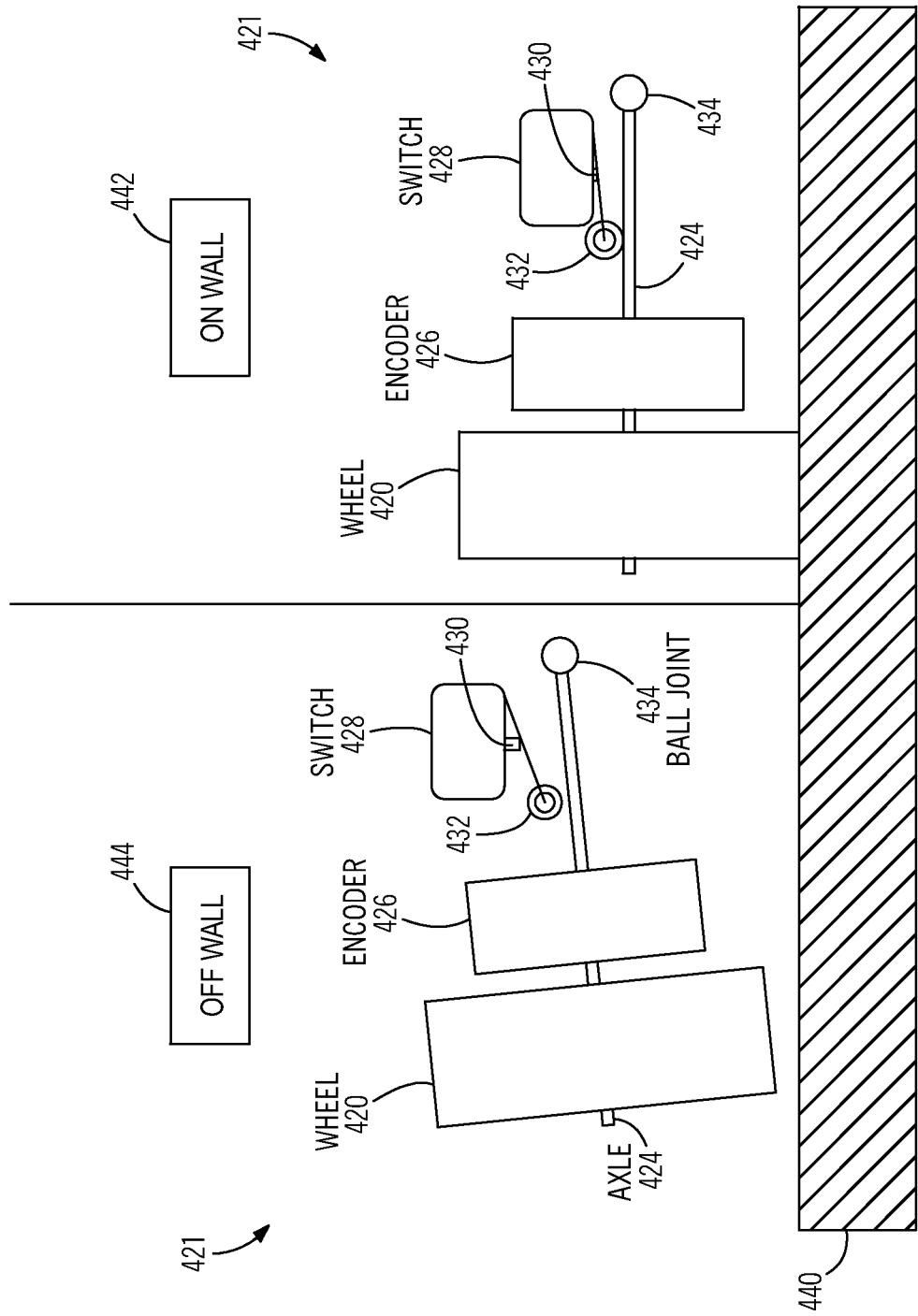
Figure 34B:
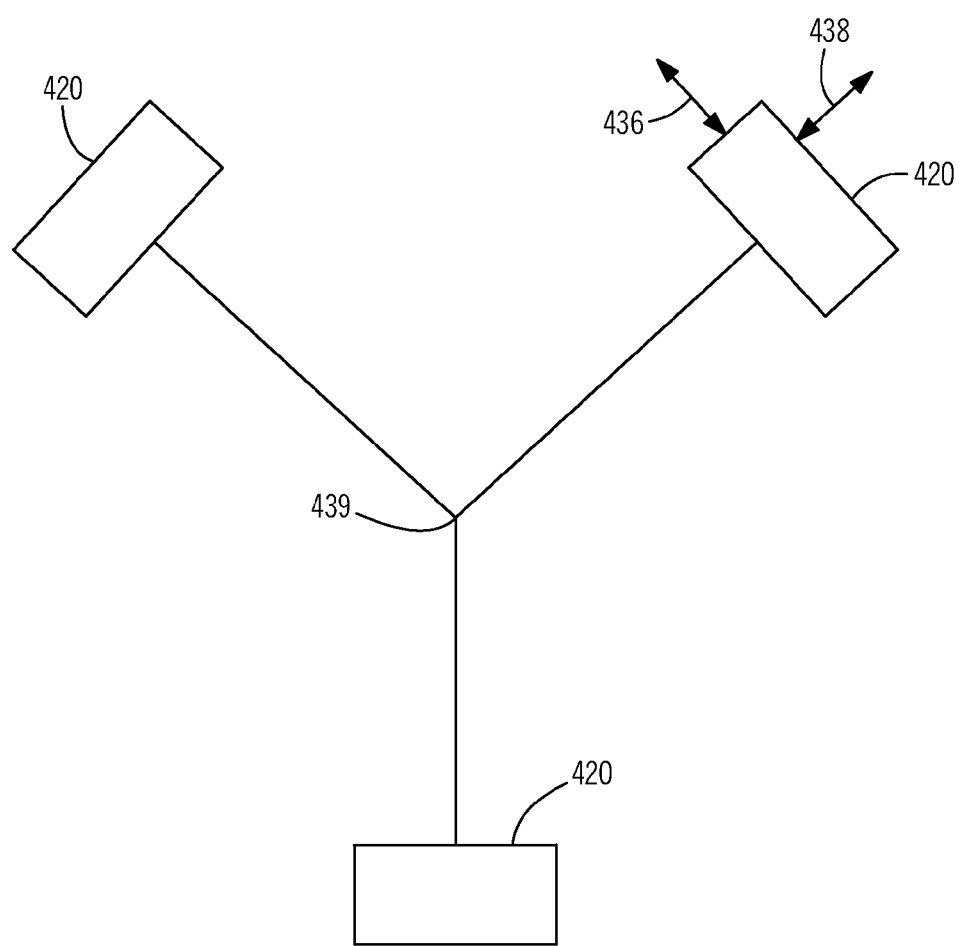

FIGS. 33, 34A, and 34B depict an encoder wheel 420 that is similar to location sensors 60 and that measures the distance the imager 250 travels along a surface. As shown in FIGS. 24 and 31, multiple encoder wheels 420 are used with the imager 250. The encoder wheel 420 rotates about a center axle 424 and the amount of rotation is measured and digitally encoded by an encoder 426 and output to the processor 64 (see FIG. 35). The encoder wheel 420 also includes rotating members 422 that rotate about axes approximately tangential to the circumference of the encoder wheel 420.

The encoding wheel assembly 421 is shown in FIG. 34A and includes the encoder wheel 420, encoder 426, switch 428, and ball joint 434. The switch 428 also includes an activator 430 and contact point 432. When the imager 250 is placed against a surface 440, as shown in the "on wall" position 442, the contact point 432 is forced upwards by the center axle 424. When the contact point 432 is forced upwards, it depresses the activator 430 and sends a signal to the processor 64 to indicate that the imager 250 is in contact with a surface 440. By this arrangement, the RF board 300 of the imager 250 can be prevented from emitting electromagnetic radiation if the imager 250 is not in contact with a surface.

In one embodiment, three encoder wheels 420 are positioned to contact a surface against which the imager 250 is placed. In one embodiment, the three encoder wheels 420 are positioned in a Y formation as shown in FIG. 34B. Each encoder wheel 420 has an approximate circumference of 159.593 mm and outputs 128 counts per revolution about the center axle 424. The arrows 436 and 438 represent directions of rotation of the encoder wheel 420. The encoder wheel 420 encodes movement about the center axle 424 in the directions of arrows 436. The encoder wheel also includes rotation members 422 that allow movement in the direction of arrows 438. By encoding movement about the center axle 424 of each of the three encoder wheels 420, the imager 250 determines the movement of the imager 250 in the x and y position, as well as the rotation about the imager center 439. In other embodiments, fewer or more encoder wheels can be used. Additionally, alternate tracking means may be used in place of encoder wheels, as described above with respect to the location sensors 60 of FIG. 1.

Figure 35:
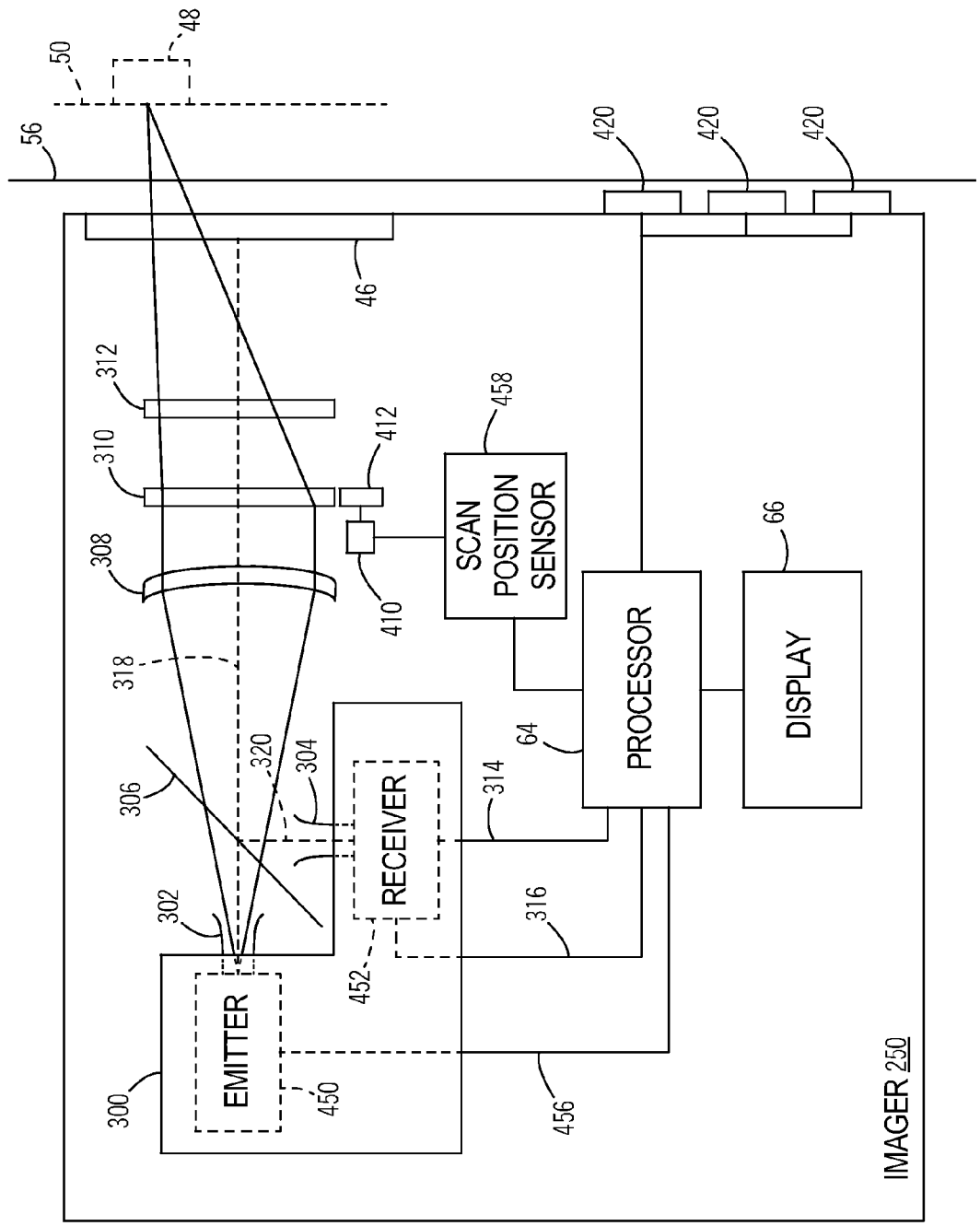
FIG. 35 schematically depicts an imaging system according to one embodiment of the invention.

FIG. 35 depicts a schematic of the imager 250 in accordance with one embodiment of the invention. Components of FIG. 35 with the same reference numbers as components in FIG. 1 are similarly configured. The imager 250 includes an emitter 450 and receiver 452 within the RF board 300. The emitter 450 emits electromagnetic radiation via the emitter horn 302 towards a hidden object 48, while the receiver 452 receives radiation reflected off of the hidden object 48 via the receiver horn 304. After the radiation exits the emitter horn 302, the radiation travels through the fold mirror 306, meniscus lens 308, rotating antenna 310, QWP 312, window 46, and wall surface 56 until the radiation reaches the hidden object 48. A portion of the radiation reflects off of the hidden object 48 back towards the imager 250 and travels through the wall surface 56, the window 46, QWP 312, rotating antenna 310, and meniscus lens 308 until it reaches the fold mirror 306. Returning radiation reflects off of the fold mirror 306 along the receiving axis 320 and enters the receiver 452 via the receiver horn 304. As discussed above, the emitting axis 318 and receiving axis 320 intersect at an approximately 90 degree angle, and the fold mirror 306 is positioned at a 45 degree offset from both the emitting axis 318 and receiving axis 320.

The emitter horn 302 is coupled to the emitter 450 so as to facilitate coupling of the radiation generated by the emitter 450 into free space (e.g., by providing a better impedance match) for propagation towards the hidden object 48. In this embodiment, the emitter 450, in conjunction with the emitter horn 302, generates a diverging cone of radiation beam 319 disposed about the emitting axis 318, which is also referred to as the rotation axis 370. The receiver horn 304 is coupled to the receiver 452 to facilitate coupling of radiation into the receiver 452. In general, the combination of the receiver 452 and receiver horn 304 is capable of receiving radiation beams disposed about the receiving axis 320 with a given angular distribution that depends at least in part on the receiver horn 304 geometry.

The emitter 450 is coupled to the processor 64. The processor 64 is configured to output signals to cause the emitter 450 to start and stop emitting radiation. The processor 64 is coupled to the receiver 452 via IF outputs 314 and 316. The processor 64 receives signals along IF outputs 314 and 316 indicative of the received radiation reflected off of the hidden object 48. The processor 64, in turn, translates the signals received along IF outputs 314 and 316 into image data, which it outputs to the display 266 along connection 458. The display 266 translates the image data into an image on the screen of the display 266.

FIG. 35 also depicts the motor 410 and gear with teeth 412, which rotate the antenna 310. The scan position sensor 42 provides the signals received from the processor 64 to the motor 410 to cause rotation of the antenna 310. In addition, the scan position sensor 42 detects the position and rotation of the motor 410 and provides this information to the processor 64. The processor 64 also receives the imager 250 movement information from the encoder wheels 420 to determine the change in position of the imager 250 relative to the wall surface 56.

The position and rotation information detected by the motor position sensor 460, along with the tracking information provided by the encoder wheels 420, are used by the processor 64 to determine the location of the imager 250 when it emits and receives radiation. The processor 64 is configured to associate the receiver data provided along IF outputs 314 and 316 with the imager 250 location data to determine the location of the hidden object 48 and generate an image for the display 266. Exemplary calculations used to determine the location of the hidden object 48 and generate an image for the display 266 are described in greater detail above.

In one embodiment, the distance between the emitter 450 and the hidden object 48 is approximately 174 mm and the distance between the emitter 450 and the wall surface 56 is approximately 117 mm. In one embodiment, the emitter 450 is separated from the meniscus lens 308 by approximately 71 mm; the meniscus lens 308 is separated from the antenna 310 by approximately 1 mm; the antenna 310 is separated from the QWP 312 by approximately 2 mm; and the QWP 312 is separated from the window 46 by approximately 1 mm.

Figure 36:
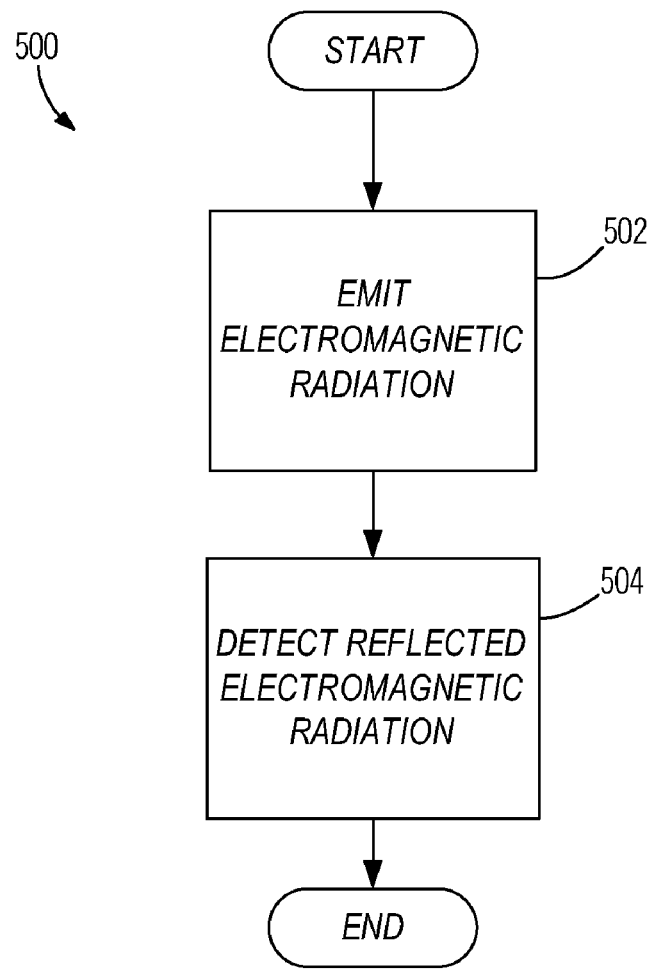
FIG. 36 depicts a process for obtaining image data according to one embodiment of the invention.

FIGS. 36-47 relate to processes for obtaining and using image data obtained by, for instance, the imager 250. Although the processes are explained in relation to the imager 250, the imager 250 is merely an example of an imager that may be used to implement the processes. FIG. 36 illustrates a process 500 of obtaining image data with the imager 250. In step 502, the imager 250 emits electromagnetic radiation towards the hidden object 48. A portion of the electromagnetic radiation reflects off of the hidden object 48 and the imager 250 detects the reflected radiation in step 504. Thereafter, the imager 250 can manipulate, display, and save the image data generated based on the reflected radiation.

Figure 37A:
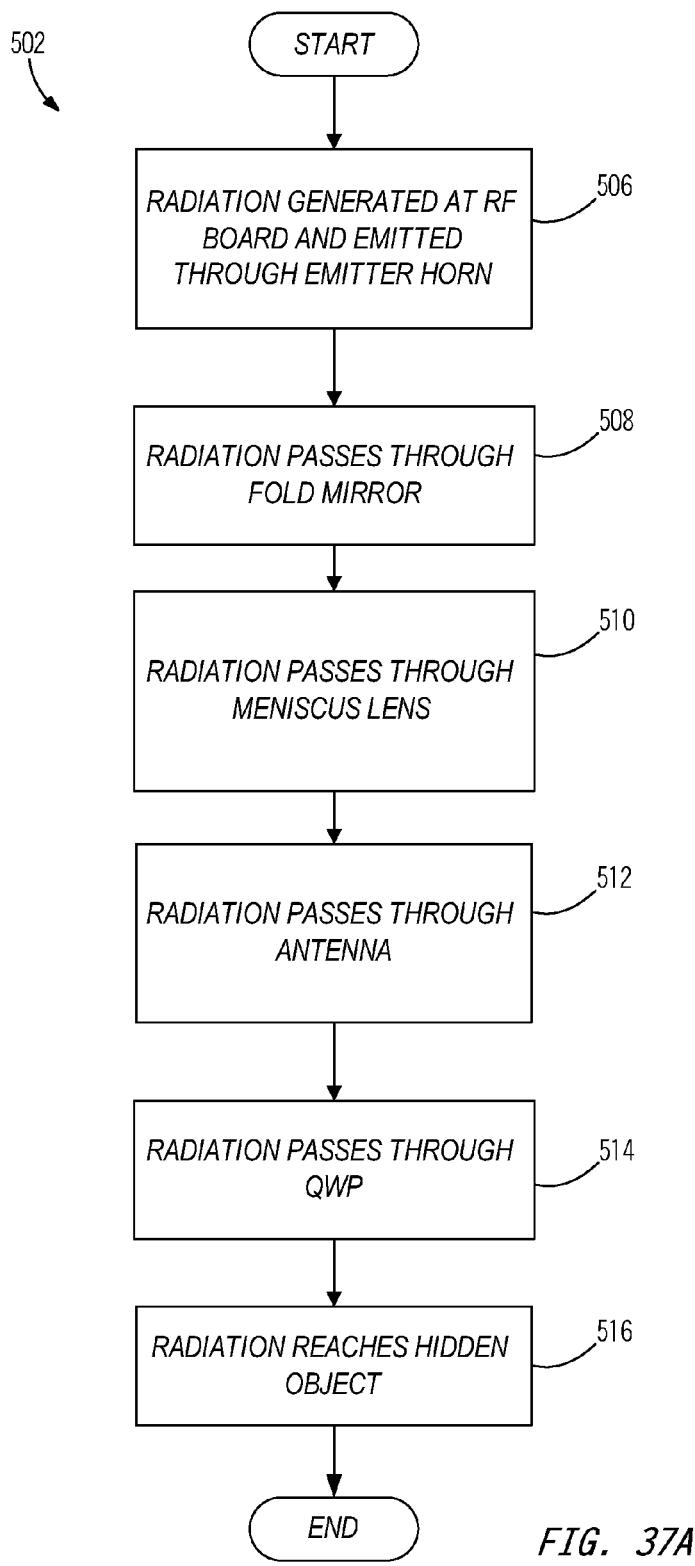
FIG. 37A depicts a process for emitting electromagnetic radiation according to one embodiment of the invention.

FIG. 37A illustrates the process of emitting electromagnetic radiation of step 502 in greater detail. In step 506, radiation is generated by the RF board 300 and directed via emitter horn 302 along emitting axis 318. The radiation proceeds to a fold mirror 306 in step 508, where components of the radiation with an electric field vector not perpendicular to the fold mirror 306 are reflected away. In step 510, radiation that passes through the fold mirror 306 continues to the meniscus lens 308, which shortens the distance between the antenna 310 and the focal point of the radiation.

In step 512, the radiation continues to the rotating antenna 310, where the radiation is redirected to the focal point of the antenna 310. The redirected radiation passes through the QWP 312 in step 514. The QWP 312 receives linearly polarized electromagnetic radiation from the antenna 310 and outputs circularly polarized electromagnetic radiation towards the hidden object 48. In step 516, the circularly polarized electromagnetic radiation from the QWP 312 reaches the hidden object 48.

Figure 37B:
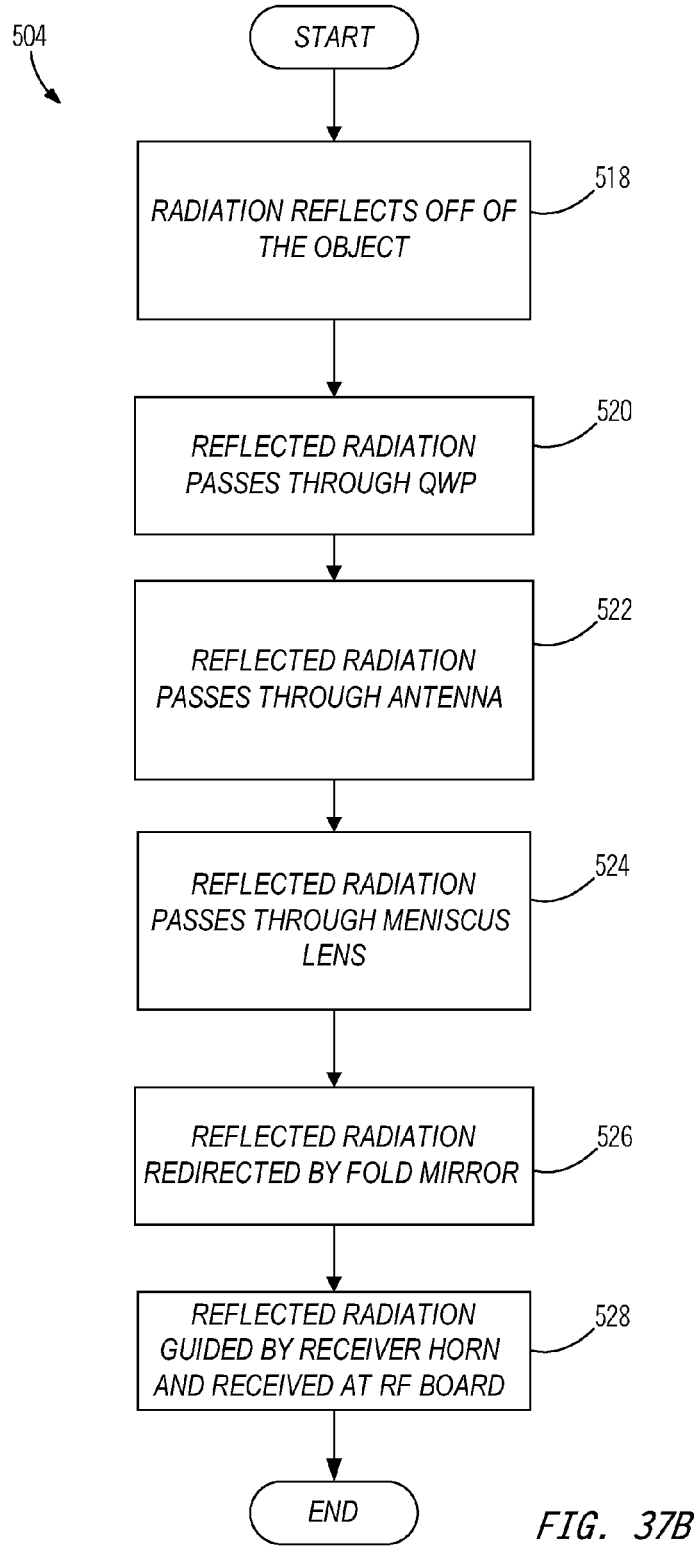
FIG. 37B depicts a process for receiving reflected electromagnetic radiation according to one embodiment of the invention.

FIG. 37B illustrates the process of detecting reflected electromagnetic radiation of step 504 in greater detail. In step 518, the radiation that reaches the hidden object 48 is reflected. A portion of the reflected radiation is directed back toward the QWP 312. In step 520, the QWP 312 receives the reflected radiation, which is circularly polarized, and outputs linearly polarized radiation toward the antenna 310. In step 522, the reflected radiation passes through the rotating antenna 310 and proceeds through the meniscus lens 308 in step 524. The reflected radiation continues to the fold mirror 306 in step 526, where the reflected radiation is redirected along the receiving axis 320. The reflected radiation travels along receiving axis 320 to the receiver horn 304 and into the RF board 300, where the reflected radiation is detected in step 528.

Figure 38:
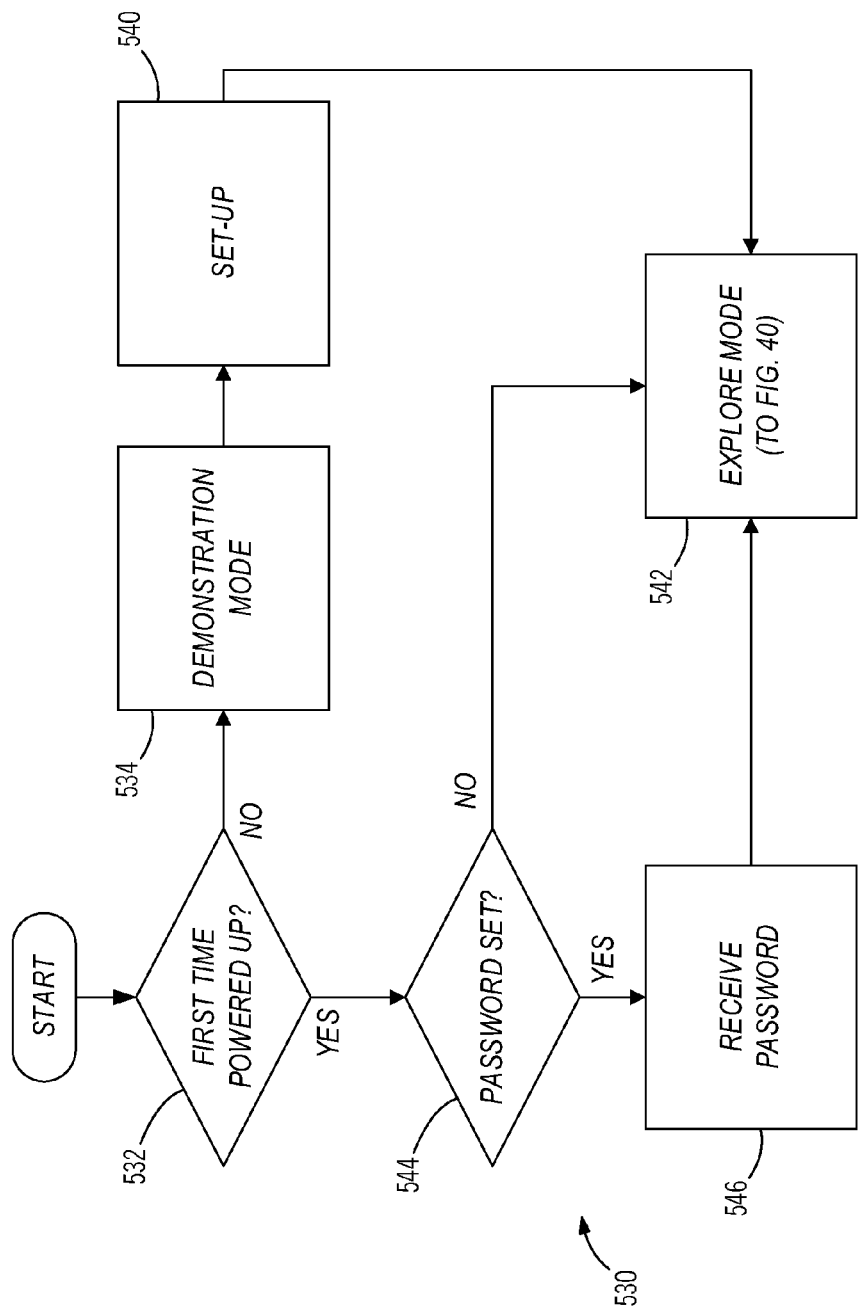
FIG. 38 depicts a process for operating an imager upon power-up according to one embodiment of the invention.
Figure 39:
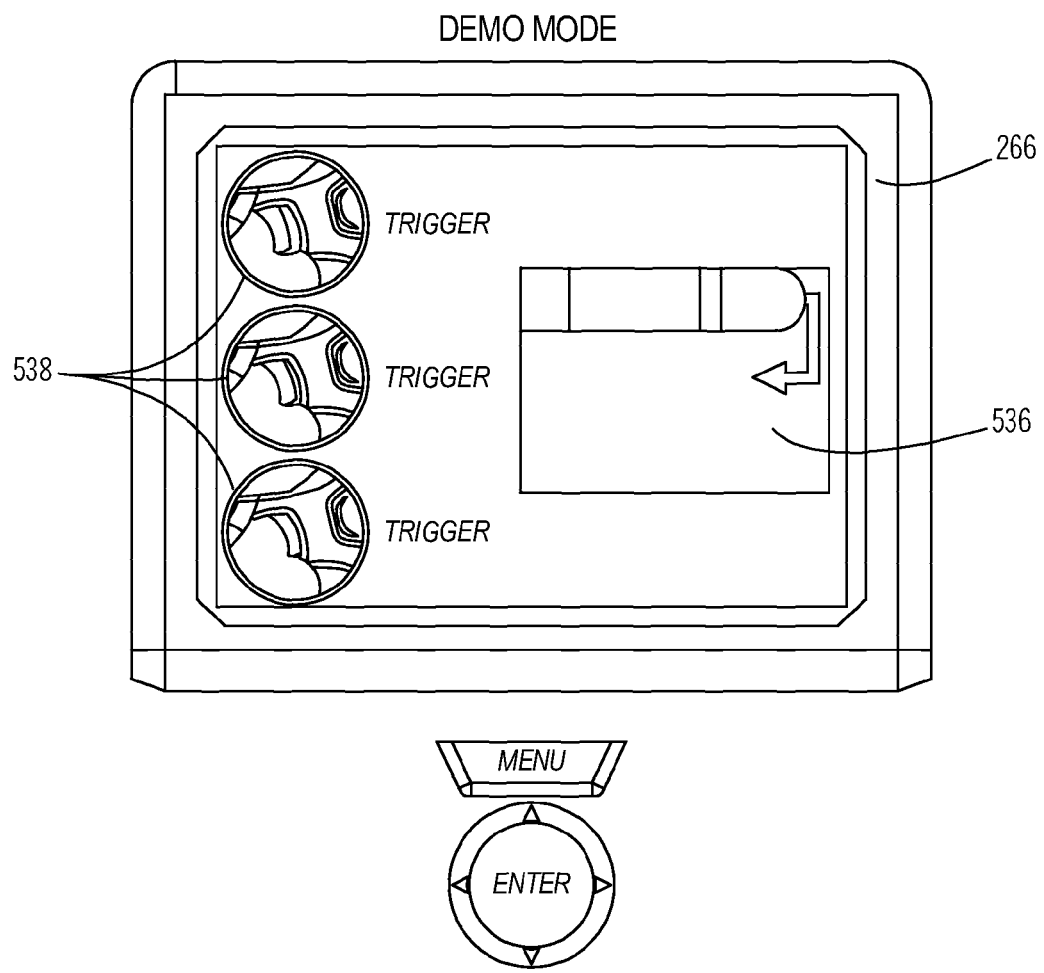
FIG. 39 illustrates a demonstration mode of an imager according to one embodiment of the invention.

FIG. 38 illustrates a process 530 of operating the imager 250 upon power-up. In step 532, the imager determines whether this power-up is the first time the imager 250 has been turned on by a user. If this power-up is the first of the imager 250, a demonstration mode begins in step 534. The demonstration mode of step 534 is illustrated in FIG. 39. In FIG. 39, the display 266 displays a demo area 536 and trigger instruction area 538. Upon entering the demonstration mode, the demo area 536 is animated to illustrate the sweeping motion of the imager 250 across the wall surface 56 in, for instance, the quadrant mode (described with respect to FIG. 42). The trigger instruction area 538 indicates that the user is to depress the trigger 262 as the imager 250 is moved across the wall surface 56 to obtain images.

Returning to FIG. 38, after demonstration mode, the imager 250 proceeds to a set-up step 540. In the set-up step 540, the user can set the date and time of the imager 250, set up a password to identify the user and/or protect unauthorized use of the imager 250, and adjust screen settings (e.g., contrast or brightness). In some embodiments, the set-up step 540 occurs before the demonstration mode step 534.

After set-up in step 540, the process 530 proceeds to an explore mode step 542, where the imager 250 enters into the explore mode. The explore mode is further described in conjunction with FIGS. 40-41. In some embodiments, the process 530 proceeds to a main menu screen or a different imager mode after the set-up step 540.

If the imager 250 has been used before, in step 544, the imager 250 determines if a password has been set. If no password has been set, the imager 250 enters the explore mode in step 542. If a password has been set, a password screen is displayed on display 266 in step 546 and a password is received. The password can be entered by a user, for instance, using the trackpad 260 or other input buttons. In some embodiments, a user or login name is used in conjunction with a password. The imager 250 may save and associate each user's settings with a particular login name. After the user enters the password, the imager 250 begins the explore mode in step 542.

In some embodiments, the process 530 cannot proceed beyond step 546 until a correct password has been entered. In other embodiments, the process 530 proceeds to explore mode in step 542 even without a correct password, but the imager 250 will operate in a safe mode. In the safe mode, certain features are not available to the user. For instance, in the safe mode, the user is prevented from deleting or modifying saved files. In some embodiments, the process 530 proceeds to a main menu screen or a different imager mode after the password steps of 544 and 546.

Figure 40:
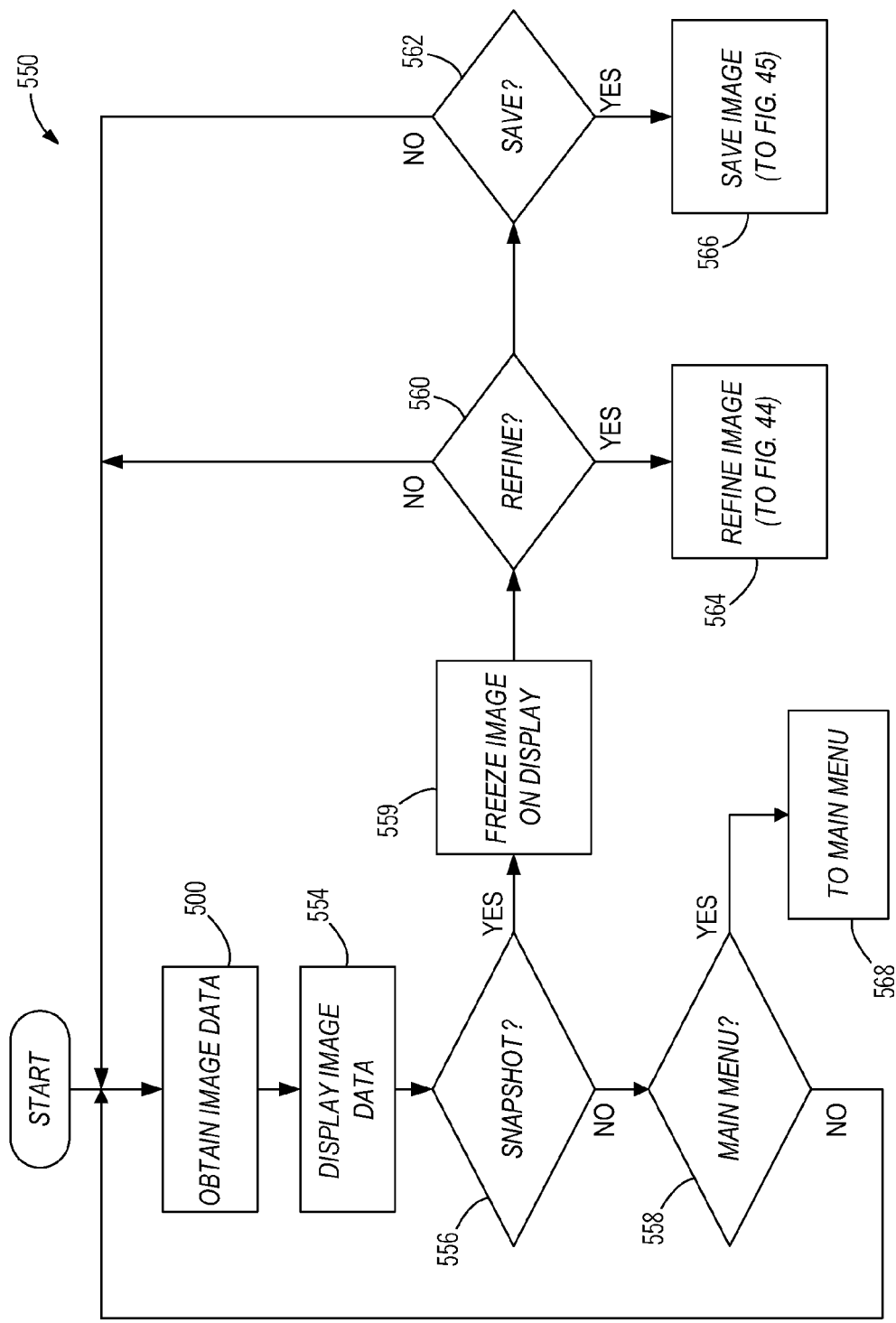
FIG. 40 depicts a process for executing an explore mode of the imager according to one embodiment of the invention.
Figure 41:
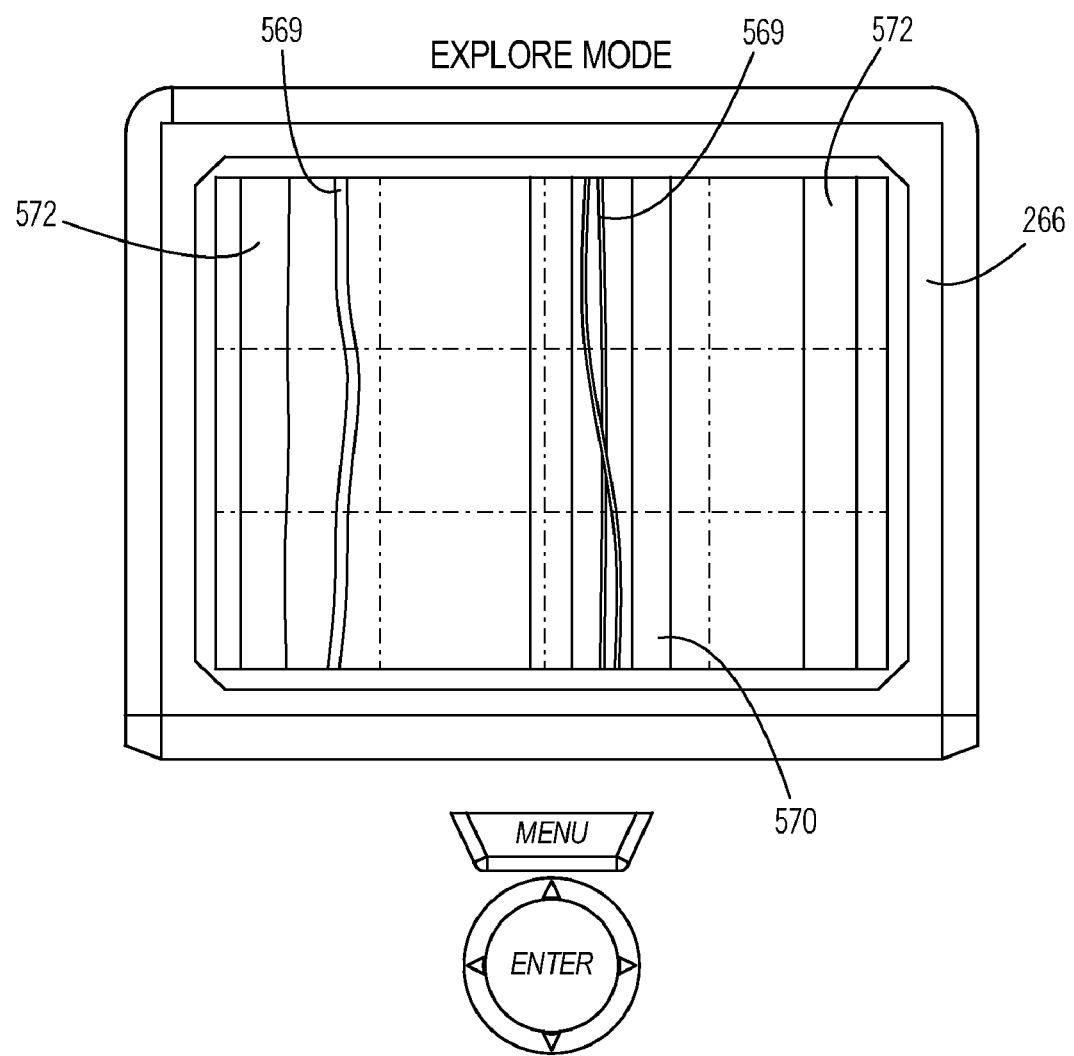
FIG. 41 illustrates an explore mode of an imager according to one embodiment of the invention.

FIG. 40 depicts an explore mode process 550. After entering the explore mode process 550, the user places the imager 250 against a wall surface 56 and depresses the trigger 262 to start imaging. The process 550 begins with obtaining image data using process 500 of FIG. 36. The imager 250 uses the received image data to generate and display an image on display 266 in step 554. FIG. 41 depicts the display 266 during the explore mode showing wires 569, a pipe 570, and wood studs 572. The image displayed is continuously updated by newly received image data until the user 1) releases the trigger 262, 2) pulls the imager 250 away from a wall surface 56, 3) takes a snapshot in step 556, or 4) selects the main menu in step 558.

In step 556, upon the imager 250 detecting receipt of a user request for a snapshot, the imager 250 proceeds to step 559. The request for a snapshot can be made by, for instance, the user inputting the request via input buttons such as the trackpad 260, the user releasing the trigger 262, or the user pulling the imager 250 away from the wall surface 56 while image data is being displayed in the explore mode. In step 559, the imager 250 freezes the current image on the display 266. The user can then use the trackpad 260 or other input buttons to select the refine mode in step 560 or to save the image in step 562. If the user selects refine mode in step 560, the imager proceeds to step 564 to enter the refine mode (see FIG. 44). If the user selects to save the image in step 562, the imager 250 proceeds to step 566 to save the image (see FIG. 45). Otherwise, upon the imager 250 being placed upon the wall surface 56 and re-depressing the trigger 262 or another input button, the imager 250 returns to the start of the explore mode.

If the main menu is selected in step 558, the imager 250 displays the main menu on display 266 in step 568. The main menu allows a user to select different imager modes or return to the set-up step 540 of FIG. 38. The imager modes include, for instance, the explore mode (FIG. 40), quadrant mode (FIG. 42), refine mode (FIG. 44), and demonstration mode (FIG. 39). Generally, the user can escape from the current mode and reach the main menu at any point by depressing the menu button 258.

Figure 42:
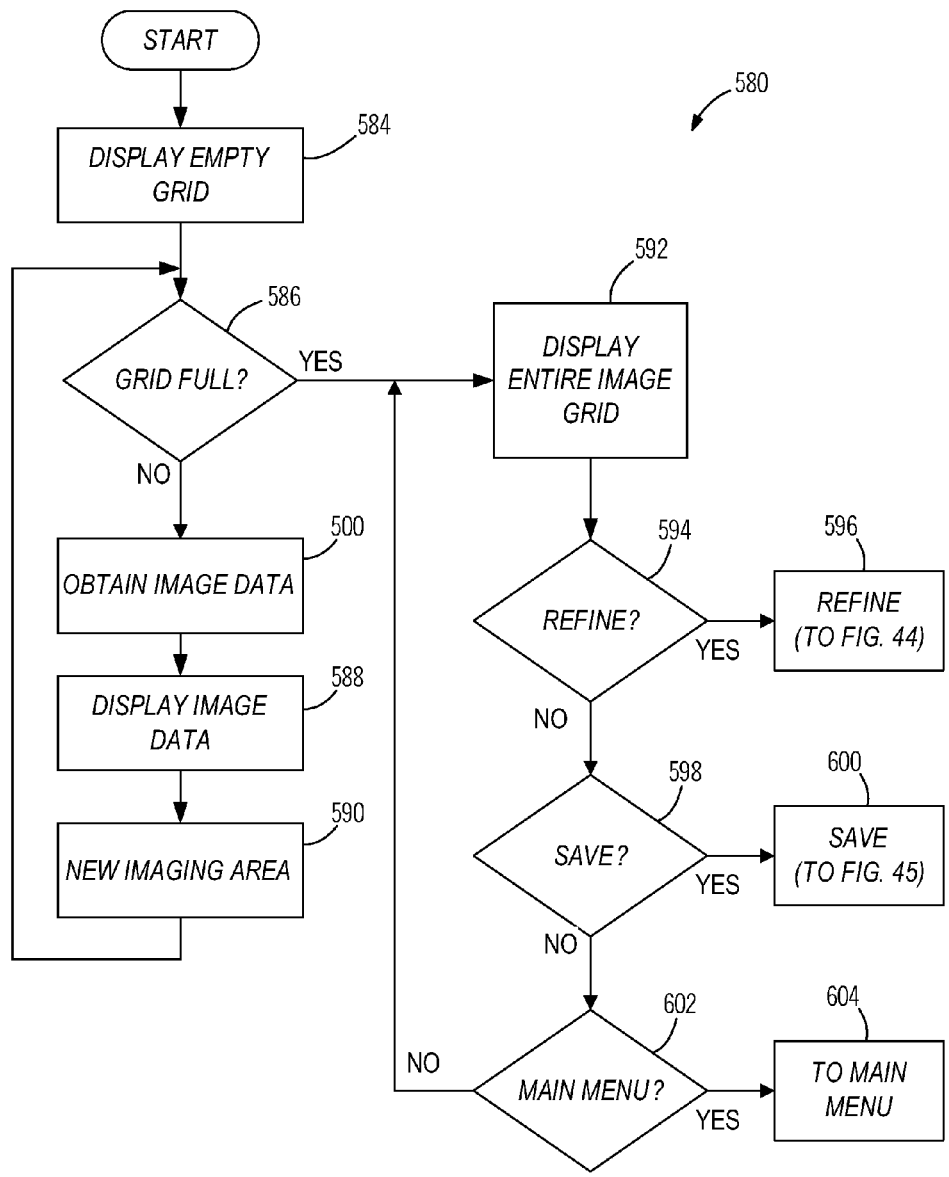
FIG. 42 depicts a process for executing a quadrant mode according to one embodiment of the invention.
Figure 43:
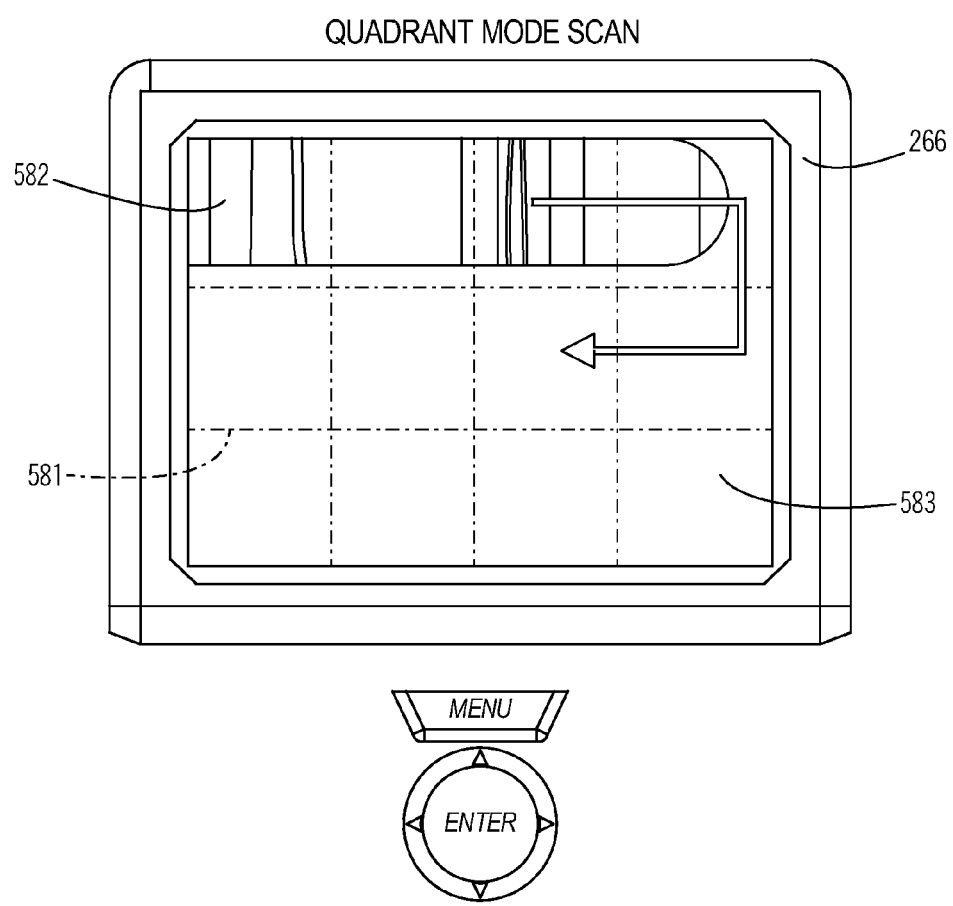
FIG. 43 illustrates a quadrant mode of an imager according to one embodiment of the invention.

FIG. 42 depicts a quadrant mode process 580. In general, the quadrant mode includes the user moving the imager 250 against the wall surface 56 to fill in a grid 581 with generated imaging data. As shown in FIG. 43, the grid 581 may include a 3×4 matrix. The 3×4 matrix represents an area of the wall surface 56 to be imaged. Initially, the grid 581 is blank, which is depicted by displaying the 3×4 matrix with all blank squares 583. Blank squares 583 may be represented by black coloring, white coloring, as well as other colors and patterns. As the user sweeps the imager 250 across the surface of wall surface 56, the grid 581 is filled with imaging data. For instance, square 582 of FIG. 43 is filled with generated imaging data. The grid 581 is full when no square of the grid 581 remains blank (e.g., when no initial blank squares 583 remain).

After entering the quadrant mode process 580, the user places the imager 250 against a wall surface 56 and depresses the trigger 262 to start imaging. In step 584, the imager 250 displays an empty grid on the display 266. In step 586, the grid 581 is evaluated to determine if it is full. If the grid 581 is not full (which is initially true), the imager 250 obtains image data using the process 500 of FIG. 36. The imager 250 uses the received image data to generate and display an image on display 266 in step 588. Thereafter, in step 590, the user moves the imager 250 along the wall surface 56 to obtain more image data from a new portion of the area of wall surface 56 to be imaged. Steps 586, 500, 588, and 590 are repeated until the imager 250 has been moved across the area to be imaged on the wall surface 56 and, therefore, the grid 581 is determined to be full in step 586.

Upon filling the grid 581, the imager 250 proceeds to step 592. In step 592, the imager 250 continues to display the entire grid area with the generated images until determining that a user has selected to refine the image in the refine mode (steps 594 and 596), save the image (steps 598 and 600), or return to the main menu (steps 602 and 604).

Figure 44:
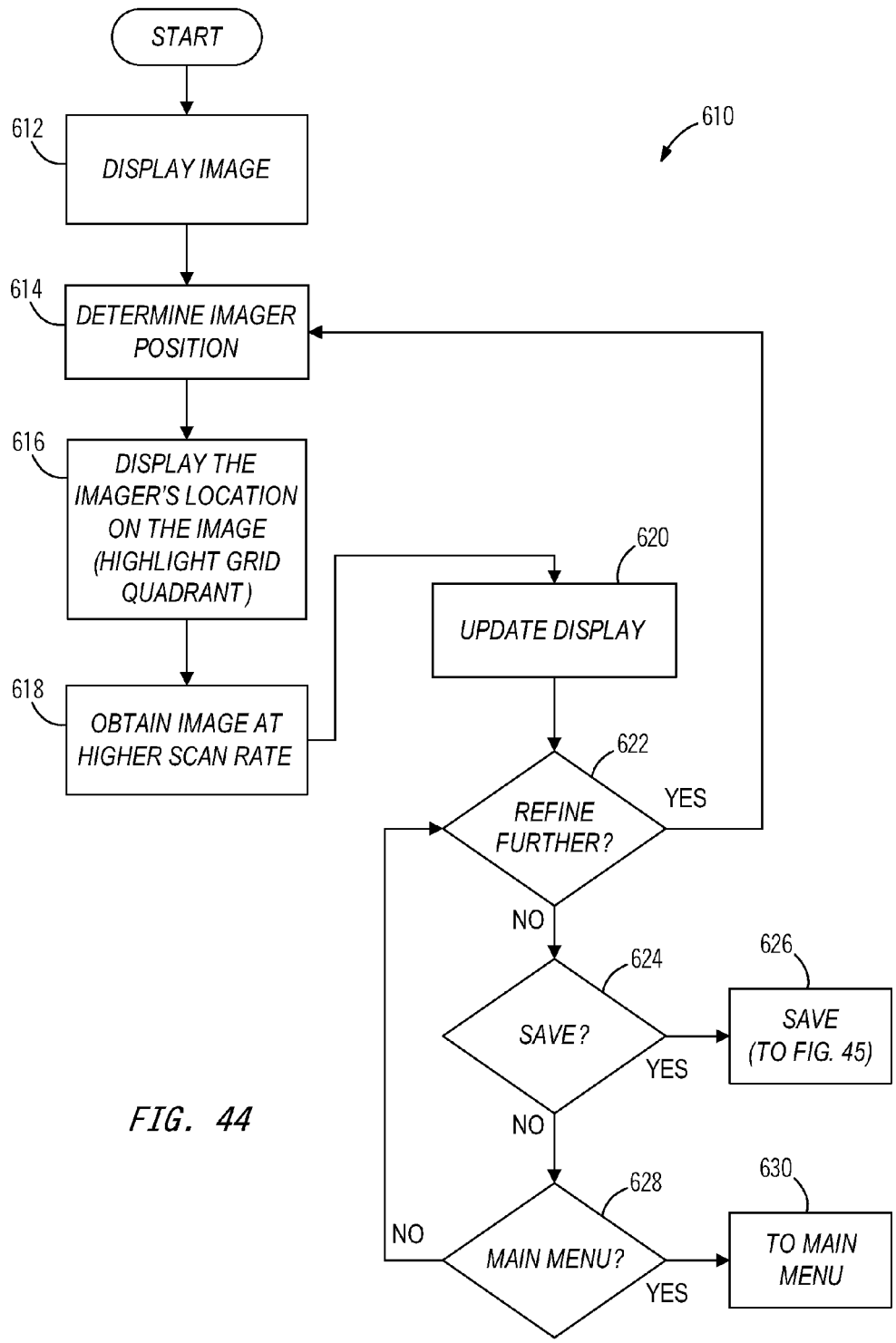
FIG. 44 illustrates a refine mode of an imager according to one embodiment of the invention.

FIG. 44 depicts a refine mode process 610. Upon entering the refine mode, in step 612, the imager 250 either continues to display the image generated in a previous mode or prompts the user to select an image saved in memory and displays the selected image. In step 614, the imager 250 determines the position of the imager 250 on the wall surface 56. Assuming the imager 250 has not been pulled away from the wall, the imager 250 determines its position based on position information received from encoder wheels 420 and synchronizing incoming image data with the retrieved image, akin to the process described in relation to FIG. 10.

Upon determining the location of the imager 250, the display 266 highlights a section of the grid 581 to indicate the location to the user (step 616). The user may reposition the imager 250, if necessary, to a section of interest on the wall surface 56. Upon repositioning, the imager 250 updates the display 266 to highlight the current location of the imager 250 in step 616. Thereafter, the imager 250 obtains new image data for the particular section at a higher scan rate in step 618. In step 620, the image on the display 266 is updated with the new image data from step 618.

The imager 250 will continue to display the image until the user selects to further refine the image, save the image, or return to the main menu. If the imager 250 determines that the user selected to further refine the image in step 622, the imager 250 returns to step 614. If the imager 250 determines that the user selected to save the retrieved image in step 624, the imager 250 proceeds to save the image in step 626. If the imager 250 determines that the user selected the main menu in step 628, the process 610 proceeds to the main menu in step 630.

Figure 45:
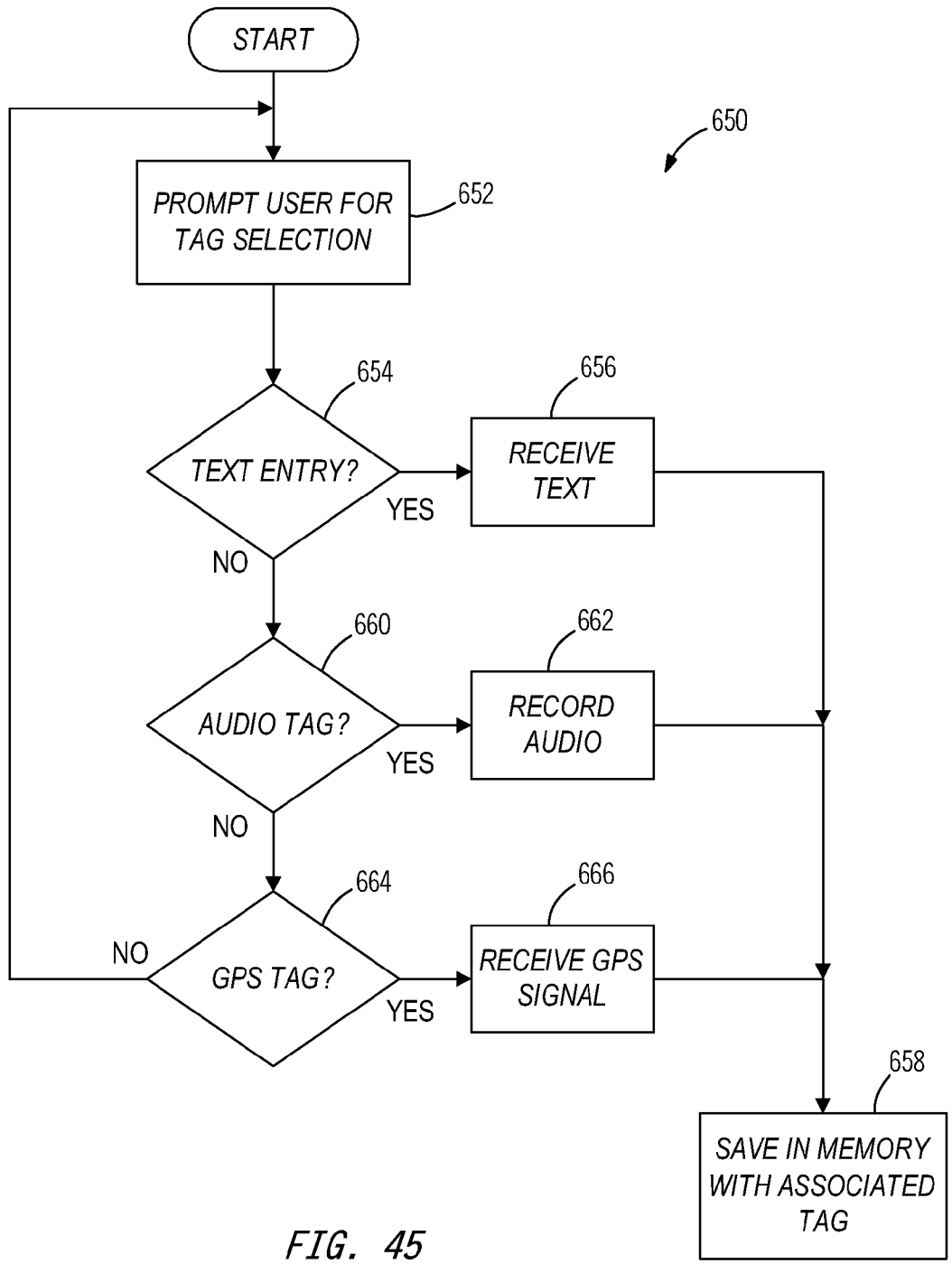
FIG. 45 illustrates a saving mode of an imager according to one embodiment of the invention.

FIG. 45 illustrates a saving process 650. The imager 250 enters the saving process 650 by way of saving step 566 of FIG. 40, saving step 600 of FIG. 42, and saving step 626 of FIG. 44. The saving steps 566, 600, and 626 are selected by the user while an image is being displayed on display 266. Thus, when the imager 250 enters the saving process 650, an image is currently being displayed on display 266. The process 650 begins at step 652, where the user is prompted to select a tag. In process 650, the user may select to save the image using a text tag, an audio tag, a global positioning system ("GPS") tag, or a default tag. If the user selects a text tag in step 654, the imager awaits text entry from a user in step 656. Thereafter, the image is saved in memory along with the entered text as its associated tag. If the user selects an audio tag in step 660, the imager 250 awaits for receipt of audio data. The user enters audio data in step 662, for instance, by depressing a hardware or software record button and speaking into a microphone (not shown) on the imager 250. In some embodiments, the microphone is built into the imager 250. In other embodiments, the microphone attaches to the imager 250 by a $118^{th}$ inch jack, Universal Serial Bus™ ("USB") connector, or similar connecting device. After the audio data is input to the imager 250, the image is saved in memory with the associated audio tag in step 658.

If the user selects a GPS tag in step 664, the imager 250 retrieves current GPS data from a GPS module (see additional detection module 702 of FIG. 48 and its accompanying description below) on the imager 250. The GPS data can include, for instance, a longitude and latitude of the imager 250. After the GPS data is retrieved by the imager 250, the image is saved in memory with the associated GPS tag in step 658. In some embodiments, a default tag including default text is associated with the image upon saving if the user fails to select other tag data. In some embodiments, multiple tags are associated with an image upon saving. For instance, a text tag and an audio tag, a text tag and a GPS tag, or another combination of tags are associated with an image upon saving.

The memory (not shown) of imager 250 may be any memory suitable for storing and retrieving image files. In some embodiments, the memory includes a hard disk permanently residing within the imager 250. In other embodiments, a removable drive may be swapped in and out of the imager 250.

In some embodiments, to retrieve a saved image from memory, thumbnail images are displayed on display 266. In some embodiments, when a thumbnail is highlighted or selected using the trackpad 260, the tag is displayed or, in the case of audio files, is played. In some embodiments, any associated text tag is displayed below or alongside the associated thumbnail. In some embodiments, a text-only directory is displayed showing all the tags arranged, for instance, in alphabetical order, by date created, or by another sorting technique.

Post-Processing

In some embodiments, the imager 250 is capable of processing the generated image ("post processing") to identify objects in the image and to contrast the identified objects with the background of the image to render the objects easier for the user to see. For instance, particular pixels of the generated image may be identified as corresponding to the hidden object 48. After being identified, the pixels may be brightened or darkened to enhance their visibility on the image. In other embodiments, a group of pixels identified as corresponding to the hidden object 48 may have an outline or border displayed around the group of pixels.

In some embodiments, identification algorithms are used to compare the shape of the group of pixels to a database of shapes. Upon identifying a match between the group of pixels and a shape in the database, the imager 250 may apply a specific highlighting technique to the group of pixels (e.g., display the group of pixels as blue to indicate a water pipe). In some embodiments, upon matching the group of pixels, a text bubble or other graphical identifier is added to the image and associated with the group of pixels, for instance, by an arrow.

In some embodiments, in addition to the shape of an identified group of pixels, the values of each pixel or sub-groups of pixels with similar values are used to identify the hidden object 48. For instance, a metallic object such as a pipe will generally reflect more radiation than a plastic or wood object. The imager 250 will, in turn, receive more reflected radiation and a stronger signal will be received by the processor 64. Thus, the imager 250 may identify the material making up the hidden object 48 based on the strength of the signal received. The imager 250 may use the identified material of the group or sub-group of pixels to better determine the type of object (e.g., wood, pipe, or wire) or merely to add post processing highlights based on the material type.

Figure 47:
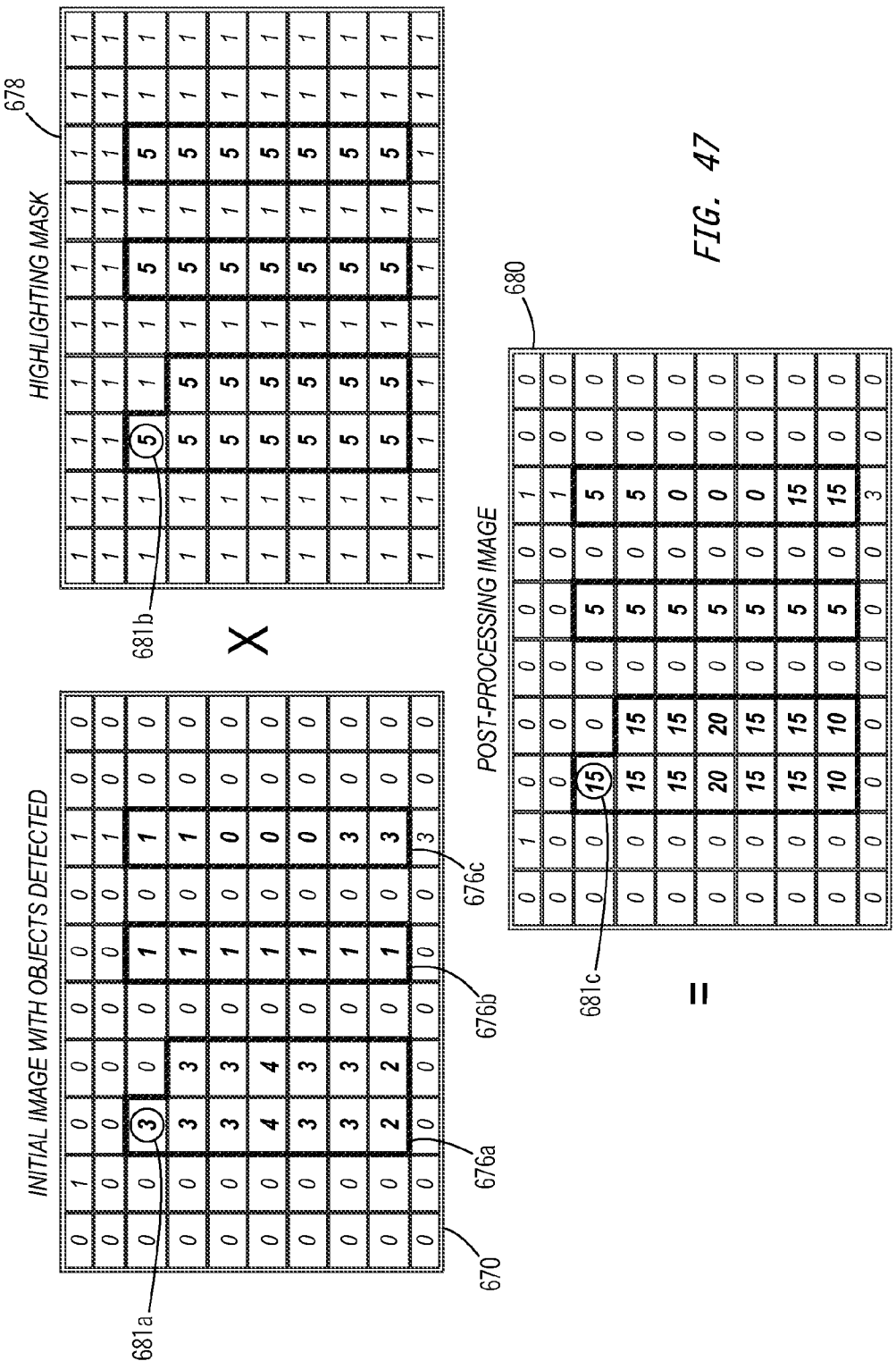
FIG. 47 depicts an image, a highlighting mask, and a post-processing image generated by an imager according to one embodiment of the invention.

In some embodiments, a radon transform type post-processing technique is used to identify objects within an image. FIGS. 46 and 47 depict a 10×10 pixel image 670 to illustrate the process of identifying objects using the radon transform type technique. In FIGS. 46 and 47, the value in each pixel location 672 indicates the level of blackness and whiteness of the pixel. For instance, a "5" indicates a pixel that is white, a "3" indicates a grey pixel, and a "0" indicates a black pixel. Furthermore, the more the reflected radiation detected by the receiver 452 of the RF board 300, the higher the whiteness level of the pixel. Therefore, a "0" indicates no object detected; a low value, such as 1, may be attributable to noise; and a value above 1 indicates an object.

To perform the post-processing, the imager 250 determines the sum of each column and row of pixels, as indicated in FIG. 46. The imager 250 then determines which columns and rows have sums above a predetermined threshold, such as four. These columns and rows are noted by the imager 250, and any pixel that is within both such a column and row are marked, for instance, by setting a flag bit or otherwise temporarily storing the information in a memory of the processor 64. For the example image of FIG. 46, the marked pixels are in bold. In addition, groups of adjacent marked pixels are identified by the processor 64 as objects 676a, 676b, and 676c. In some embodiments, the pixels surrounding each object 676a-c are set to a particular value to outline the detected object.

The benefits of the outlining or bordering functionality may be more apparent in an image with more pixels than image 670. In image 670, the pixels making up the outlines of objects 676a-c would cover as much area as the objects 676a-c themselves. For instance, object 676b is only one column wide. An outline around object 676b would be one column wide on each side of object 676b. Thus, the outline of object 676b would actually cover more than twice the area than the object 676b. In other embodiments, particularly those with more pixels per image, the ratio of outline pixel area to object pixel area is decreased such that the outline appears more as a thin line around an object.

In FIG. 47, a highlighting mask 678 is applied to the image 670 by multiplying each pixel (x,y) of image 670 with the corresponding pixel (x,y) in highlighting mask 678 and the result is placed in the corresponding pixel of a post-processing image 680. The highlighting mask 678 is set such that all pixels corresponding to a pixel location of the objects 676a-c of image 670 have a multiplying value greater than one (e.g., 5). All other pixels include a 1 value. For instance, pixel (3, 3) of image 670 is multiplied by pixel (3,3) of highlighting mask 678; thus, the value 15 is placed in pixel (3,3) of post-processing image 680 because 3×5=15. Pixel (3,3) of image 670, highlighting mask 678, and post-processing image 680 are identified by 681a, 681b, and 681c, respectively. Thus, the objects 676a-c are enhanced, or brightened, on post-processing image 680 and are more easily seen on the display 266.

In other embodiments, the highlighting mask 678 has pixels not corresponding to object locations in image 670 set equal to zero to cancel out noise. In some embodiments, the processor 64 is also configured to detect groups of low-valued pixels within detected objects that, in reality, indicate that the single detected object is actually two or more objects or that the single detected object 676c is smaller than initially determined. For instance, in image 670, object 676c is within one column and includes two 1 values, three 0 values, and two 3 values from top to bottom. The processor 64 may detect that the object 676c is only located at the two 3 values, and, in turn, highlight and outline the object 676c appropriately.

The small 10×10 pixel array with black and white images is used to simplify the explanation of the post processing techniques of FIGS. 46-47. In other embodiments, a larger pixel array and/or a color pixel array is used with similar techniques.

Additional Detection Technology

Figure 48:
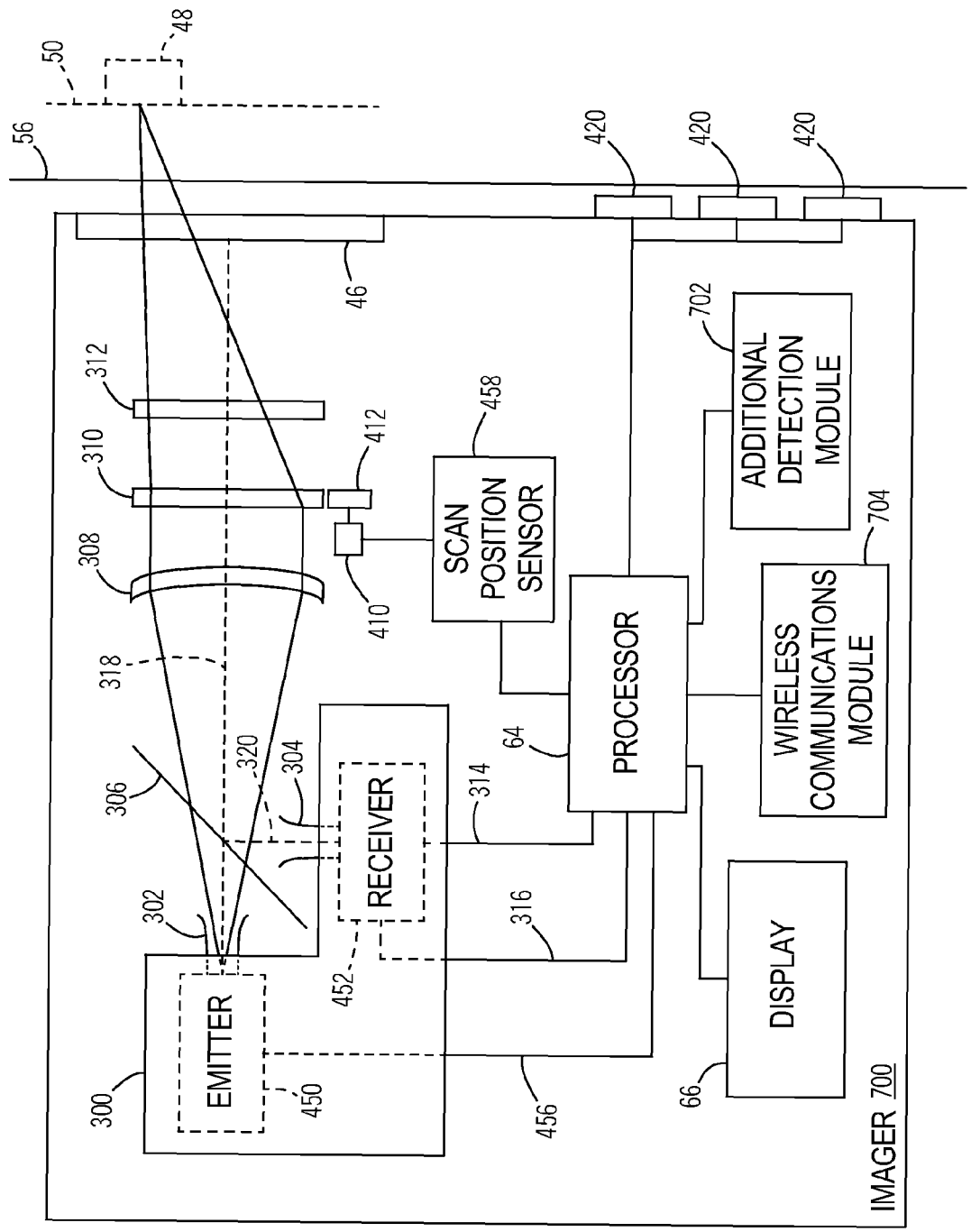
FIG. 48 schematically depicts an imaging system according to one embodiment of the invention.

In some embodiments, additional detection technology is incorporated into the imager 250 to form imager 700. FIG. 48 depicts the imager 700 with additional detection module 702. Additional detection module may include hardware, software, or a combination thereof. For instance, the additional detection module 702 may include hardware, and the processor 64 may include software to utilize the hardware. In some embodiments, the additional detection module is a field programmable gate array ("FPGA"), a general purpose processor, or an application specific integrated circuit ("ASIC").

The additional detection technology can include, for example, one or more of a capacitance detector, a thermographic camera, a sonic measuring device, a laser distance measuring device, a depth measurement device using ionizing radiation, a non-contact moisture meter, a GPS device, and a fiberscope camera.

In one embodiment, the additional detection module 702 includes a capacitance detector that uses an internal capacitor plate to detect changes in the dielectric constant of the wall surface 56 as the user moves the imager 700 over the wall surface 56. If the dielectric constant changes by a predetermined amount, the capacitance detector indicates that a dense object is behind the wall, such as a stud. The imager 700 combines the image data from the RF board 300 with the capacitance data from the capacitance detector to determine whether an object is behind the wall surface 56. For instance, if both the image data from the RF board 300 and the capacitance detector indicate that an object is behind wall surface 56, the display 266 will indicate that the object is present. However, if only one of the data from the capacitance detector and the data from the RF board 300 indicate an object behind the wall surface 56, the imager 700 may 1) indicate that no object is behind the wall surface 56, 2) indicate that an object is behind the wall surface 56, or 3) delay a determination and alert the user that further inspection is needed to determine whether an object is behind the wall surface 56. In other embodiments, the capacitance detector data is displayed on the display 66 as a separate color or other identifying information such that the user can distinguish between image data based on the RF board 300 and image data based on the capacitance detector.

In one embodiment, the additional detection module 702 includes a live wire detecting sensor. The live wire detecting sensor may include, for instance, an antenna to respond to electrical or magnetic fields surrounding live wires (e.g., 120 V or 220 V wires common in residential homes and commercial buildings). The live wire detecting sensor is configured to output an analog or digital signal to indicate to the processor 64 that a live wire is near the imager 700. The imager 700 may incorporate the live wire detecting sensor data with the image data from the RF board 300 similar to the method of incorporating capacitance data described above.

In one embodiment, the additional detection module 702 includes a thermographic camera, also referred to as a forward looking infrared ("FLIR") camera or an infrared camera. The infrared camera detects radiation with wavelengths between 0.7 and 300 μm. In some embodiments, the user toggles the imager 700 between displaying the infrared image generated by the infrared camera data and the image generated by the RF board 300 data. In some embodiments, the imager 700 overlays the RF board 300 data on the infrared image on the display 266.

In some embodiments, the additional detection module 702 includes a laser distance measurer or a sonic distance measurer. The distance measurers are used in conjunction with or in place of the encoder wheels 420 to determine the location of the imager 700 and to estimate the size of the wall surface 56. For instance, the distance measurers can detect the distance between the imager 700 and the surrounding walls in the x and y directions. The imager 700 can assume a rectangular wall surface 56 or can measure distances to obstructions in additional directions to increase the accuracy. When the imager 700 is moved across the wall surface 56, the processor 64 uses the changing distance information from the distance measurers to track the movement of the imager 700.

In addition, the distance measurers enable determining the location of the imager 700 for purposes of refining images in step 614 of the refine mode process 610. For instance, if the imager 700 is pulled away from the wall while the user selects an image to refine, the imager 700 will lose its position because the encoder wheels will not be touching the wall surface 56 to be rotated when the imager 700 is moved. However, even after the imager 700 is pulled away and then placed back up against the wall surface 56, distance measurers can provide location information to reorient the imager 700. The distance measurers do not rely on constant contact with the wall surface 56 to track location. Rather, the distance measurers rely on stationary objects such as a ceiling or other surface adjoining the wall surface 56. Furthermore, inertial sensors may be incorporated into the imager 700 to track imager 700 movement without needing to contact the wall surface 56. Example inertial sensors include accelerometers and gyroscopes, which, in some instances, are of the microelectro-mechanical systems ("MEMS") variety. Finally, an optical tracking system similar to those used in an optical computer mouse can be used in the imager 700. Within certain distances, the optical tracking system enables tracking even when the imager 700 is pulled away from the wall.

In other embodiments, the additional detection module 702 includes an emitter and detector of ionizing radiation. First, a metal object is detected using the RF board 300 data. The user is then prompted to cause the imager 700 to determine depth information regarding the metal object. In some embodiments, the imager 700 automatically determines depth information regarding a detected metal object without prompting the user. After aligning the imager 700, for instance, using similar methods used during the refine mode process 610, the emitter sends ionizing radiation towards the metal object. A portion of the ionizing radiation reflects back towards the ionizing radiation detector. The detector interprets the reflected ionizing radiation to determine more specific information regarding the depth of the metal object. The determined depth information is then displayed to the user on display 266. The ionizing radiation used is, for instance, short x-rays or gamma rays.

In some embodiments, the additional detection module 702 includes a non-contact moisture meter. The non-contact moisture meter relies on the dielectric properties of a hidden object. For instance, if the object material is known (e.g., wood, metal, or plastic), and the dielectric properties are different than expected given the known material, the non-contact moisture meter determines that water is present. The determination that water is present can be displayed to the user on the display 266 by overlaying a blue color on the appropriate pixels or using another highlighting technique. The object material may be determined, for instance, by analyzing the RF board 300 data as described above or by user input.

In some embodiments, the additional detection module 702 includes a GPS device. The GPS device is used, for instance, to tag images as described above with reference to FIG. 45.

In some embodiments, the additional detection module 702 includes a fiberscope camera or connection means to connect the fiberscope camera to the imager 700. The fiberscope camera includes a flexible fiber optic bundle with a lens on an inspecting end. In some embodiments, the lens end includes a light source to emit light in the area to be inspected. The other end of the flexible fiber optic bundle permanently or removably connects to the imager 700. The light waves reflecting off of objects within view of the lens are received through the lens and transmitted along the fiber optic bundle to the imager 700. The light waves are converted to digital signals by the imager 700 and forwarded on to the processor 64. The processor 64 receives the digital representations of the incoming light waves and generates images for the display 266. Thus, a user can use the fiberscope to view objects in hard-to-reach locations, such as behind walls, by feeding the fiberscope through a small hole.

In some embodiments, the imager 700 also includes a wireless communications module 704. The wireless communications module 704 includes hardware, software, or a combination thereof, to facilitate wireless communication between the imager 700 and one or more external devices (not shown). The external devices include, for instance, a personal computer, a laptop, another imager 700, a cell phone, or other device with a processor and memory.

Using the wireless communications module 704, the imager 700 can wirelessly transmit and receive image data to and from an external device. For instance, in one embodiment, the wireless communications module 704 includes Bluetooth™ technology. The Bluetooth-enabled imager 700 is configured to wirelessly transmit a generated image to a cell phone. Thereafter, the cell phone can be used to transmit the image to another location, such as a personal computer, or a remote server, via email. In other embodiments, the wireless communications module 704 includes WiFi™ technology and the imager 700 can wirelessly transmit or receive a generated image via email without the intermediate step of using a cell phone.

Telescoping Housing

In some embodiments, the imager 250 includes a telescoping housing. The telescoping housing enables the imager 250 to increase or decrease the distance between the RF board 300 and the wall surface 56. In turn, the imager 250 is able to detect objects at different depths behind the wall surface 56 because the focal point of the emitted radiation is at a different depth. In one embodiment, the encoder wheels extend away from the housing to increase the distance between the wall surface and the RF board 300, and retract to reduce the distance between the wall surface and the RF board 300.

In other embodiments, the housing includes a first and a second section. The components shown in FIG. 25 (RF board 300, emitter horn 302, receiver horn 304, fold mirror 306, meniscus lens 308, antenna 310, and QWP 312) are mounted to the first section, while the encoder wheels 420 are mounted to the second section. The first section and second section have a telescoping relationship such that the distance between the first and second sections can be increased or decreased. Increasing the distance between the first and second sections moves the RF board 300 away from the wall surface 56, thus decreasing the depth of the object detection. Decreasing the distance moves the RF board 300 nearer to the wall surface 56, thus increasing the depth of object detection.

In some embodiments, the telescoping technique is performed electronically, for instance, by a user toggling input buttons and interacting with the display 266 to extend or retract the encoder wheels 420, or increase or decrease the distance between the first and second sections of the housing. In other embodiments, the telescoping technique is performed manually by the user. The various telescoping housing configurations are similarly applicable to embodiments of the imager 700.

CONCLUSION

It should be understood that various modifications can be made to the above illustrative embodiments without departing from the scope of the invention. For example, a variety of different lenses can be utilized. The lenses can be fabricated, e.g., as zone plates, parallel metal plates, dielectric materials. Further, the optics can be designed as confocal, near confocal, telecentric, or dark field. The scanning of the radiation can be one or two-dimensional (radial, tangential, raster, or a combination thereof). The camera body location-determining subsystem can be internal or external to the camera body. Further, the location sensing technology can be mechanical, optical, RF or any suitable mode.

Thus, the invention provides, among other things, an imager that generates images based on emitting electromagnetic radiation and receiving reflected electromagnetic radiation to detect objects. The invention also provides, among other things, methods of operating an imager, organizing generated images, and processing image data to generate images. Various features and advantages of the invention are set forth in the following claims.

What is claimed is:

1. A method of locating hidden objects, the method comprising,
    transmitting microwaves, by a handheld imaging tool, toward an object behind a surface;
    detecting feedback, by the handheld imaging tool, from an interaction of the microwaves and the object;
    tracking movement of the handheld imaging tool along the surface by a tracking device of the handheld imaging tool; and
    displaying a grid on a display supported by the handheld imaging tool, wherein the grid is representative of an area to be scanned by the handheld imaging tool, and
    filling in the grid with generated images as the handheld imaging tool moves along the surface, the generated images being representative of space behind the surface and indicating at least one of a location, size, and depth of the object.

2. The method of claim 1, further comprising,
    storing the generated images in a memory with an accompanying tag;
    retrieving the generated images using the tag; and
    displaying the retrieved generated images on the display.

3. The method of locating hidden objects of claim 2, wherein the tag includes at least one of location data, voice data, and time data.

4. The method of claim 1, further comprising,
    refining a first image of the generated images, wherein refining includes
        transmitting additional microwaves toward an area of the surface associated with the first image,
        detecting additional feedback from an interaction of the additional microwaves, and
        generating an updated first image based on the detecting of additional feedback, wherein the updated first image has a higher resolution than the first image.

5. The method of claim 1, wherein the tracking device includes at least one encoder wheel, and wherein tracking movement of the handheld imaging tool includes the handheld imaging tool receiving rotation data from the at least one encoder wheel.

6. The method of claim 1, further comprising altering the generated images to include highlighting of the object.

7. The method of claim 1, further comprising identifying a type of object, by the handheld imaging tool, based on a comparison of a predetermined shape and a shape of a group of pixels.

8. A handheld imaging tool for locating hidden objects, the handheld imaging tool comprising:
a transmitting module operable to transmit microwaves toward an object behind a surface;
a detecting module operable to detect feedback from an interaction of the microwaves and the object;
a tracking module operable to track movement of the handheld imaging tool along the surface;
a display supported by the handheld imaging tool; and
an imaging module coupled to the detecting module, the tracking module, and the display, the imaging module operable to
render a grid on the display, the grid being representative of an area to be scanned by the handheld imaging tool, and
fill in the grid with generated images based on data from the detecting module and the tracking module as the handheld imaging tool moves along the surface, wherein the generated images are representative of space behind the surface and indicate at least one of a location, size, and depth of the object.

9. The handheld imaging tool of claim 8, further comprising an antenna including a mechanical axis at a center of the antenna and an optical axis offset from the mechanical axis, wherein the antenna is operable to rotate about the mechanical axis and microwaves transmitted by the transmitting module pass through the antenna before reaching the object.

10. The handheld imaging tool of claim 8, further comprising at least one of a lens, a quarter wave plate, and a beam splitter, wherein microwaves transmitted by the transmitting module pass through the at least one of the lens, the quarter wave plate, and the beam splitter before reaching the object.

11. The handheld imaging tool of claim 8, further comprising a memory, wherein the imaging module is operable to
store the generated images in the memory with an accompanying tag;
retrieve the generated images using the tag; and
display the retrieved generated images on the display.

12. The handheld imaging tool of claim 8, wherein the tracking module includes at least one encoder wheel operable to send rotation data to the imaging module.

13. A method of locating hidden objects, the method comprising,
transmitting microwaves, by a handheld imaging tool, toward an object behind a surface;
detecting feedback, by the handheld imaging tool, from an interaction of the microwaves and the object;
tracking movement of the handheld imaging tool along the surface by a tracking device of the handheld imaging tool;
generating an image on a display supported by the handheld imaging tool, the image including a representation of the object;
storing the image in a memory with an accompanying tag;
retrieving the image using the tag; and
displaying the retrieved image on the display.

14. The method of claim 13, wherein the tag includes at least one of location data, voice data, and time data.

15. The method of claim 13, further comprising,
refining the image, wherein refining includes
transmitting additional microwaves toward an area of the surface associated with the image,
detecting additional feedback from an interaction of the additional microwaves, and
generating an updated image based on the detecting of additional feedback, wherein the updated image has a higher resolution than the image.

16. The method of claim 13, wherein the tracking device includes at least one encoder wheel, and wherein tracking movement of the handheld imaging tool includes the handheld imaging tool receiving rotation data from the at least one encoder wheel.

17. The method of claim 13, further comprising altering the image to include highlighting of the object.

18. The method of claim 13, further comprising identifying a type of object, by the handheld imaging tool, based on a comparison of a predetermined shape and a shape of a group of pixels representing the object within the image.

19. The method of claim 13, wherein storing the image in the memory includes wirelessly transmitting the image and tag to the memory.

20. A handheld imaging tool for locating hidden objects, the handheld imaging tool comprising:
a transmitting module operable to transmit microwaves toward an object behind a surface;
a detecting module operable to detect feedback from an interaction of the microwaves and the object;
a tracking module operable to track movement of the handheld imaging tool along the surface;
a display supported by the handheld imaging tool; and
an imaging module coupled to the detecting module, the tracking module, and the display, the imaging module being operable to
generate an image on the display, the image including a representation of the object;
store the image in a memory with an accompanying tag;
retrieve the image using the tag; and
display the retrieved image on the display.

21. The handheld imaging tool of claim 20, further comprising an antenna including a mechanical axis at a center of the antenna and an optical axis offset from the mechanical axis, wherein the antenna is operable to rotate about the mechanical axis and microwaves transmitted by the transmitting module pass through the antenna before reaching the object.

22. The handheld imaging tool of claim 20, further comprising at least one of a lens, a quarter wave plate, and a beam splitter, wherein microwaves transmitted by the transmitting module pass through the at least one of the lens, the quarter wave plate, and the beam splitter before reaching the object.

23. The handheld imaging tool of claim 20, wherein the tracking module includes at least one encoder wheel operable to send rotation data to the imaging module.

24. A handheld imaging tool for locating hidden objects, the handheld imaging tool comprising:
a body including,
a horn assembly including an emitting horn and a receiving horn, wherein the emitting horn is operable to transmit microwaves toward an object behind a surface and the receiving horn is operable to receive feedback from an interaction of the microwaves and the object;

a tracking module operable to track movement of the handheld imaging tool along the surface;

an imaging module operable to generate images based on data from the tracking module and the feedback received by the receiving horn; and a display operable to display generated images as the handheld imaging tool moves along the surface, the generated images being representative of space behind the surface and indicating at least one of a location, size, and depth of the object; and a handle portion supporting the body of the handheld imaging tool, the handle portion including a trigger actuator and a thumb actuator, wherein the trigger actuator and the thumb actuator are operable to at least partially control the display.

25. The handheld imaging tool of claim 24, wherein the trigger actuator is accessible by an index finger of a first hand of a user gripping the handle portion, and the thumb actuator is accessible by a thumb of the first hand gripping the handle portion.

26. The handheld imaging tool of claim 24, wherein the body further includes a notch that relates a location of the images to a position of the handheld imaging tool.

27. The handheld imaging tool of claim 24, further comprising an antenna including a mechanical axis at a center of the antenna and an optical axis offset from the mechanical axis, wherein the antenna is operable to rotate about the mechanical axis and microwaves transmitted by the emitting horn pass through the antenna before reaching the object.

28. The handheld imaging tool of claim 27, wherein the antenna includes a first zone and a second zone, wherein the first and second zones each include a first and second sub-zone, and wherein the first sub-zone of the first zone is thicker than the first sub-zone of the second zone, and the second sub-zone of the first zone is thinner than the second sub-zone of the second zone.

29. The handheld imaging tool of claim 28, wherein the first zone, the second zone, the first sub-zone, and the second sub-zone are approximately concentric about the optical axis.

30. The handheld imaging tool of claim 27, wherein the antenna is less than approximately 20 millimeters thick.

31. The handheld imaging tool of claim 24, further comprising a beam splitter, wherein microwaves transmitted by the emitting horn pass through the beam splitter before reaching the object.

32. The handheld imaging tool of claim 24, further comprising a lens wherein microwaves transmitted by the emitting horn pass through the lens and are focused by the lens before reaching the object.

33. The handheld imaging tool of claim 24, further comprising a quarter wave plate, wherein microwaves transmitted by the emitting horn pass through the quarter wave plate before reaching the object.

* * * * *